US012422934B2

(12) United States Patent
Bicking et al.

(10) Patent No.: US 12,422,934 B2
(45) Date of Patent: Sep. 23, 2025

(54) TECHNIQUES FOR NEUROMUSCULAR-SIGNAL-BASED DETECTION OF IN-AIR HAND GESTURES FOR TEXT PRODUCTION AND MODIFICATION, AND SYSTEMS, WEARABLE DEVICES, AND METHODS FOR USING THESE TECHNIQUES

(71) Applicant: Meta Platforms Technologies, LLC, Menlo Park, CA (US)

(72) Inventors: Ian Sebastian Murphy Bicking, Minneapolis, MN (US); Austin Ha, Flushing, NY (US); Adam Berenzweig, Brooklyn, NY (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/167,756

(22) Filed: Feb. 10, 2023

(65) Prior Publication Data
US 2023/0325002 A1     Oct. 12, 2023

Related U.S. Application Data

(60) Provisional application No. 63/329,294, filed on Apr. 8, 2022.

(51) Int. Cl.
*G06F 3/01* (2006.01)
*G06F 3/16* (2006.01)

(52) U.S. Cl.
CPC .............. *G06F 3/017* (2013.01); *G06F 3/013* (2013.01); *G06F 3/015* (2013.01); *G06F 3/167* (2013.01)

(58) Field of Classification Search
CPC .......... G06F 3/017; G06F 3/013; G06F 3/015; G06F 3/167
(Continued)

(56) References Cited

U.S. PATENT DOCUMENTS 9,336,555 B1 *  5/2016  Guy ........................ G09G 5/363
9,640,181 B2 *  5/2017  Parkinson ............. G06F 40/166
(Continued)

OTHER PUBLICATIONS

International Search Report and Written Opinion for International Application No. PCT/US2023/017992, mailed Jun. 29, 2023, 11 pages.
(Continued)

*Primary Examiner* — Stephen S Hong
*Assistant Examiner* — Broderick C Anderson
(74) *Attorney, Agent, or Firm* — Morgan, Lewis & Bockius LLP

(57) ABSTRACT

The various implementations described herein include methods and systems for producing and modifying text using neuromuscular-signal-sensing devices. In one aspect, a method includes causing the display of a plurality of text terms input by a user. Using data from one or more neuromuscular-signal sensors in communication with the wearable device, an in-air hand gesture performed by the user is detected while the text terms are displayed. In response to the in-air hand gesture, a text-modification mode is enabled that allows for modifying the text terms input by the user. A target term is identified and, while the text-modification mode is enabled, data about a voice input provided by the user for modifying the target term is received. The method further includes causing a modification to the target term in accordance with the voice input from the user.

20 Claims, 41 Drawing Sheets

(58) Field of Classification Search
USPC .......................................................... 715/863
See application file for complete search history.

(56) References Cited

U.S. PATENT DOCUMENTS

| | | | | |
|---|---|---|---|---|
| 2013/0031517 | A1* | 1/2013 | Freeman | G06F 3/017 |
| | | | | 715/863 |
| 2014/0019127 | A1* | 1/2014 | Park | G10L 15/01 |
| | | | | 704/235 |
| 2014/0278441 | A1* | 9/2014 | Ton | G06F 3/017 |
| | | | | 704/275 |
| 2016/0062636 | A1* | 3/2016 | Jung | G06F 3/04817 |
| | | | | 715/762 |
| 2017/0322623 | A1* | 11/2017 | McKenzie | G06F 3/04886 |
| 2019/0362557 | A1* | 11/2019 | Lacey | G06T 5/20 |
| 2020/0382717 | A1* | 12/2020 | Chiu | H04N 23/74 |

OTHER PUBLICATIONS

Pfeuffer, et al., "Gaze+ Pinch Interaction in Virtual Reality," Proceedings of the 5th Symposium on Spatial User Interaction, SUI '17, Oct. 16, 2017, pp. 99-108.

International Preliminary Report on Patentability for International Application No. PCT/US2023/017992, mailed Oct. 17, 2024, 10 pages.

* cited by examiner

TECHNIQUES FOR NEUROMUSCULAR-SIGNAL-BASED DETECTION OF IN-AIR HAND GESTURES FOR TEXT PRODUCTION AND MODIFICATION, AND SYSTEMS, WEARABLE DEVICES, AND METHODS FOR USING THESE TECHNIQUES

PRIORITY AND RELATED APPLICATIONS

This application claims priority to U.S. Provisional App. No. 63/329,294, filed on Apr. 8, 2022, titled "Techniques for neuromuscular-signal-based detection of in-air hand gestures for text production and modification, and systems, wearable devices, and methods for using these techniques," which is incorporated herein in its entirety.

TECHNICAL FIELD

The present disclosure relates generally to wearable devices (e.g., head-worn wearable devices such as augmented-reality glasses and virtual-reality goggles) and methods for sensing neuromuscular signals, and more particularly to wearable devices configured to detect neuromuscular-based signals corresponding to in-air hand gestures for text production and modification (e.g., gestures performed by a user's digits without contacting any electronic devices, which gestures can be interpreted to cause modifications to text that was generated based on voice commands received from a user).

BACKGROUND

Some wearable devices use full-range and space-consuming user movements, such as entire arm, hand, and/or body movements, to detect motor actions of a user. These devices use the detected motor actions to identify user gestures that correspond to instructions that can be provided as inputs to different computing devices. These full-range movements can be disruptive and socially unacceptable. Further, to perform the full-range user movements, the user is required to have a minimum amount of space available (e.g., at least an arm's-width of space) and is required to expend considerably more energy than is required to operate a touchscreen or handheld device.

For new technologies around text production and modification (editing) using artificial-reality devices (including augmented-reality (AR) glasses and virtual-reality (VR) goggles), these problems are significant, as user adoption and use of these new technologies will be diminished (or remain cabined to only certain use cases such as gaming in large open spaces) if the gestures remain socially unacceptable. Moreover, the combined use of multiple input modalities (e.g., sensors at multiple different wearable devices, such as a smartwatch as well as VR goggles, used to detect different types of gestures and other interactions related to text production and modification) to improve text production and modification requires further exploration to allow for synergistic and efficient use of these multiple input modalities. As one example, the ability to use a first input modality to input text (e.g., voice inputs detected via a microphone) and a second input modality to modify the inputted text (e.g., gestures that can be performed by a user without needing to interact with a physical or simulated/virtual keyboard) requires further exploration. As such, it would be desirable to address one or more of the above-identified issues.

SUMMARY

The systems (wearable devices) and methods described herein address at least one of the above-mentioned drawbacks by causing the performance of commands at a computing device based on detected neuromuscular signals from in-air hand gestures, such as thumb-to-finger-based gestures, which can be gestures in which a user either intends to, or actually does, cause their thumb to contact some portion of one of their other digits (or intends to or causes one digit to touch another digit). As will become apparent upon reading this disclosure, the in-air hand gestures described herein are gestures that do not make contact with an electronic device (such as a smartwatch, generally referred to herein as a wrist-wearable device) and are instead performed in the air. In particular, the wearable devices described herein are configured to detect sequences or patterns of neuromuscular signals based on a user performing (or intending to perform) a particular in-air hand gesture. Each gesture can be associated with a corresponding command at a computing device (e.g., associations between gestures and respective input commands can be predefined and stored in a memory of the computing device and/or the wearable device). The gestures can include thumb-to-finger gestures such as contacting the tip of the thumb to the tip of the index finger. The gestures can also include hand gestures such as making a fist or waving the hand. The gestures can also include movement of a single finger or thumb, such as a thumb swipe gesture or an index finger tap gesture. The gestures can also include double gestures, such as a double tap gesture, a double pinch gesture, or a double swipe gesture. The use of double gestures increases the amount of available gestures and also decreases accidently gesture detection. As one further example, a virtual directional pad (d-pad) in-air gesture can also be detected via the neuromuscular-signal sensors in some embodiments, which d-pad in-air gesture includes movement on a user's thumb in either horizontal or vertical directions on top of a portion of the user's index finger (e.g., on top of the skin that sits above the proximal phalange portion of the user's index finger).

The wearable devices and methods described herein, after receiving or detecting the sequence of neuromuscular signals, provide data to the computing device that causes the computing device to perform an input command. The systems and methods described herein allow for minimal user movement to provide the desired input commands at a computing device, which reduces the amount of space required by a user to perform a recognizable gesture (e.g., limiting movement to the user's hand or digits, which can be moved discreetly), reduces a total amount of energy that a user must expend to perform a gesture and reduces or eliminates the use of large awkward movements to perform the gesture. These improvements allow for the wearable device to be designed such that it is comfortable, functional, practical, and socially acceptable for day-to-day use. These improvements are also important for text-based input commands, such as typing, editing, and navigating within a messaging application or document-editing application, as other gestures for such input commands can be cumbersome and inefficient, especially when used in artificial-reality environments (such as AR and VR environments). All this furthers the goal of getting more users to adopt emerging technologies in the AR and VR spaces for more use cases, especially beyond just gaming uses in large open spaces.

Further, the systems described herein can also improve users' interactions with artificial-reality environments and improve user adoption of artificial-reality environments more generally by providing a form factor that is socially acceptable and compact, thereby allowing the user to wear the device throughout their day and helping to enhance more of the user's daily activities (and thus making it easier to interact with such environments in tandem with (as a complement to) everyday life).

Further, as one example as to how the innovative techniques described herein help to address the multiple input modality problem/exploration outlined in the background section above, the systems and methods described herein make use of multiple input modalities in an efficient and synergistic fashion, including by combining text-input methodologies, e.g., speech-to-text (STT), with neuromuscular gesture control, such as in-air hand gestures that can be detected by sensing neuromuscular signals traveling through a user's body. A user can enter (and/or switch between) text-input modes, text-modification modes, and text-display modes using in-air hand gestures detected based on detected neuromuscular signals (as mentioned earlier, when a user intends to perform one of the in-air hand gestures, a sequence of neuromuscular signals travels through their body to effectuate the desired motion action, which sequence of neuromuscular signals can be detected and then processed by the wearable devices (or a device in communication therewith) to detect performance of (or an intention to perform) a respective in-air hand gesture). For example, a first type of gesture can be used to enter the text-input mode. In the text-input mode the user may enter text via STT. The user can transition to the text-display mode via another type of gesture or automatically (e.g., "automatically" referring to a system-state change that occurs without the user needing to request that state change via another gesture or other input) after entering text. A user's input is displayed (e.g., in an artificial-reality environment that can be presented via AR glasses or VR goggles) and the user can enter a modification mode using yet another gesture. In the modification mode, the user can select a term in the displayed text and provide a modification, such as a replacement term or phrase. The user can select the term for modification via one or both of gaze-based and neuromuscular-signal-based controls. In this way, the techniques described herein help to create sustained user interactions (e.g., an uninterrupted user interaction with text input and modification features that does not require clunky and inefficient operations to switch between input modalities) and improved man-machine interfaces (e.g., an efficient interface that allows for easy use of multiple input modalities).

In accordance with some embodiments, a method is performed on a wearable device having memory and one or more processors. The method includes (i) causing display, using a display that is in communication with a wearable device, of a plurality of text terms input by a user; (ii) detecting, using data from one or more neuromuscular-signal sensors in communication with the wearable device, an in-air hand gesture performed by the user while the plurality of text terms are displayed; (iii) in response to the in-air hand gesture, enabling a text-modification mode that allows for modifying the plurality of text terms input by the user; and (iv) while the text-modification mode is enabled (a) identifying a target term of the plurality of text terms, (b) receiving data about a voice input provided by the user for modifying the target term, and (c) causing a modification to the target term in accordance with the voice input from the user.

In some embodiments, a computing device (e.g., a wrist-wearable device or a head-mounted device or an intermediary device such as a smart phone or desktop or laptop computer that can be configured to coordinate operations at the wrist-wearable device and the head-mounted device) includes one or more processors, memory, a display (in some embodiments, the display can be optional, such as for certain example intermediary devices that can coordinate operations at the wrist-wearable device and the head-mounted device, and thus have ample processing and power resources but need not have displays of their own), and one or more programs stored in the memory. The programs are configured for execution by the one or more processors. The one or more programs include instructions for performing (or causing performance of) any of the methods described herein (e.g., including methods 500 and 600 that are described in detail below).

In some embodiments, a non-transitory computer-readable storage medium stores one or more programs configured for execution by a computing device (e.g., a wrist-wearable device or a head-mounted device or an intermediary device such as a smart phone or desktop or laptop computer that can be configured to coordinate operations at the wrist-wearable device and the head-mounted device) having one or more processors, memory, and a display (in some embodiments, the display can be optional, such as for certain example intermediary devices that can coordinate operations at the wrist-wearable device and the head-mounted device, and thus have ample processing and power resources but need not have displays of their own). The one or more programs include instructions for performing (or causing performance of) any of the methods described herein (e.g., including methods 500 and 600 that are described in detail below).

Thus, methods, systems, and computer-readable storage media are disclosed for neuromuscular-signal-based detection of in-air hand gestures for text production and modification. Such methods may complement or replace conventional methods for text production and modification.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes, and has not necessarily been selected to delineate or circumscribe the subject matter described herein.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not necessarily to be considered limiting, for the description may admit to other effective features, as the person of skill in this art will appreciate upon reading this disclosure.

In accordance with common practice, the various features illustrated in the drawings are not necessarily drawn to scale, and like reference numerals may be used to denote like features throughout the specification and figures.

DETAILED DESCRIPTION

Numerous details are described herein in order to provide a thorough understanding of the example embodiments illustrated in the accompanying drawings. However, some embodiments can be practiced without many of the specific details, and the scope of the claims is only limited by those features and aspects specifically recited in the claims. Furthermore, well-known processes, components, and materials have not necessarily been described in exhaustive detail so as to avoid obscuring pertinent aspects of the embodiments described herein.

Embodiments of this disclosure may include or be implemented in conjunction with various types or embodiments of artificial-reality systems. Artificial reality constitutes a form of reality that has been altered by virtual objects for presentation to a user. Such artificial reality may include and/or represent virtual reality (VR), augmented reality (AR), mixed reality (MR), hybrid reality, or some combination and/or variation of one or more of the these. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional effect to a viewer). Additionally, in some embodiments artificial reality may also be associated with applications, products, accessories, services, or some combination thereof that are used, for example, to create content in an artificial reality and/or are otherwise used in (e.g., to perform activities in) an artificial reality.

Artificial-reality systems may be implemented in a variety of different form factors and configurations. Some artificial-reality systems include a near-eye display (NED), which provides visibility into the real world (e.g., the AR system 820 in FIG. 8A) or that visually immerses a user in an artificial reality (e.g., the VR system 850 in FIG. 8B). While some artificial-reality devices are self-contained systems, other artificial-reality devices communicate and/or coordinate with external devices to provide an artificial-reality experience for a user. Examples of such external devices include handheld controllers, mobile devices, desktop computers, devices worn by a user (e.g., the wearable device 900 in FIG. 9A), devices worn by one or more other users, and/or any other suitable external system.

Figure 1A:
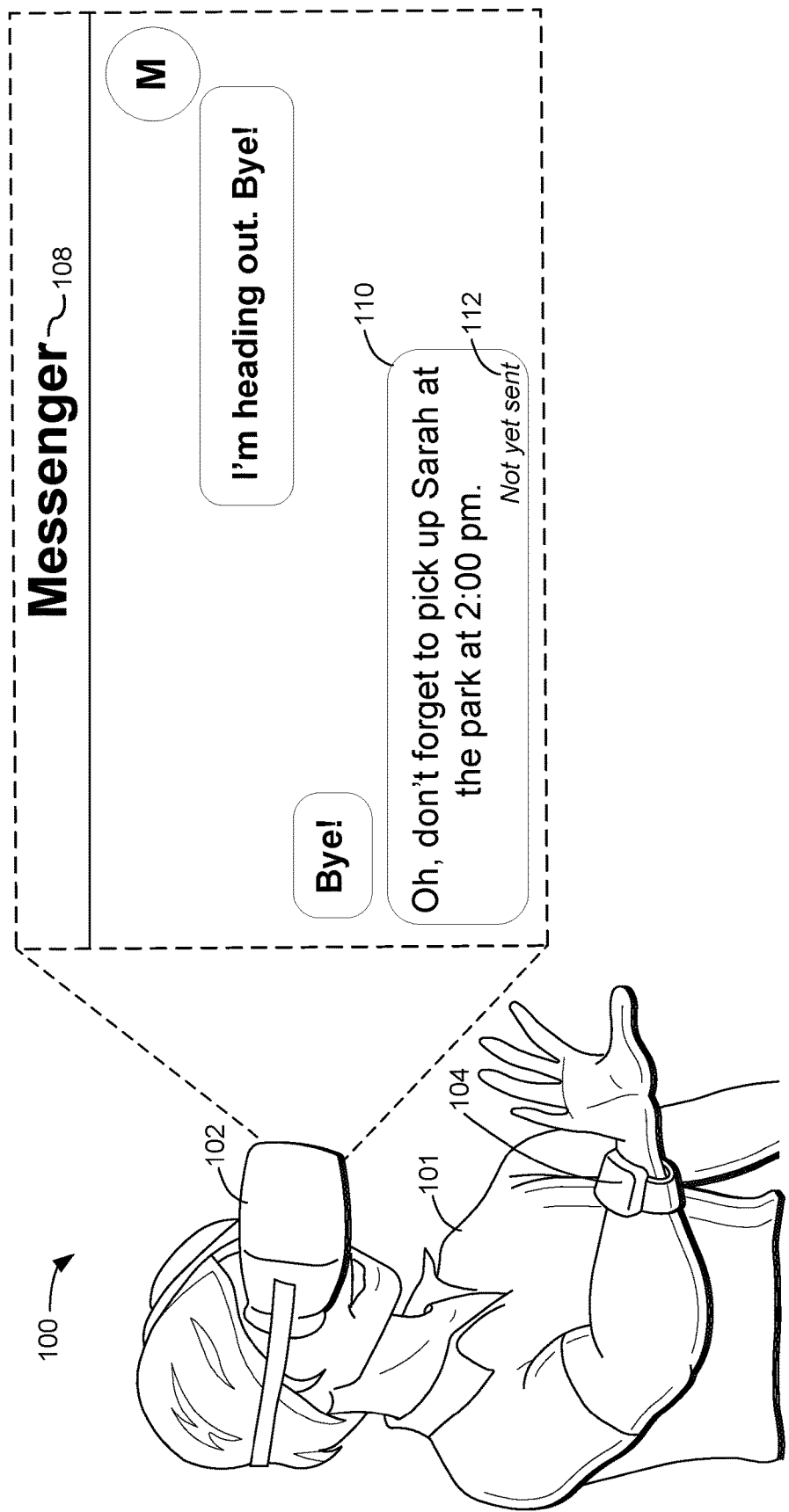
FIGS. 1A-1F illustrate an example user scenario with an artificial-reality system (e.g., including at least virtual-reality (VR) goggles and a wrist-wearable device) in accordance with some embodiments.

FIGS. 1A-1F illustrate an example user scenario with an artificial-reality system 100 (e.g., including at least VR goggles and a wrist-wearable device) in accordance with some embodiments. The artificial-reality system 100 includes a head-mounted display device 102 (also referred to as a head-worn wearable device or simply as a head-mounted or head-worn device, and the head-mounted device is also a wearable device since it is worn on the user's head) and a wrist-wearable device 104. Other examples of wearable devices include rings, anklets, armbands, neckbands, headbands, and smart clothing (e.g., clothing with integrated sensors and electronics). The user 101 in FIG. 1A is viewing a scene with a messenger application 108 being displayed using the head-mounted display device 102. The messenger application 108 includes multiple messages between the user 101 and a person "M." In the example of FIG. 1A, the user has composed a draft message 110 that has not yet been sent to the person "M," as denoted by the "Not yet sent" state indicator 112. While the example in FIG. 1A is of an electronic messaging conversation/thread between the user and one other user ("M"), the skilled artisan will appreciate that the techniques described herein also apply to group conversations between the user and multiple other users (e.g., "M" and one or more additional users). While not shown in FIG. 1A, the skilled artisan will also appreciate that information exchanged between the devices 102 and 104 can be directly exchanged (e.g., over a wireless communication protocol such as BLUETOOTH) or can be indirectly exchanged via an intermediary (e.g., using a smart phone or other computing device to coordinate or otherwise handle the exchange of information between the two devices).

Figure 1B:
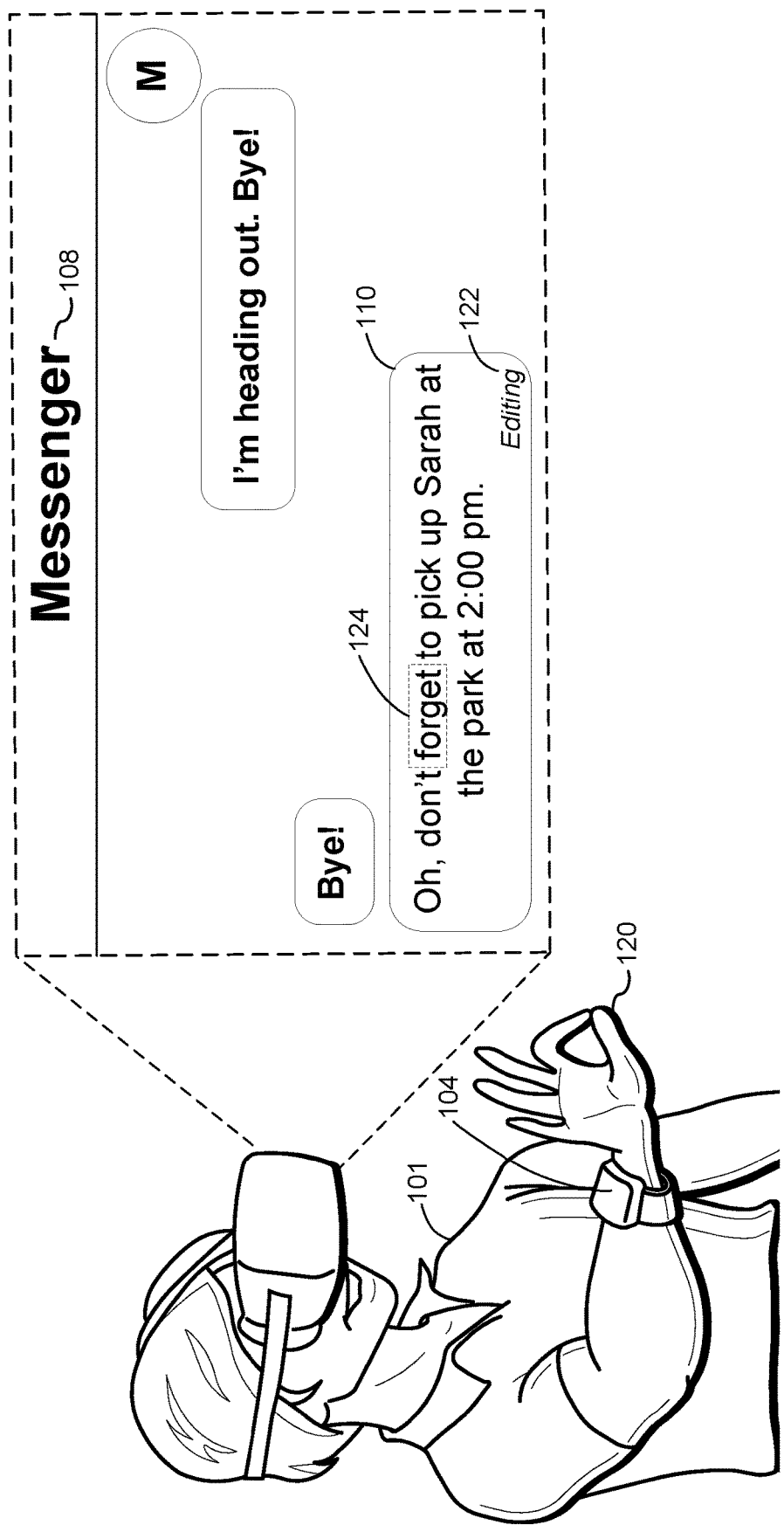

In FIG. 1B, the user 101 performs a gesture 120 (e.g., a thumb and index finger pinch gesture) in which one or both of the thumb and index finger are moved toward one another and eventually make contact in the air and the gesture is detected by the wrist-wearable device 104. In the depicted example of FIG. 1B, the thumb makes contact with the distal phalange portion of the user's index finger without making any contact with either of the devices 102 and 104. In some embodiments, the gesture is detected by processing detected sensor data (which can be processed at the wrist-wearable device 104 or at a device that is in communication therewith, which can be sensor data from neuromuscular-signal sensors that sense neuromuscular signals traveling through the user's body to cause the motor actions that move the thumb and/or index finger toward one another to make contact in the air). In some embodiments, the wrist-wearable device includes one or more neuromuscular sensors for detecting user gestures, such as the thumb to index finger pinch gesture of FIG. 1B. In some embodiments, the neuromuscular sensors include one or more surface electromyography (sEMG) sensors, mechanomyography sensors, and/or sonomyography sensors. Techniques for processing neuromuscular signals are described in commonly owned U.S. Patent Publication No. US 2020/0310539, which is incorporated by reference herein for all purposes, including for example the techniques shown and described with reference to FIGS. 29-30 in the incorporated publication, which can be applied in one example to process neuromuscular signals to allow for detecting the in-air hand gestures described herein. FIG. 1B further shows the messenger application 108 enabling a text-modification mode (and also disabling the text-review mode that was shown in FIG. 1A) in response to the user gesture 120, as denoted by the "Editing" state indicator 122. FIG. 1B also shows a term 124 ("forget") emphasized in the draft message 110, e.g., in accordance with a user gaze directed toward the term 124.

Figure 1C:
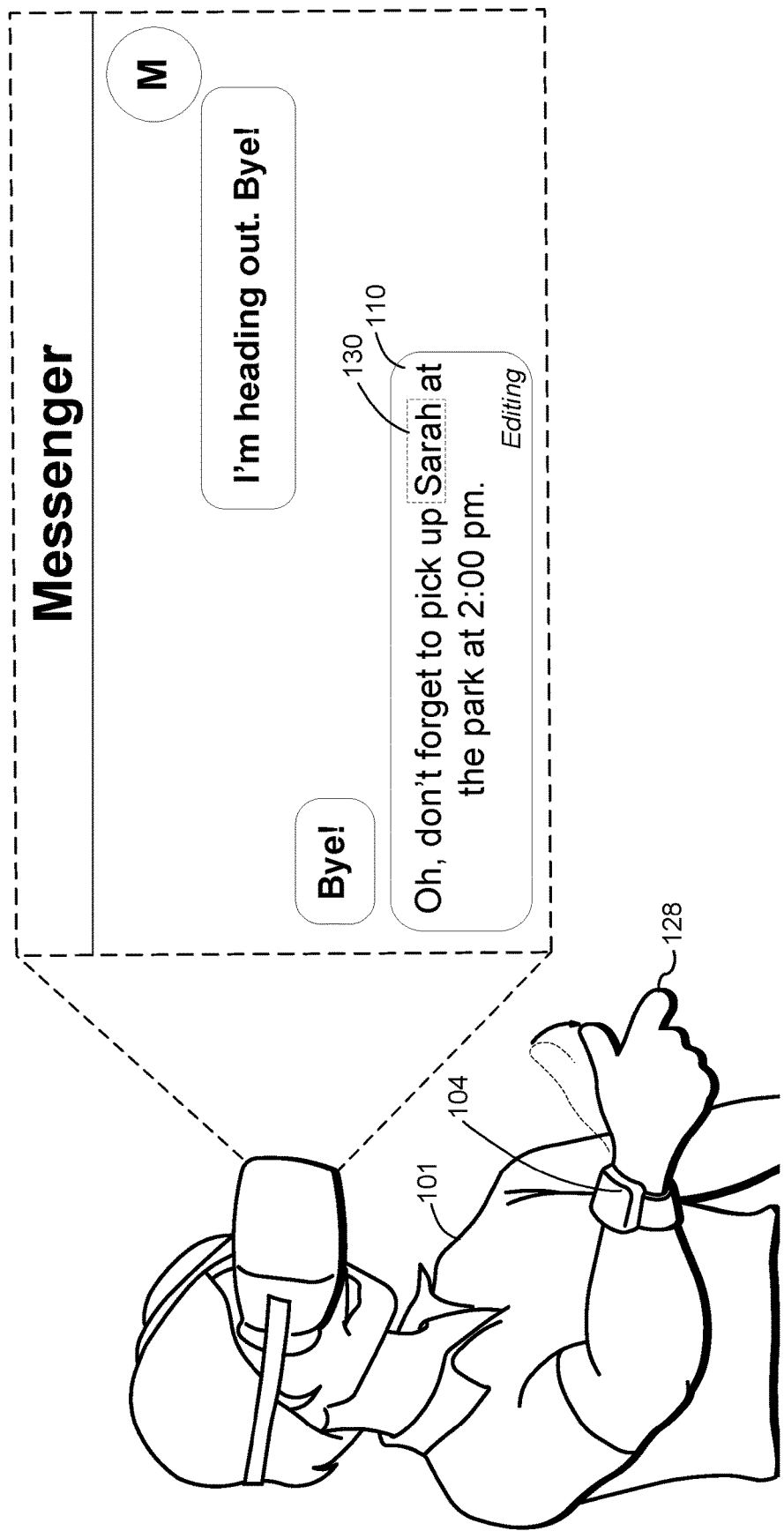

In FIG. 1C, the user 101 performs a gesture 128 (e.g., a thumb swipe gesture in which the user moves their thumb in a generally rightward direction across skin that is above a proximal phalange portion of the user's index finger) and the gesture is detected by the wrist-wearable device 104. FIG. 1C further shows emphasis in the draft message 110 moved to the term 130 ("Sarah") in accordance with the gesture 128 (as compared to what was shown in FIG. 1B, the gesture 128 can cause the emphasis to move from "forget" (as was shown in FIG. 1B) to "to" and then to "pick" and then to "up" before reaching "Sarah"). A speed associated with the gesture 128 can determine whether the emphasis moves across these other words or jumps directly to "Sarah" (e.g., if the gesture 128 is performed with a speed below a word-skipping threshold (e.g., a threshold of 50 cm/s, 20 cm/s, or 10 cm/s), then the gesture 128 would be interpreted to cause incremental movement of the emphasis across each word, whereas if the gesture 128 is performed with a speed that is above the word-skipping threshold, then the gesture 128 would be interpreted to cause movement of the emphasis directly to a proper noun in the sequence of words). The speed of the gesture 128 can be detected by processing the detected neuromuscular signals associated with performance of the gesture 128. In some embodiments, the gesture 128 corresponds to a gesture performed using a virtual directional pad (d-pad), which in this example is a swipe that moves in a rightward direction over the index finger to move the emphasis in the draft message 110 to the right, and other directional movements of the thumb detected over the skin that sits above the proximal phalange portion of the user's index finger would cause corresponding directional changes in the emphasis as it moves across the terms shown in draft message 110.

Figure 1D:
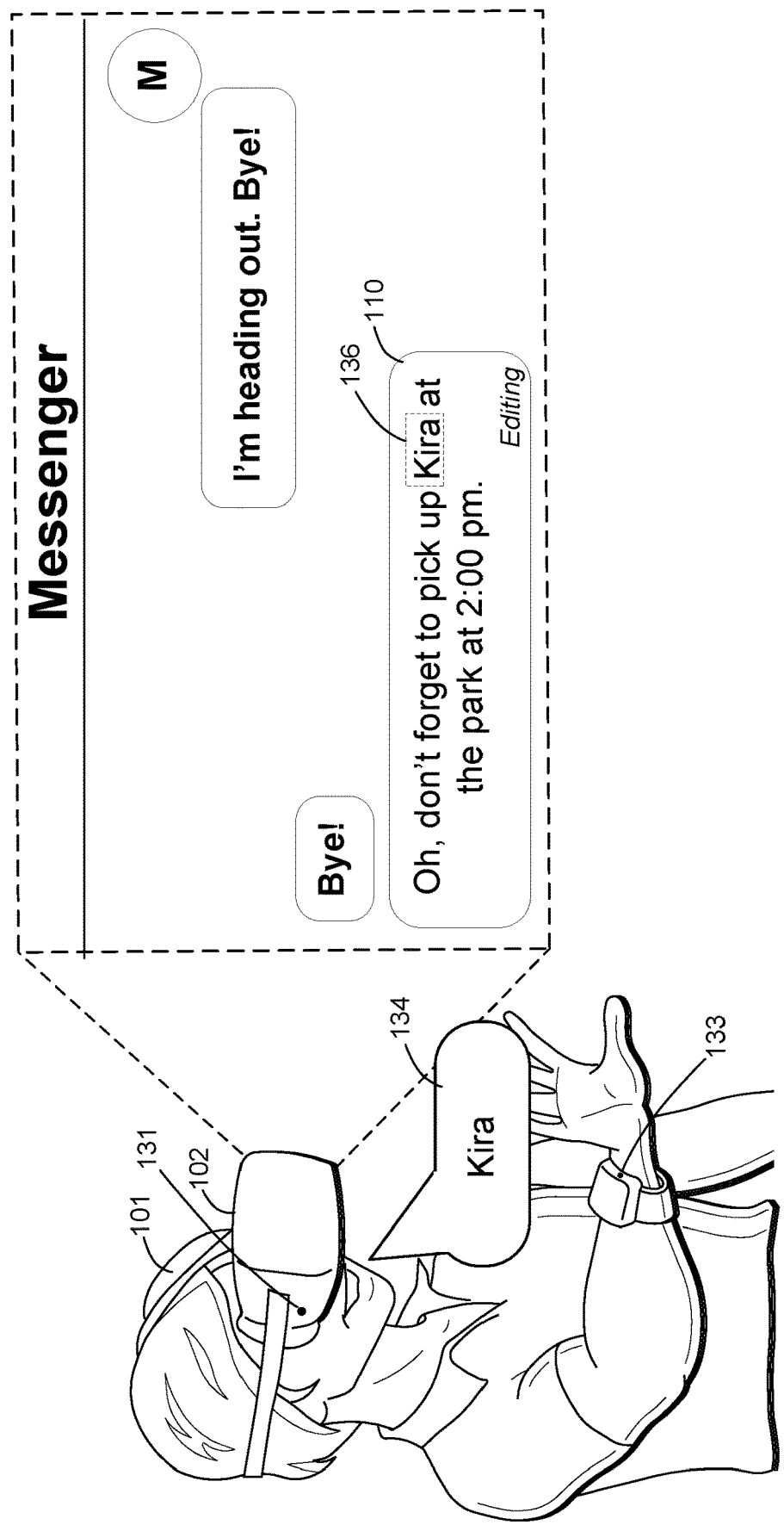

In FIG. 1D, the user 101 vocalizes a spoken replacement term 134 ("Kira") for the emphasized term 130 in FIG. 1C and the spoken replacement term 134 is detected by one or both of the head-mounted display device 102 and the wrist-wearable device 104. In accordance with some embodiments, the head-mounted display device 102 includes a microphone 131 to detect speech from the user 101. In accordance with some embodiments, the wrist-wearable device 104 includes a microphone 133 to detect speech from the user 101. FIG. 1D further shows the replacement term 136 ("Kira") inserted in the draft message 110 (and also illustrates that the previously emphasized term "Sarah" ceases to be displayed and the emphasis is now displayed over the replacement term 136) in accordance with the spoken replacement term 134.

Figure 1E:
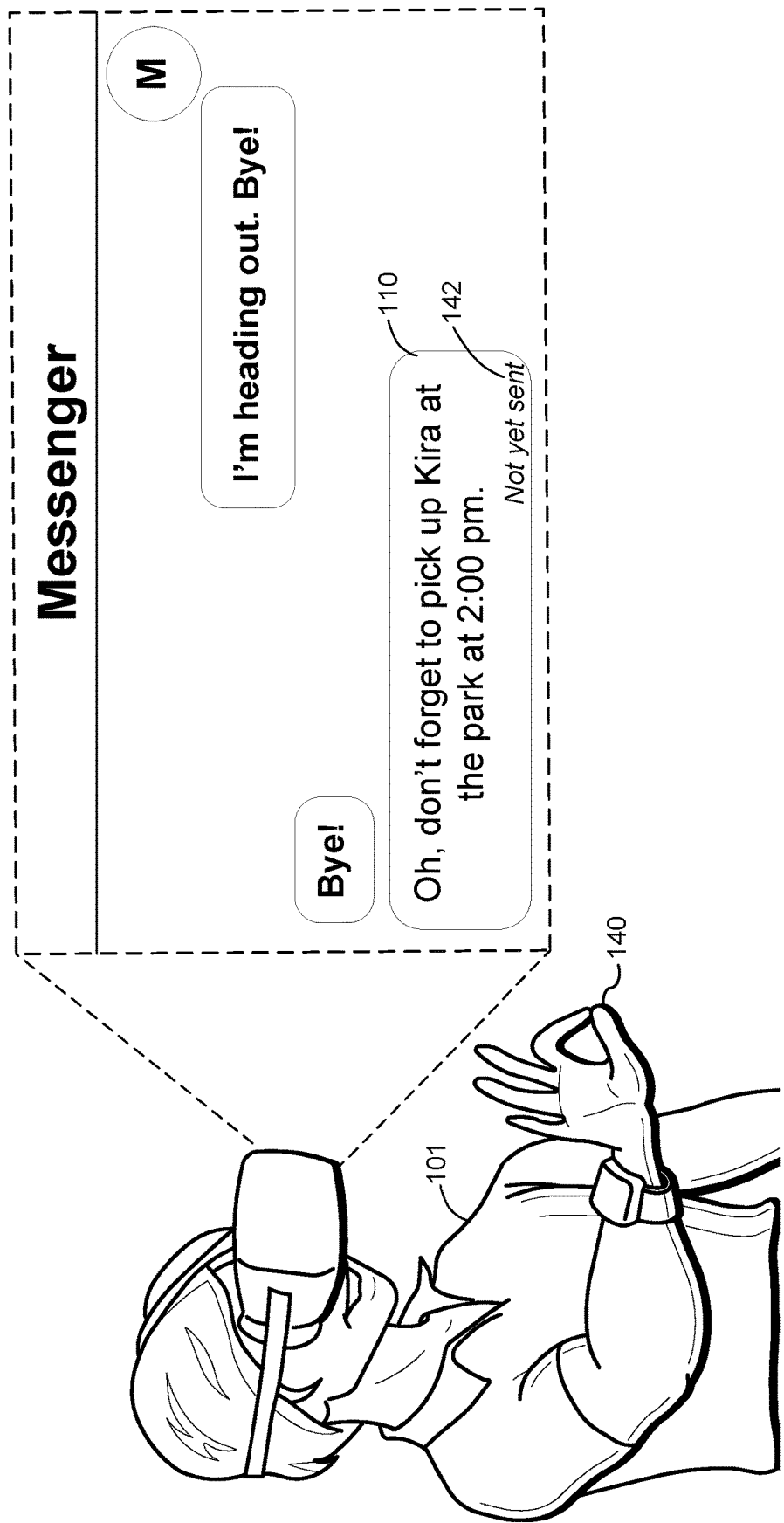

In FIG. 1E, the user 101 performs a gesture 140 (e.g., the thumb and index finger pinch gesture in which one or both of the user's thumb and index finger are moved to contact one another, e.g., the distal phalange portion of the thumb is made to contact the distal phalange portion of the index finger) and the gesture is detected by the wrist-wearable device 104 based at least in part on sensor data. In some embodiments, as is explained in greater detail below in reference to FIG. 7B, the sensor data is data from neuromuscular sensors. In some embodiments, cameras positioned on one or both of the wrist-wearable device and the head-mounted device can also provide data that is used to help detect the in-air gestures described herein. FIG. 1E further shows the messenger application 108 disabling the text-modification mode (and switching back/re-enabling to a text-review mode) in response to the user gesture 140, as denoted by the "Not yet sent" state indicator 142. In accordance with some embodiments, the draft message 110 in FIG. 1E does not have an emphasized term due to the text-modification mode being disabled (e.g., terms are not selected or emphasized while the text-modification mode is disabled, which can include disabling the sensors used for gaze-tracking purposes after an instruction is sent from the wrist-wearable device to the head-worn device to disable the sensors used for gaze tracking that are coupled with the head-worn device, and this disabling feature can help to preserve limited computing and power resources at the head-worn device while also helping to further a sustained user interaction with the messenger application that gracefully shifts between text-review and text-modification modes). In some embodiments, the gesture 140 is the same as the gesture 120, which means that in these embodiments the same gesture is used to both enable and then later disable the text-modification mode. In conjunction with these embodiments, once the text-modification mode is enabled for the messaging application, the gesture 120/140 is not used for any other purpose, which helps to further a sustained user interaction and improved man-machine interface as the gesture 120/140, as use of the same gesture for enabling and disabling the text-modification mode helps to avoid a situation in which a user unintentionally enables or disables the text-modification mode. To further this goal of avoiding unintentional activation or deactivation of the text-modification mode, the gesture 120/140 can also have an associated time component, e.g., the contact between the index finger and thumb must last for at least a gesture-activation time threshold (e.g., a value within the range of 10-20 ms) to then cause enabling or disabling of the text-modification mode. In addition to, or as an alternative to, use of the gesture-activation time threshold, the gesture 120/140 can involve the user's thumb making contact with a digit other than their index finger (e.g., pinky finger) as that gesture is less likely to be accidentally performed as compared to other gestures.

Figure 1F:
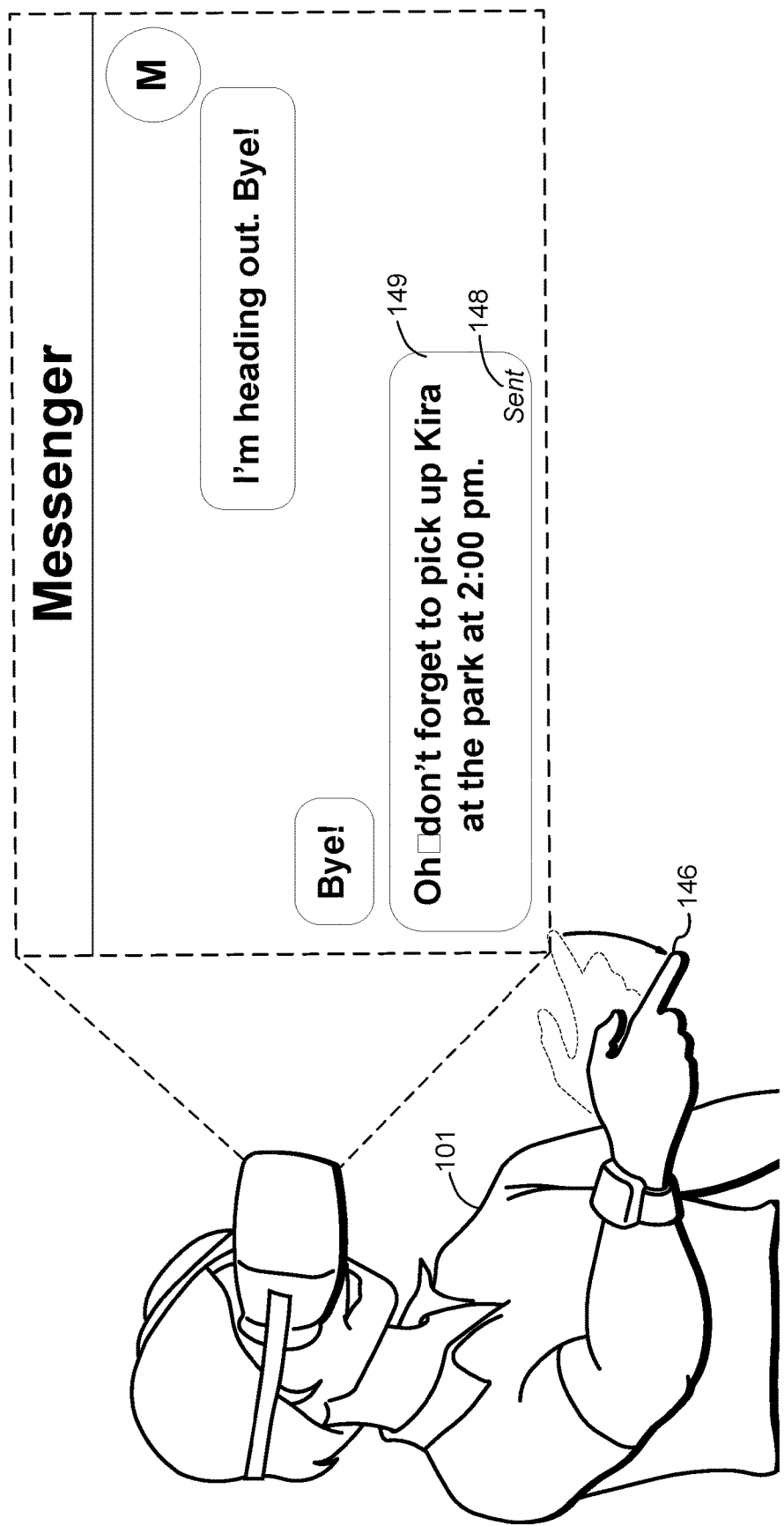

In FIG. 1F, the user 101 performs a gesture 146 (e.g., an index finger swipe) and the gesture is detected by the wrist-wearable device 104 based on sensor data. In some embodiments, the gesture 146 is an index finger flick gesture in which the user performs a motor action that causes the index finger to move across a medial and/or proximal phalange portion of the thumb toward a distal phalange portion of the thumb quickly in a flicking action away from the user's body. FIG. 1F further shows the messenger application 108 causing the sending of the message 149 to the person "M" in response to detecting the gesture 146, as denoted by the "Sent" state indicator 148. In accordance with some embodiments, the message 149 in FIG. 1F is visually distinct from the draft message 110 in FIG. 1E to denote that it has been sent to the person "M." In some embodiments, the gesture 146 is a multipart gesture, such as a double swipe or flick gesture, in which the user performs the gesture 146 twice in succession (e.g., within a short period of time such as within 10 milliseconds, 100 milliseconds, or 1 second). In some embodiments, the multipart gesture is a combination of two or more gestures such as a flick-then-pinch gesture, in which the user performs the gesture 146 followed by a middle finger and thumb pinch gesture (e.g., within a short period of time such as within 10 milliseconds, 100 milliseconds, or 1 second). In some embodiments, the gesture 146 is a multipart gesture so as to reduce or prevent accidental sending of draft messages. In some embodiments, a prompt is displayed (e.g., at the head-mounted display device 102 or the wrist-wearable device 104) to the user to allow them to confirm their intention to send the draft message 110 before the sending occurs.

Figure 2A:
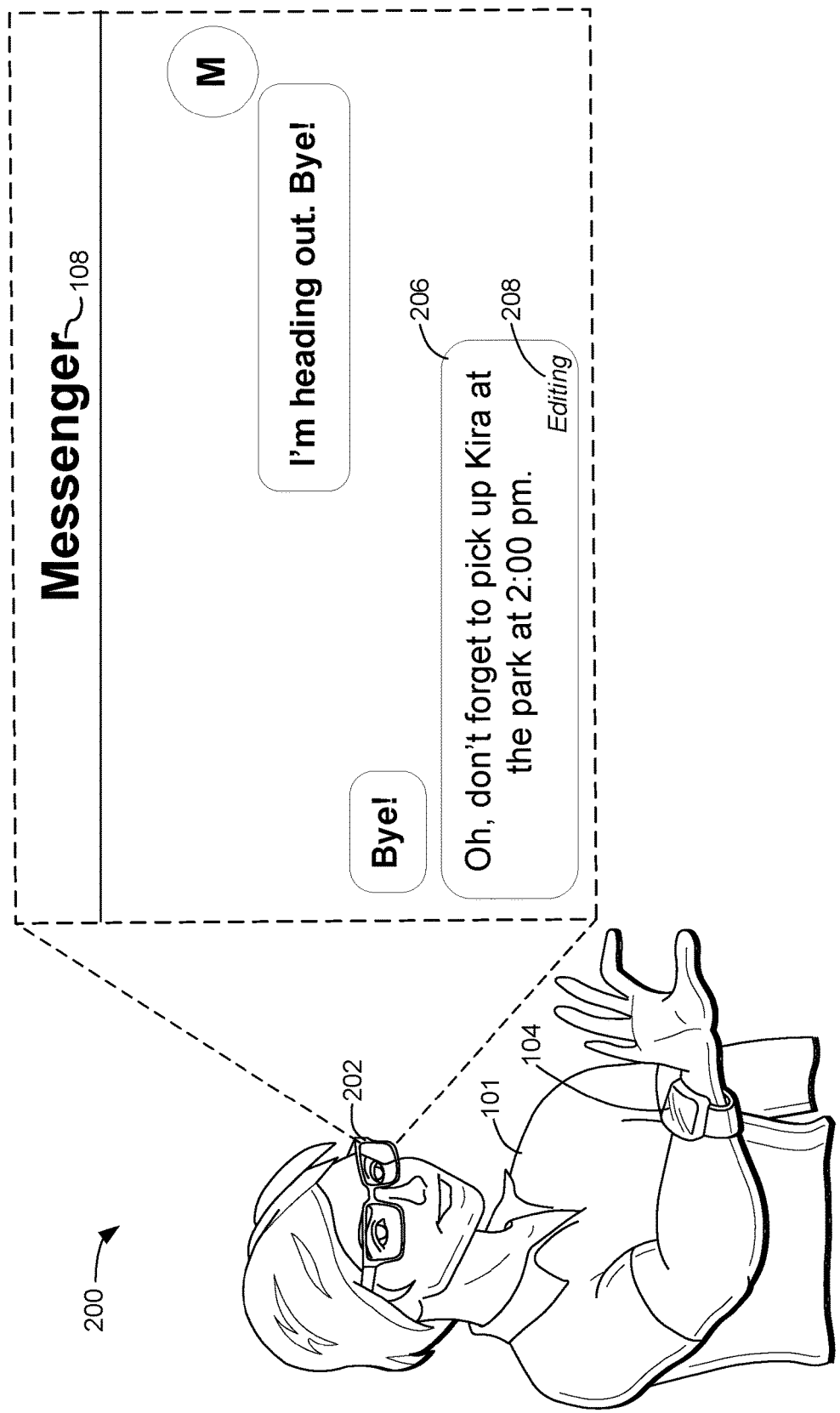
FIGS. 2A-2G illustrate an example user scenario with an artificial-reality system (e.g., including at least augmented-reality (AR) glasses and a wrist-wearable device) in accordance with some embodiments.

FIGS. 2A-2G illustrate another example user scenario with an artificial-reality system 200 (e.g., including at least AR glasses and a wrist-wearable device) in accordance with some embodiments. The artificial-reality system 200 includes AR glasses 202 and the wrist-wearable device 104. The user 101 in FIG. 2A is viewing a scene with the messenger application 108 displayed using the AR glasses 202 (the depicted scene can be superimposed, e.g., using a heads-up display of the AR glasses 202, on top of physical aspects of the user's reality, such as superimposed on top of a physical table or a wall within the user's house or office space). The messenger application 108 includes multiple messages between the user 101 and a person "M." In the example of FIG. 2A, the user is editing a draft message 206, as denoted by the "Editing" state indicator 208.

Figure 2B:
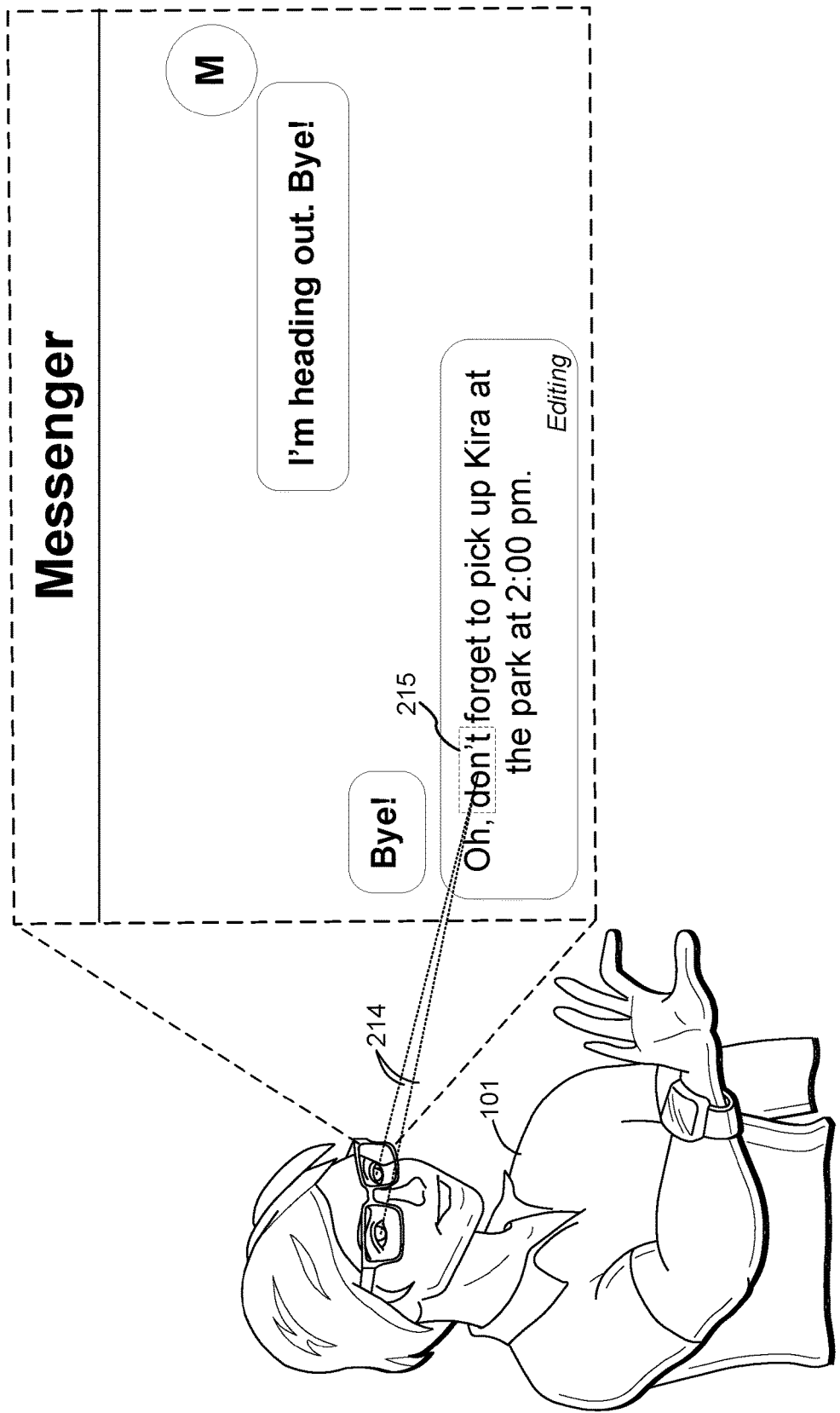

FIG. 2B shows the user 101 looking at the term 215 ("don't") and gaze tracking is being performed by the AR glasses 202, where the user's gaze in the depicted example is denoted by the gaze lines 214. In some embodiments, the gaze tracking is performed using one or more eye-tracking cameras of the AR glasses 202. FIG. 2B further shows the term 215 emphasized (e.g., denoted in this example by the box-shaped dashed lines) in accordance with the gaze tracking. In some embodiments, the gaze tracking is enabled at the AR glasses 202 in accordance with the text-modification mode being enabled. In some embodiments, the gaze tracking is disabled in accordance with the text-modification mode being disabled. In some embodiments, rather than identify a specific term for emphasis, the gaze tracking can be used to identify a region of text to which the user's gaze is directed (e.g., multiple terms receive the emphasis rather than a single term). In still other embodiments, gaze tracking can be replaced (or supplemented) by use of the d-pad gestures described earlier in which movement of the user's thumb in various directions over the skin that sits above the proximal phalange portion of the user's index finger cause a corresponding directional change to move the emphasis between terms in the message that is being composed.

Figure 2C:
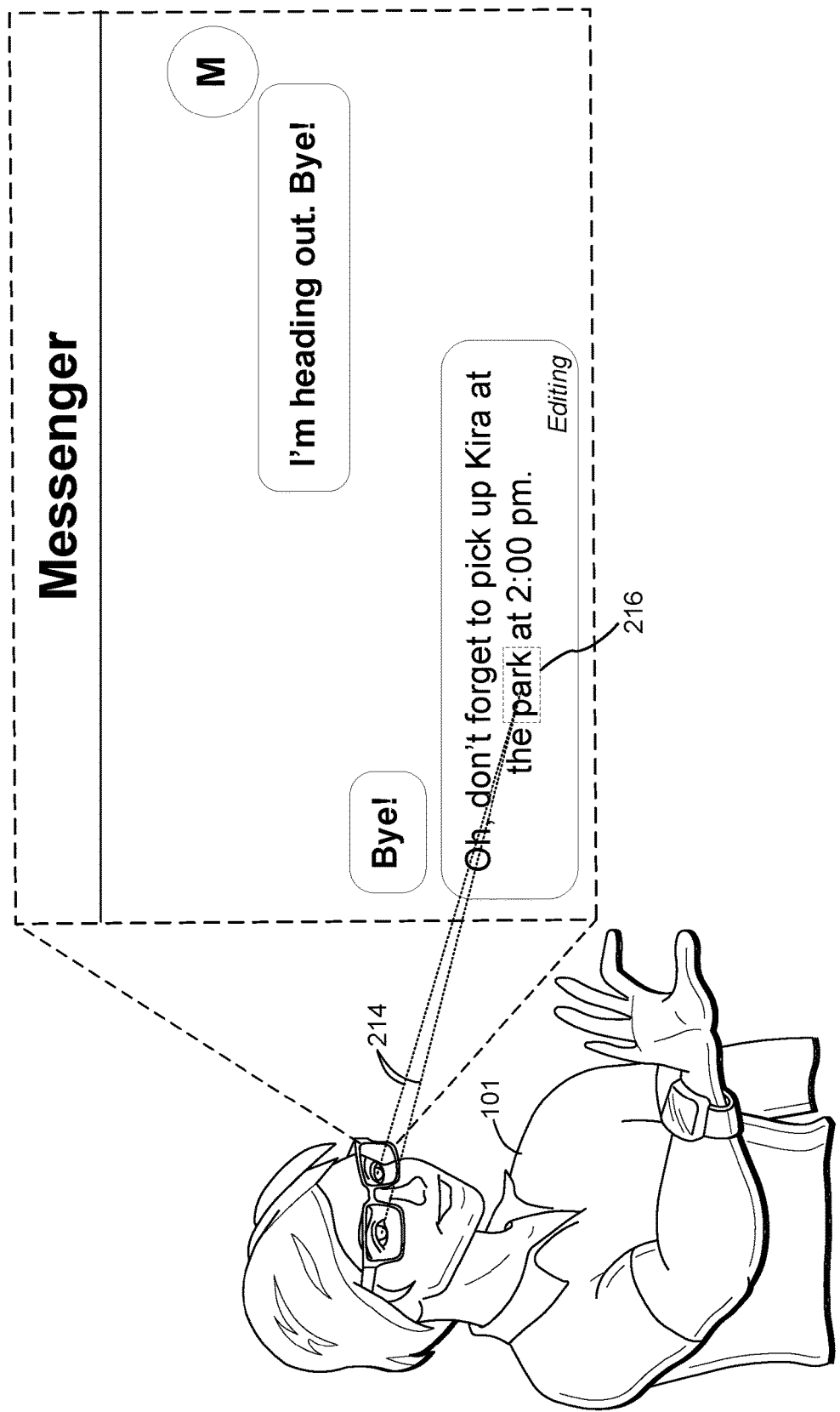

FIG. 2C shows the user 101 shifting their gaze to the term 216 ("park") and gaze tracking being performed by a component (e.g., eye-tracking camera(s)) associated and/or coupled with the AR glasses 202, denoted by the gaze lines 214. FIG. 2C further shows the term 216 emphasized (e.g., denoted in this example by the box-shaped dashed lines) in accordance with the gaze tracking.

Figure 2D:
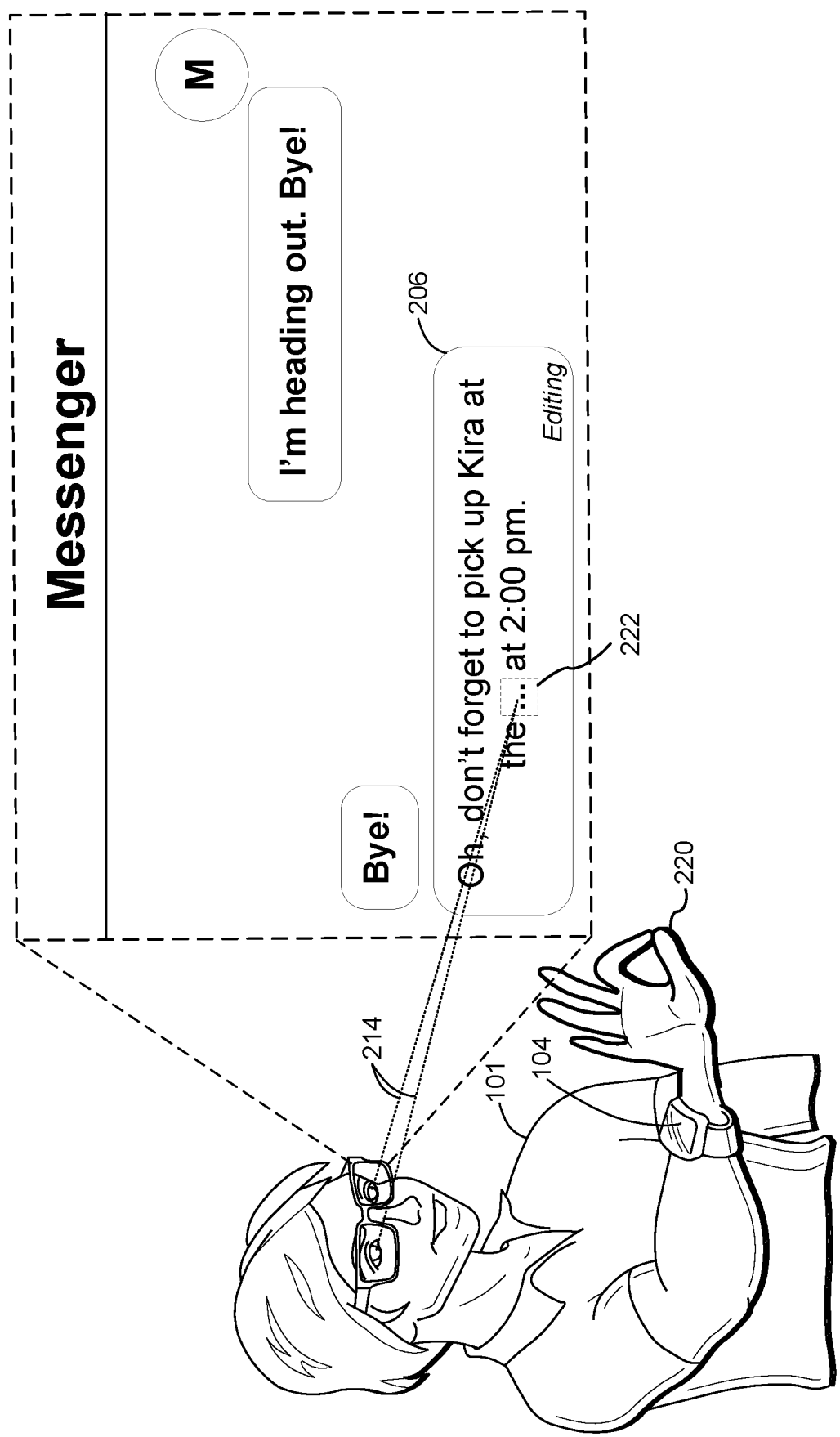

In FIG. 2D, the user 101 performs a gesture 220 (e.g., a thumb-and-index-finger pinch gesture, which is analogous to the gesture 120 described earlier, so those descriptions apply to the gesture 220 as well) and the gesture is detected by the wrist-wearable device 104. In accordance with some embodiments, the gesture 220 corresponds to a term-selection operation, and FIG. 2D further shows the emphasized term 216 from FIG. 2C selected in accordance with the gesture 220 (e.g., replaced with the ellipsis in box-shaped dashed lines 222 indicating that the system is ready to receive a replacement from the user 101). Thus, in the embodiments illustrated in the FIG. 2 series, the thumb and index finger pinch gesture corresponds to a different operation than in the embodiments illustrated in the FIG. 1 series. The thumb and index finger pinch gesture is an illustrative example of a gesture. In embodiments that encompass both the FIG. 1 and FIG. 2 series, a separate gesture can be used for the term-selection operation (e.g., an index finger tap to the user's palm) to distinguish it from the gesture used to enter/exit the text-modification mode (e.g., the thumb and index finger pinch gesture).

A similar replacement indication can also be presented in the sequence between FIGS. 1C and 1D when the user is going through the process of replacing the term "Sarah" with the term "Kira." In some embodiments, in addition to the term-selection operation causing the selected term to cease being displayed and to display a replacement indication (e.g., the ellipsis), the term-selection operation can also cause the gaze tracking (for embodiments in which gaze tracking is utilized) to be temporarily disabled.

Figure 2E:
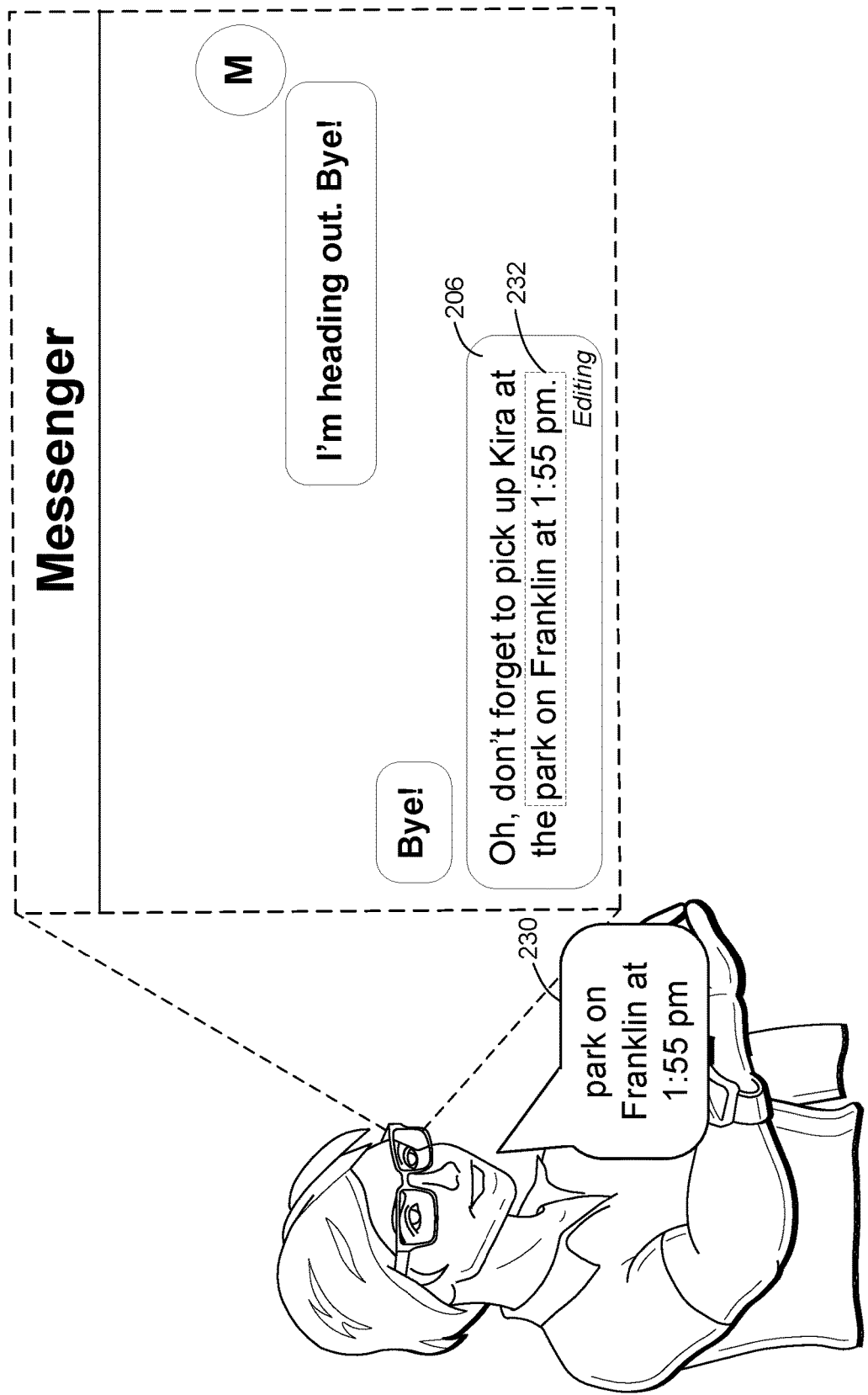

In FIG. 2E, the user 101 says a replacement phrase 230 ("park on Franklin at 1:55 pm") and the replacement phrase 230 is detected by the AR glasses 202 and/or the wrist-wearable device 104. In accordance with some embodiments, the AR glasses 202 include a microphone to detect speech from the user 101. FIG. 2E further shows the replacement phrase 232 ("park on Franklin at 1:55 pm") inserted in the draft message 206 in accordance with the spoken replacement phrase 230. In the example of FIGS. 2D and 2E, the selected term represents a first term ("park") for the replacement phrase 230. In some embodiments, the selected term represents a term not changed in the replacement phrase for the artificial-reality system 200 (e.g., the messenger application 108). For example, the selected term may be "park" and the replacement phrase may be "Franklin Street park." In some embodiments, the selected term 222 represents a term to be replaced in the replacement phrase 230. For example, a message may include "pick up Susan" and the selected term may be "Susan" with the replacement phrase being "pick up Kira." In some embodiments, the replacement phrase or term is only detected while the gesture 220 is maintained, e.g., the microphone(s) of the AR glasses 202 and/or the wrist-wearable device 104 are activated while the gesture is maintained to allow for detecting the replacement phrase or term, and the microphone(s) are deactivated once the gesture 220 is released.

Figure 2F:
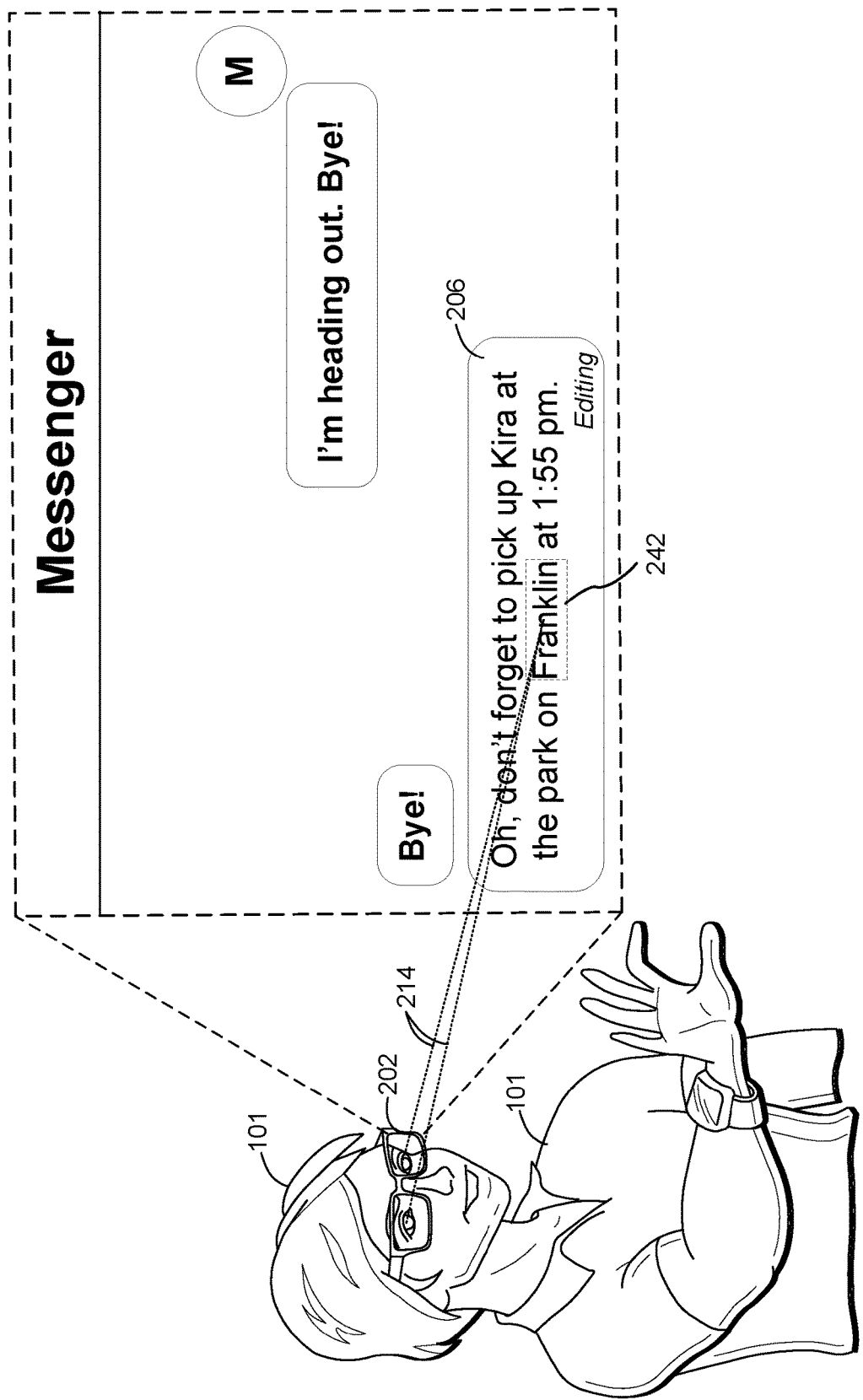

FIG. 2F shows the user 101 looking at the term 242 ("Franklin") and gaze tracking being performed by the AR glasses 202, denoted by the gaze lines 214. FIG. 2B further shows the term 242 emphasized (e.g., boxed by dashed lines, which can represent any number of emphasis techniques including color changes, highlighting, and/or an increase in text size) in accordance with the gaze tracking. As was mentioned earlier, for embodiments that do not use gaze tracking (e.g., have gaze tracking disabled or do not have gaze-tracking hardware at all), the user can perform the d-pad gesture to cause directional movements to select different terms and cause the emphasis to move according to those directional movements.

Figure 2G:
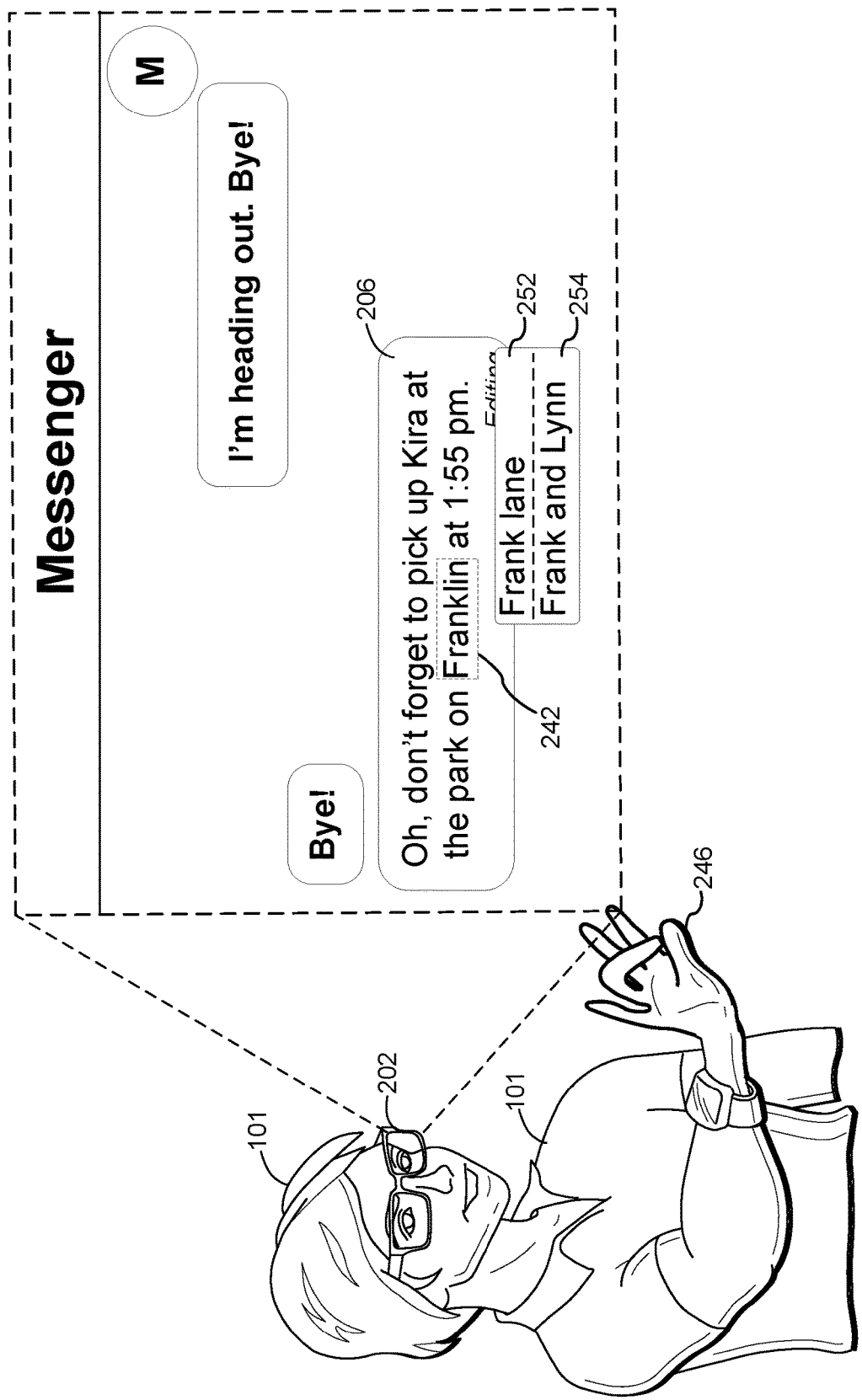

In FIG. 2G, the user 101 performs a gesture 246 (e.g., a thumb and ring finger pinch gesture in which one or both of the thumb and ring finger are moved to contact one another) and the gesture is detected by the wrist-wearable device 104. In accordance with some embodiments, the gesture 246 corresponds to a replacement-menu operation and FIG. 2G further shows replacement terms 252 and 254 displayed for the emphasized term 242 in response to the gesture 246. In some embodiments, the replacement terms are selected for display based on a language model (e.g., a language model executing on the wrist-wearable device 104). While not illustrated, selection of options from among the replacement terms 252 and 254 can be performed by using the d-pad gesture or by using gaze tracking, or by using a combination of both techniques. As is also clear from the depicted examples, the gesture 246 is a different in-air hand gesture as compared to the gesture 220 (described above in reference to FIG. 2D), so the gesture 220 can be referred to as a first in-air hand gesture and the gesture 246 can be referred to as a second in-air hand gesture that is distinct from the first in-air hand gesture. The illustrated example gestures 220 and 246 are examples, and other in-air hand gestures can also be suitable while still ensuring that the two in-air hand gestures are distinct from one another to ensure sustained user interactions.

Figure 3A:
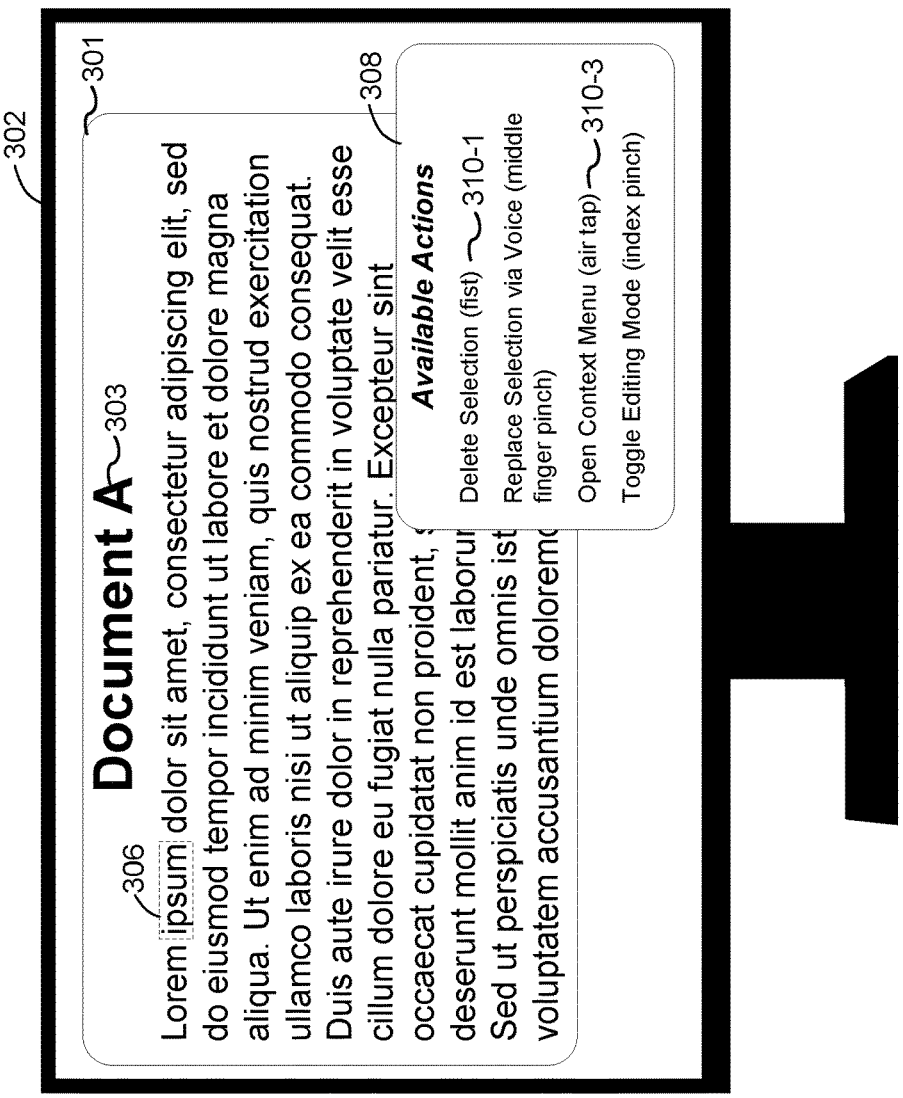
FIGS. 3A-3H illustrate an example user scenario in which in-air hand gestures detected via a wearable device are used for document-manipulation purposes at a computing device in accordance with some embodiments.
Figure 3A:

The examples of the sequences shown in the FIGS. 1 and 2 series have focused on use of a messaging application, but the techniques described herein have a broader applicability beyond just messaging applications. For instance, the techniques described herein apply to any application in which text needs to be selected and modified, including document-editing applications. The FIG. 3 sequence, which will be discussed next, provides a more specific example of using these techniques for document-editing applications. More specifically, FIGS. 3A-3H illustrate an example user scenario in which in-air hand gestures detected via a wearable device are used for document-manipulation purposes at a computing device in accordance with some embodiments. FIG. 3A shows the user 101 with the wrist-wearable device 104 and a display 302 in communication (either a direct wired or wireless communication link between the two devices or one in which an intermediary device is used to communicably connect the two devices) with the wrist-wearable device 104. FIG. 3A further shows a document-editing application (e.g., in the illustrated example, the document-edition application is a word-processing application 301) displaying a document 303 on the display 302. FIG. 3A also shows a selected term 306 (denoted by the dashed-line box around it) in the document 303 (the term can be selected in accordance with any of the techniques discussed earlier in reference to the sequences in the series of FIGS. 1 and 2) and an actions menu 308. The actions menu 308 includes a plurality of actions 310, including an action 310-1 to delete the selected term 306 and an action 310-3 to open a context menu. In some embodiments, the actions menu 308 is displayed automatically (e.g., without requiring a specific user input to activate display), for example, is displayed continuously or displayed after a set amount of time from receiving a user input (e.g., 1 second, 5 seconds, or 20 seconds). In some embodiments, the actions menu 308 is displayed in response to detection of a user gesture, such as a middle finger to palm tap gesture (where the user moves their middle finger inward to contact a portion of the user's palm). In some embodiments, the actions menu 308 is displayed in response to a voice command or other type of user input. In some embodiments, whether the actions menu 308 is displayed is dictated by a user setting (e.g., a user setting associated with the word-processing application 301 and/or the wrist-wearable device 104).

In accordance with some embodiments, each action 310 in the actions menu 308 includes an indication of a corresponding gesture to be performed by the user 101 to cause performance of a respective action. For example, the delete action 310-1 is caused to be performed after detection of a fist gesture (e.g., a gesture in which the user moves all of their digits to create a fist with their hand) and the context menu action 310-3 is caused to be performed after detection of an air tap gesture (e.g., a gesture in which one of the user's digits is moved in a generally downward direction to tap within free space). In accordance with some embodiments, the word-processing application 301 is in a text-modification mode (which can be activated in accordance with any of the techniques described above in reference to the FIGS. 1 and 2 series) as denoted by the emphasis around selected term 306. Display of available gestures and their associations with particular actions can also occur at any time while the text-modification mode is activated, and this applies to the enabled text-modification modes depicted in the other figure sequences as well (e.g., with the messaging application, indications of available in-air hand gesture options can be presented to the user, which helps to assist with user adoption and learning of a new gesture space, thereby furthering the ability of users to have a sustained user interaction).

Figure 3B:
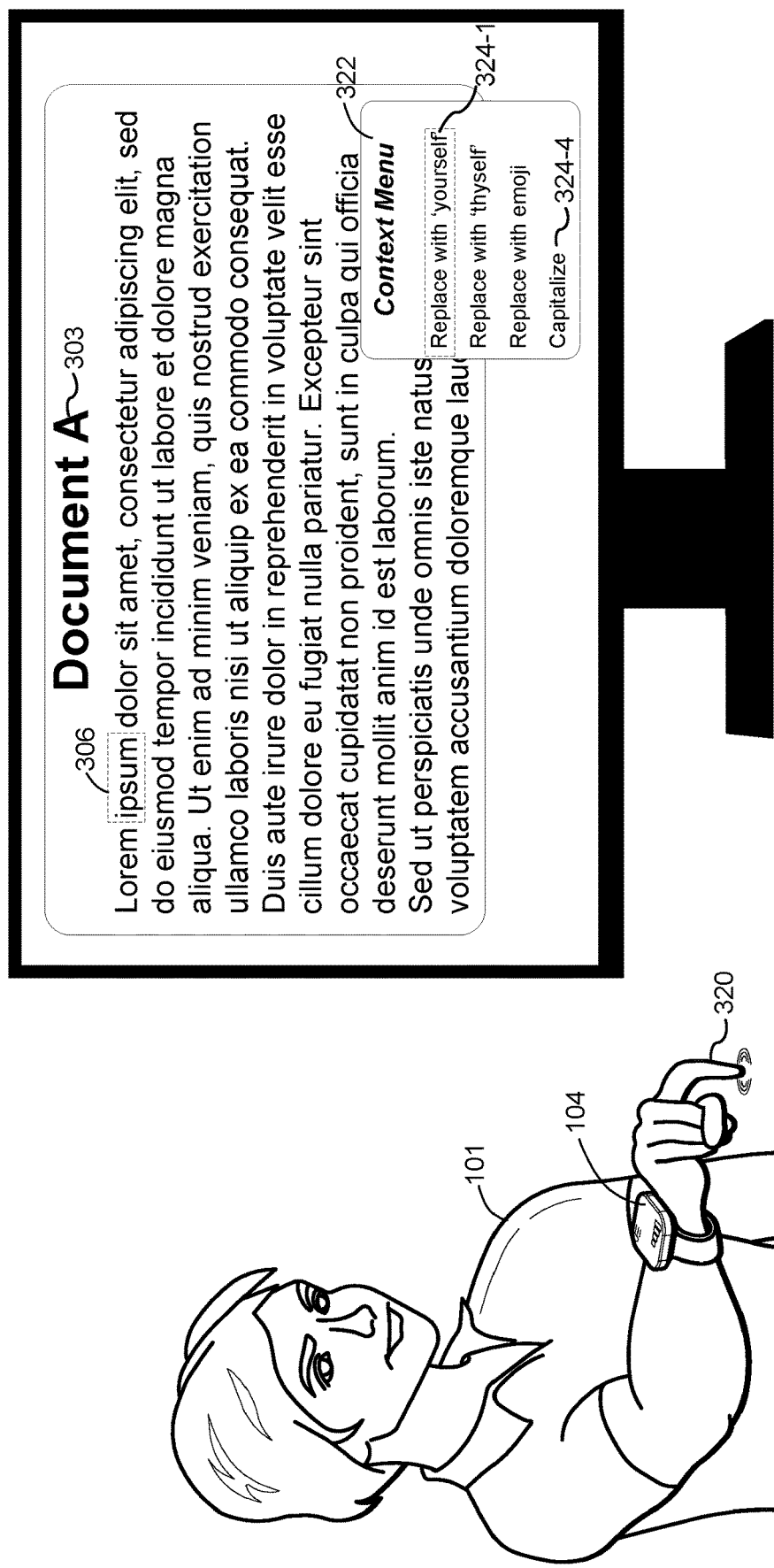

In FIG. 3B, the user 101 performs a gesture 320 (e.g., an index finger air tap gesture) and the gesture is detected by the wrist-wearable device 104. As shown in FIG. 3A, the gesture 320 corresponds to the action 310-3, so detection of the air tap shown in FIG. 3B causes opening of the context menu 322. Accordingly, in response to detecting a respective in-air hand gesture (in this example, the air tap of FIG. 3B) that causes performance of a respective action (in this example, opening a context menu), FIG. 3B shows performance of that respective action (e.g., opening a context menu 322 including a plurality of options 324, including a replacement option 324-1 and a capitalization option 324-4). In accordance with some embodiments, the context menu 322 in FIG. 3B includes options that are appropriately selected based on the selected term 306 and the context surrounding it (e.g., terms near the selected term). In some embodiments, the user can select an option 324 via gaze tracking and/or d-pad thumb movements (e.g., as described previously with respect to FIG. 1C). In some embodiments, the user can activate the selected option by performing a corresponding gesture (e.g., repeating the index finger air tap gesture 320 or performing a middle finger air tap gesture).

Figure 3C:
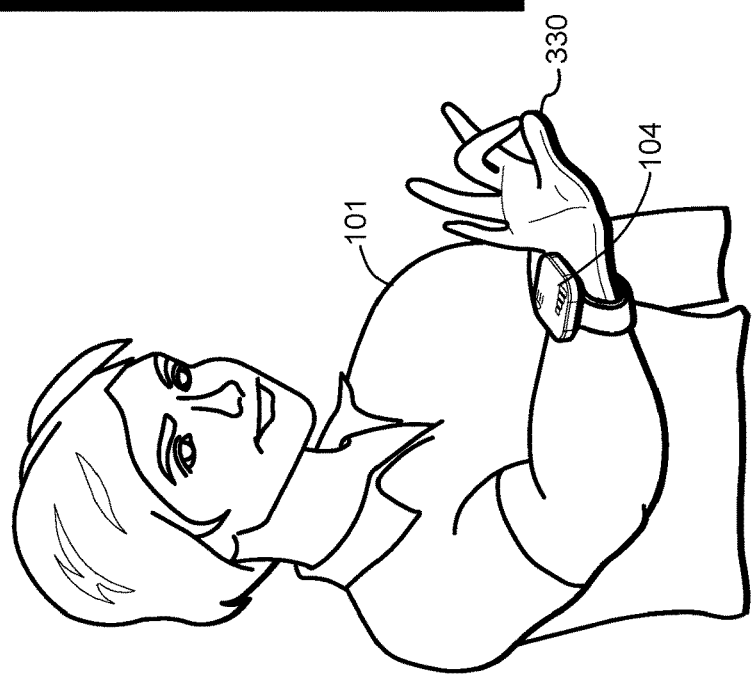

In FIG. 3C, the user 101 performs a gesture 330 (e.g., a thumb and middle finger pinch gesture) and the gesture is detected by the wrist-wearable device 104. In accordance with some embodiments, the gesture 330 corresponds to a close operation and accordingly the context menu 322 from FIG. 3B is closed in FIG. 3C. In some embodiments, the gesture 330 is a state-agnostic gesture (e.g., performs a close operation regardless of the active state of the word-processing application 301).

Figure 3D:
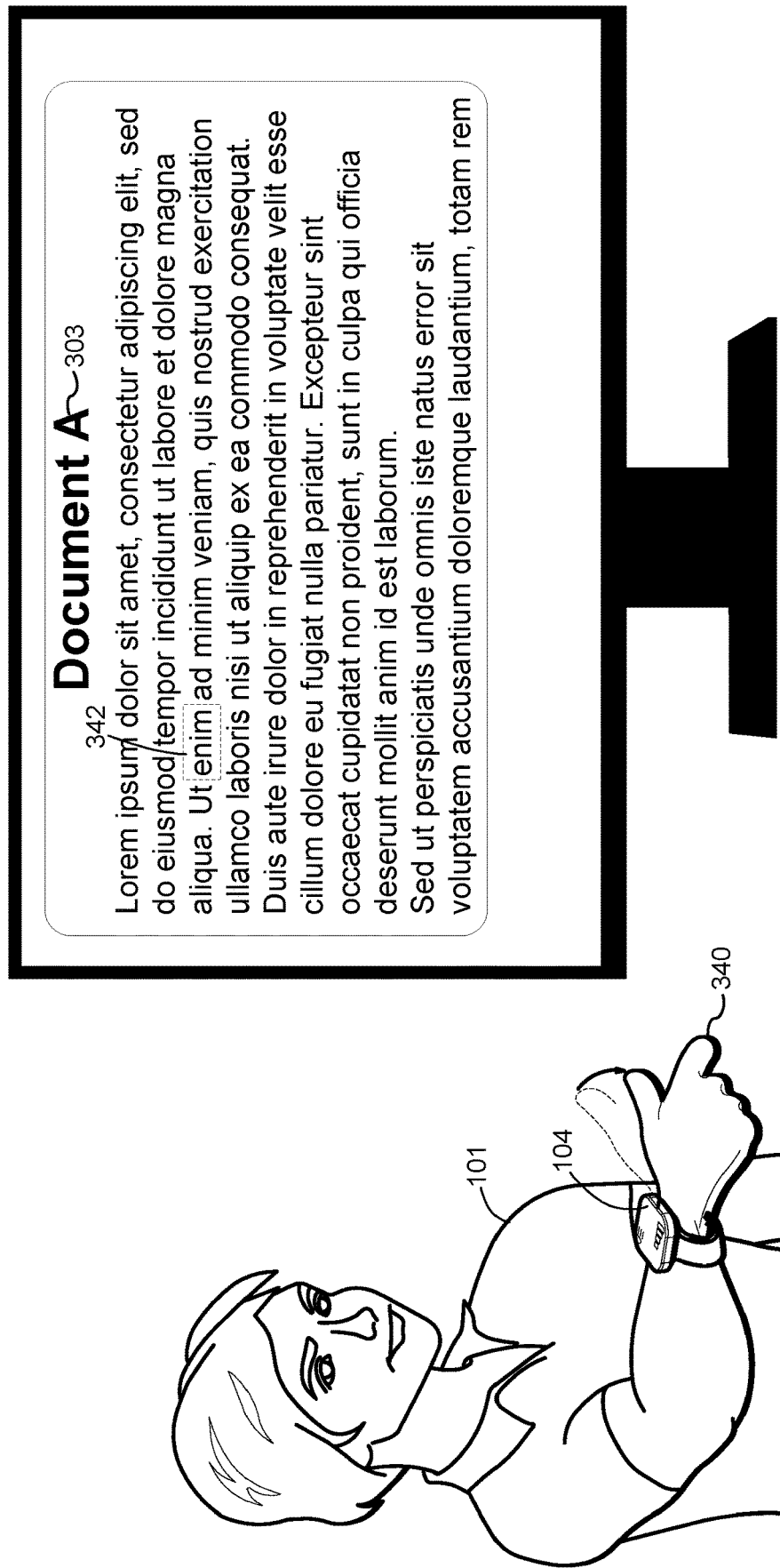

In FIG. 3D, the user 101 performs a gesture 340 (e.g., a thumb swipe gesture that moves directionally on top of skin that is over a proximal phalange portion of the user's index finger) and the gesture is detected by the wrist-wearable device 104. FIG. 3D further shows emphasis in the document 303 moved to a new selected term 342 ("enim") in accordance with directional movement indicated by the gesture 340. In some embodiments, the gesture 340 corresponds to a gesture performed using a virtual directional pad (d-pad) and is a down swipe (e.g., a swipe of the user's thumb that moves in a generally downward direction over the skin that is over the proximal phalange portion of the user's index finger such that the thumb is moved toward the user's body) to move the emphasis in the document 303 down from the term 306 in FIG. 3C to the term 342 in FIG. 3D. As explained previously, a speed associated with the thumb swipe gesture can be used to determine whether the emphasis moves gradually between different intervening terms or whether the emphasis jumps to the new selected term 342 without emphasizing any intervening terms.

Figure 3E:
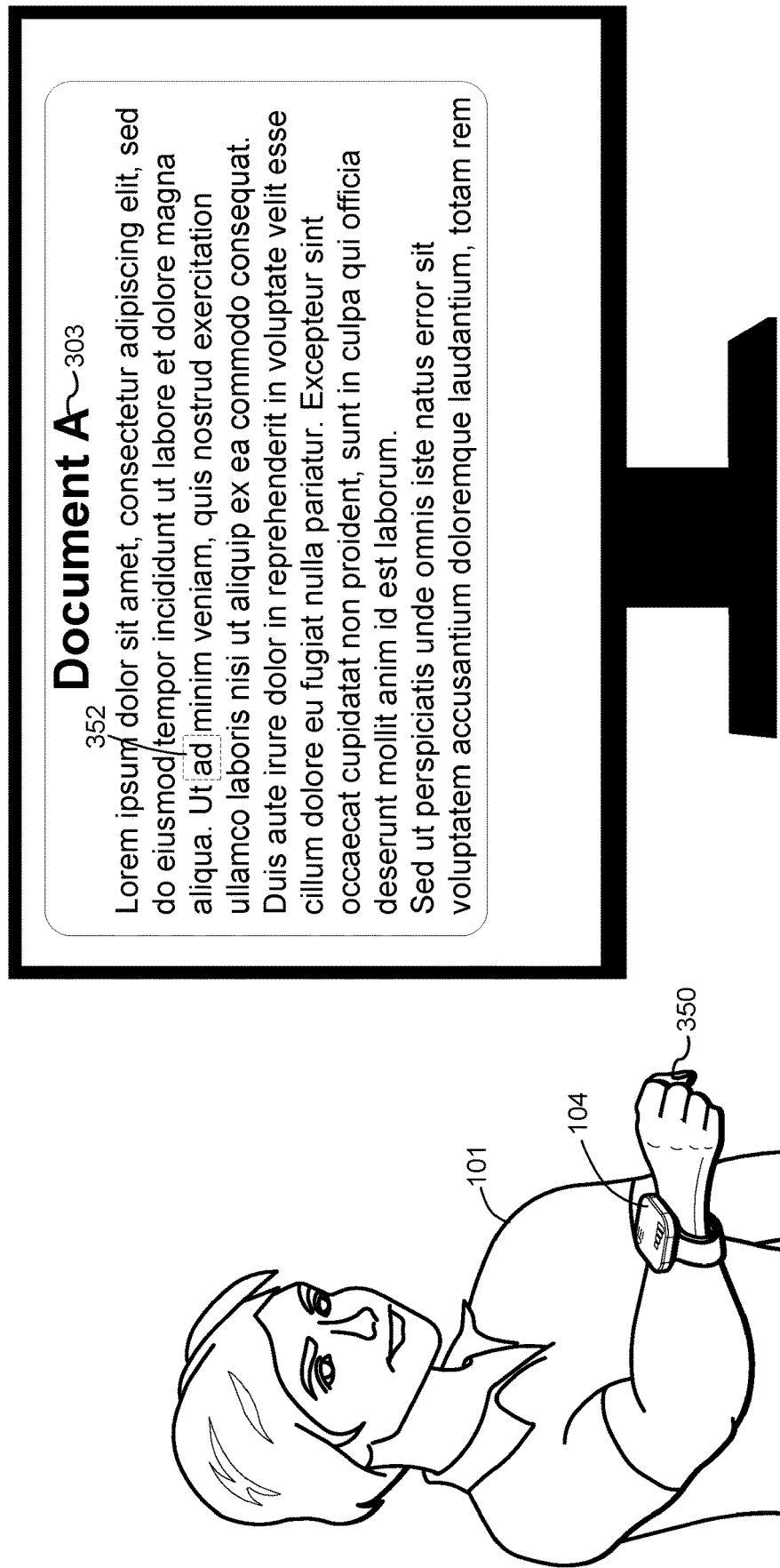

In FIG. 3E, the user 101 performs a gesture 350 (e.g., a fist/fist-closure gesture) and the gesture is detected by the wrist-wearable device 104. In accordance with some embodiments, the gesture 350 corresponds to a "delete" operation and accordingly the emphasized term 342 in FIG. 3D is deleted in FIG. 3E. FIG. 3E further shows a term adjacent to the deleted term 342 being selected as the next selected term 352 now that the new selected term 342 has been deleted. In some embodiments, detection of the gesture associated with the "delete" operation also causes the system to exit the text-modification mode, such that no term is selected as the next selected term and instead the emphasis is ceased to be displayed and the system returns to a text-review mode.

Figure 3F:
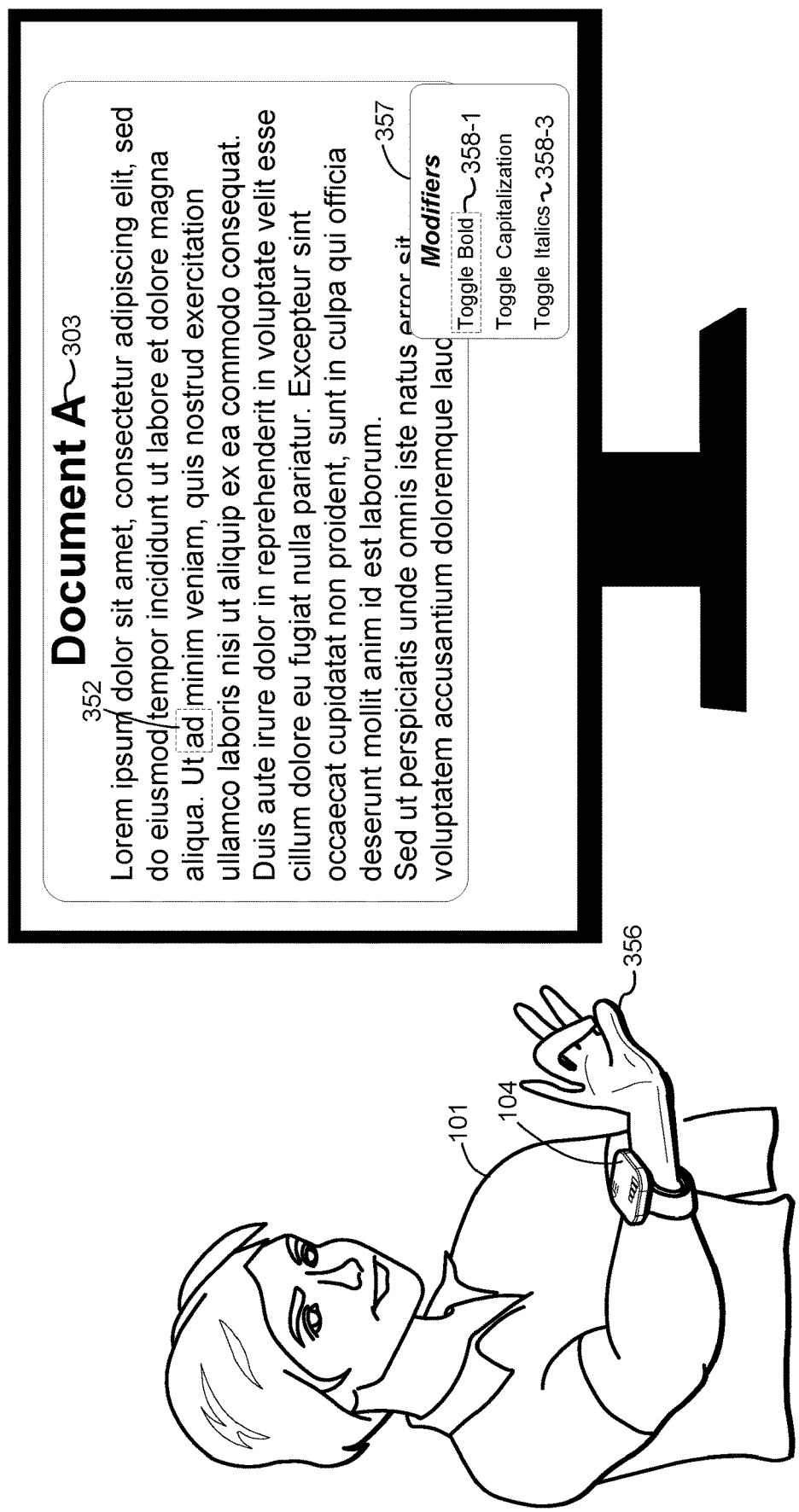

In FIG. 3F, the user 101 performs a gesture 356 (e.g., a thumb and ring finger pinch gesture) and the gesture is detected by the wrist-wearable device 104. In accordance with some embodiments, the gesture 356 corresponds to an operation for opening a modifier menu, and accordingly the modifier menu 357 is displayed in FIG. 3F. As with the other gestures shown in the figures, the thumb and ring finger pinch gesture shown in FIG. 3F is an illustrative example gesture for opening a modifier menu, and other gestures can be used instead. In embodiments that include functionality for opening multiple menus (e.g., the modifier menu 357, the actions menu 308, and/or the context menu 322), a distinct gesture can be assigned to each menu so as to avoid user confusion and unintentional activations. For example, a pinch gesture can correspond to opening the actions menu 308, an air tap gesture can correspond to opening the context menu 322, and a palm tap gesture can correspond to opening the actions menu 308. In accordance with some embodiments, the modifier menu 357 in FIG. 3F includes a plurality of modification options 358, including an option 358-1 to toggle bold text and an option 358-3 to toggle italicized text.

Figure 3G:
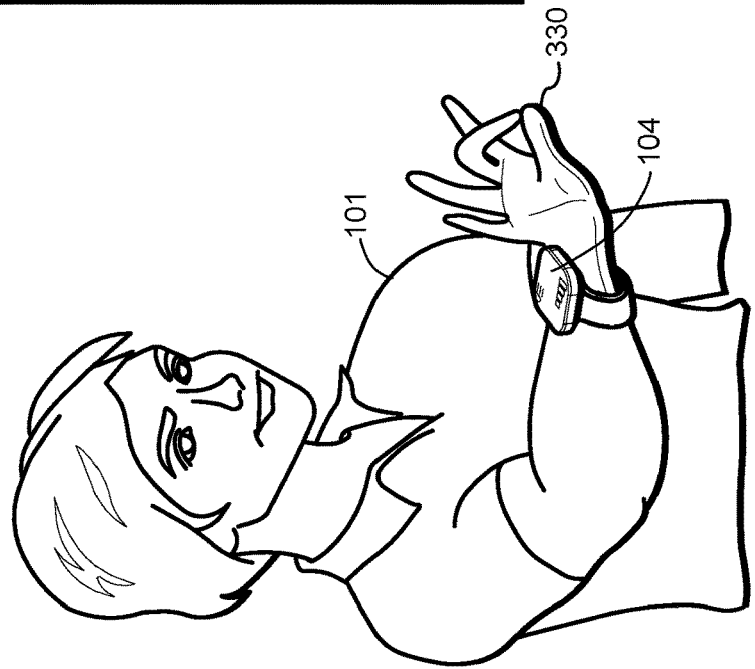
Figure 3G:

In FIG. 3G, the user 101 performs the gesture 330 (e.g., the thumb and middle finger pinch gesture) and the gesture is detected by the wrist-wearable device 104. In accordance with some embodiments, the gesture 330 corresponds to the "close" operation and accordingly the modifier menu 357 from FIG. 3F is closed in FIG. 3G. As was previously mentioned, the gesture to activate the close operation can be context-agnostic such that the same in-air hand gesture can be used to close multiple different types of user interface elements, including the modifier menu 357 and the context menu 322.

Figure 3H:
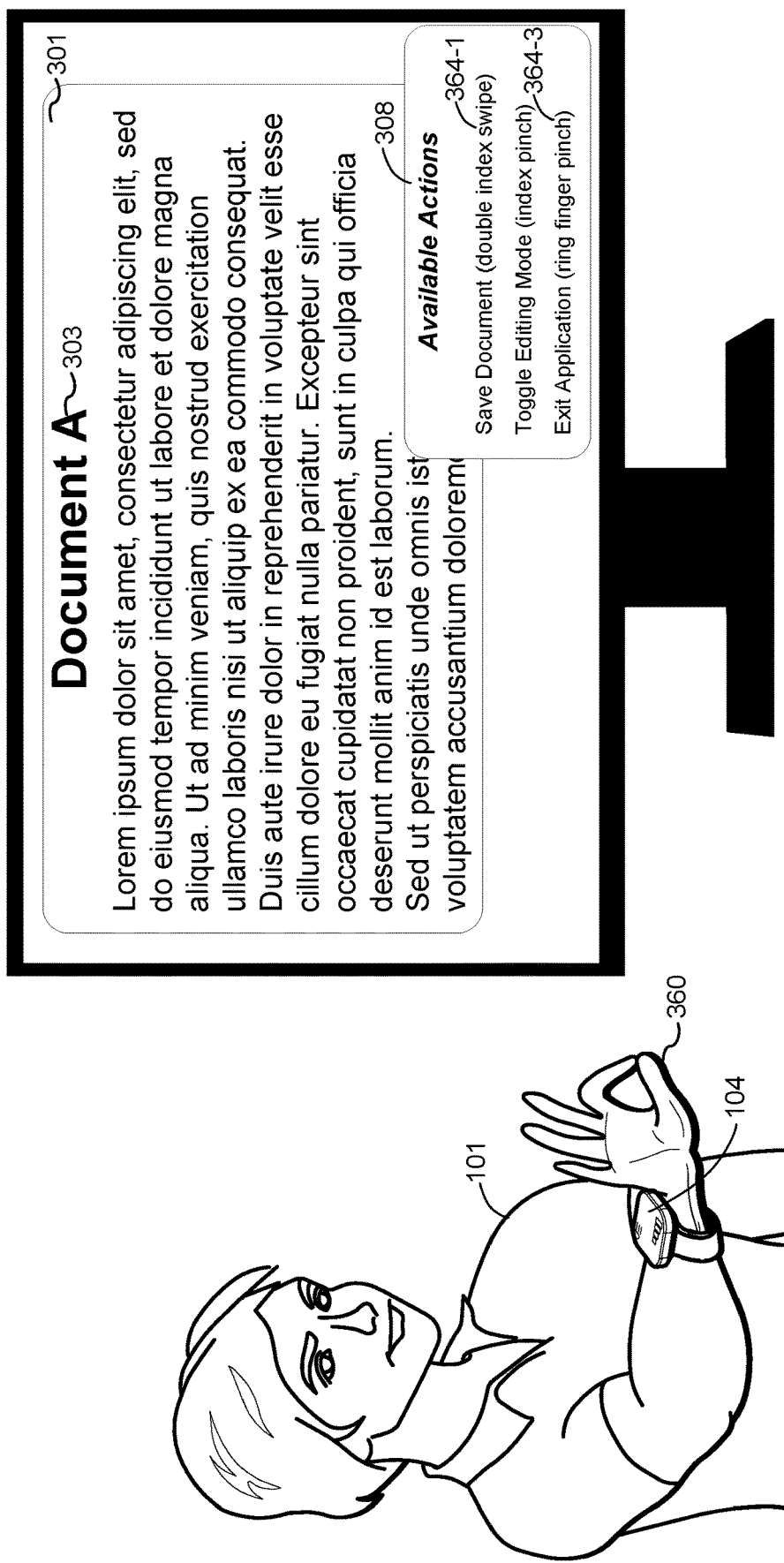

In FIG. 3H, the user 101 performs a gesture 360 (e.g., a thumb and index finger pinch gesture) and the gesture is detected by the wrist-wearable device 104. FIG. 3H further shows the word-processing application 301 disabling the text-modification mode in response to the user gesture 360, as illustrated by the lack of a selected term. FIG. 3H further shows the actions menu 308 with a plurality of actions 364 (the actions menu 308 can be automatically, and in the absence of a specific user request, opened after the text-modification mode is exited out of when the user is interacting with a document-editing application). In some embodiments, the actions menu 308 is displayed in accordance with a determination that the user 101 is likely finished with the document-editing application, which can be determined based on past user interactions with the document-editing application. In accordance with some embodiments, the plurality of actions 364 in FIG. 3H is different from the plurality of actions in the actions menu 308 in FIG. 3A due to the word-processing application 301 being in a different mode (e.g., text-modification mode being enabled in FIG. 3A and disabled in FIG. 3H). The plurality of actions 364 includes a save-document action 364-1 and an exit-application action 364-3.

Figure 4A:
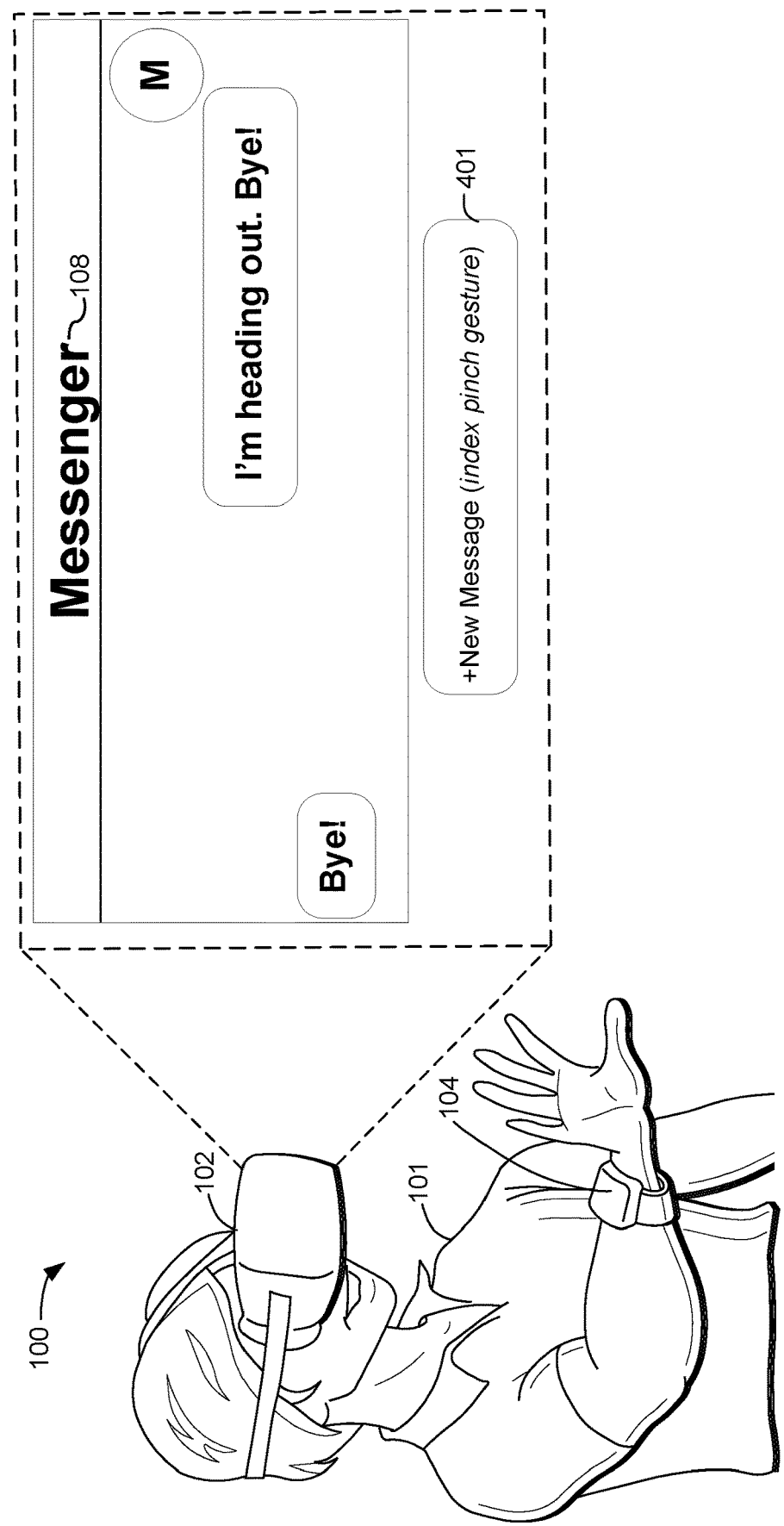
FIGS. 4A-4F illustrate another example user scenario with an artificial-reality system in accordance with some embodiments.

FIGS. 4A-4F illustrate another example user scenario with the artificial-reality system 100 in accordance with some embodiments. The user 101 in FIG. 4A is viewing a scene with the messenger application 108 being displayed using the head-mounted display device 102. The messenger application 108 includes multiple messages between the user 101 and a person "M." FIG. 4A also shows a new message dialog 401, including an indication of a corresponding gesture (e.g., thumb and index finger pinch gesture) for activating the new message operation.

Figure 4B:
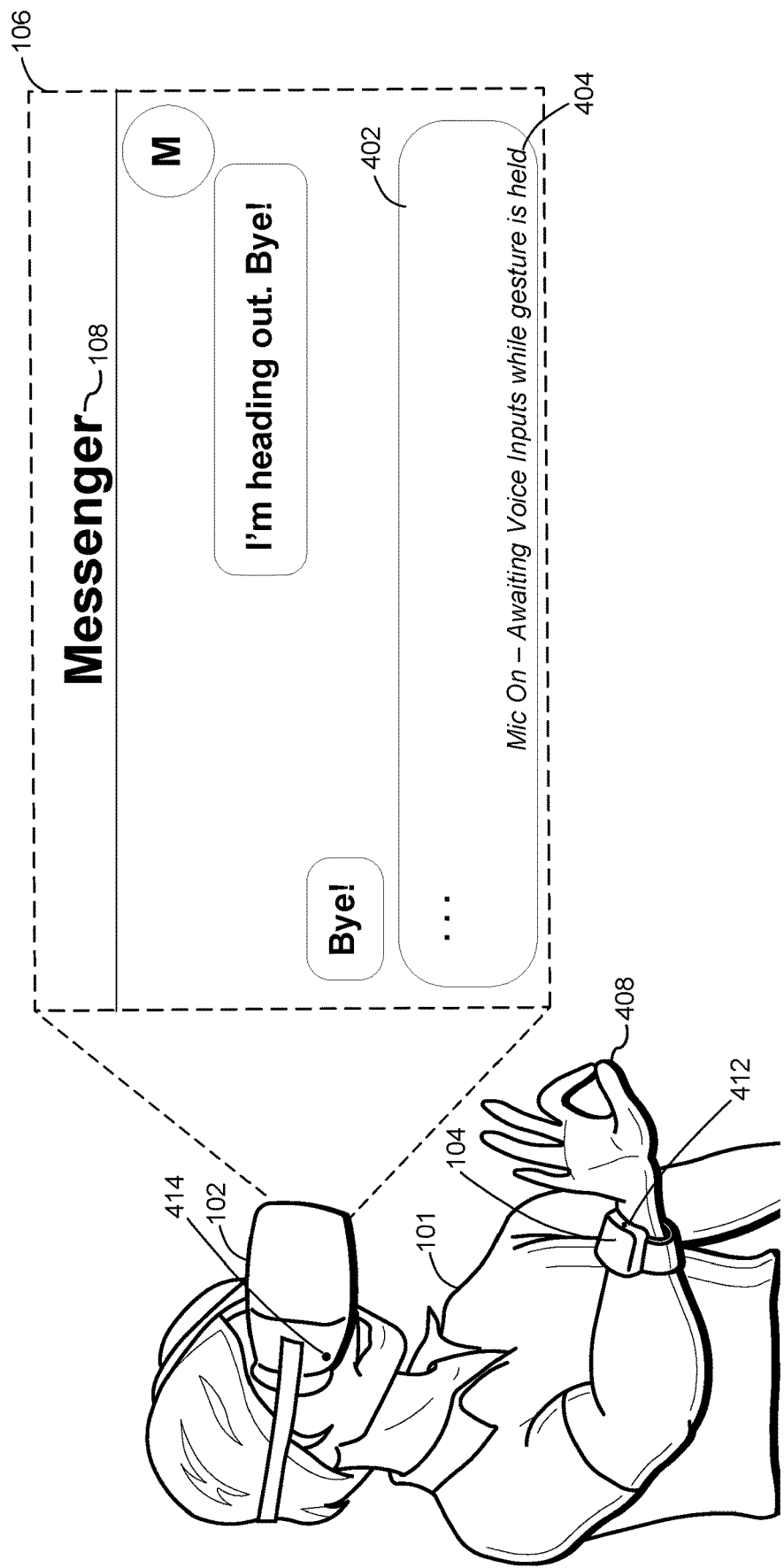

In FIG. 4B, the user 101 performs a gesture 408 (e.g., a thumb and index finger pinch gesture) and the gesture is detected by the wrist-wearable device 104. FIG. 4B further shows the messenger application 108 starting a new message 402 with status message 404 indicating that a microphone is active and awaiting voice inputs from the user while the gesture 408 is held. In some embodiments, one or more of a microphone on the wrist-wearable device 104 and a microphone on the head-mounted display device 102 is activated in accordance with the gesture 408. Thus, in the embodiments illustrated in the FIG. 4 series, the thumb and index finger pinch gesture corresponds to a different operation than in the embodiments illustrated in the FIG. 1 series. The thumb and index finger pinch gesture is an illustrative example of a gesture. In embodiments that encompass both the FIG. 1 and FIG. 4 series, a separate gesture can be used for the microphone activation operation (e.g., an index finger tap to the user's palm) to distinguish it from the gesture used to enter/exit the text-modification mode (e.g., the thumb and index finger pinch gesture). In some embodiments, a gesture intensity is used to distinguish two gestures. For example, a pinch gesture with an intensity below a threshold intensity corresponds to a microphone activation operation and a pinch gesture with an intensity above the intensity threshold corresponds to a mode-switch operation. In some embodiments, another aspect of the gesture is used to distinguish gestures, such as a duration, speed, direction, or location of the gesture. For example, a quick pinch gesture (e.g., a pinch that has a duration of less than 20 milliseconds or 10 milliseconds) corresponds to a first operation and a slow pinch gesture (e.g., a pinch that has a duration of more than 20 milliseconds or 10 milliseconds) corresponds to a second operation.

Figure 4C:
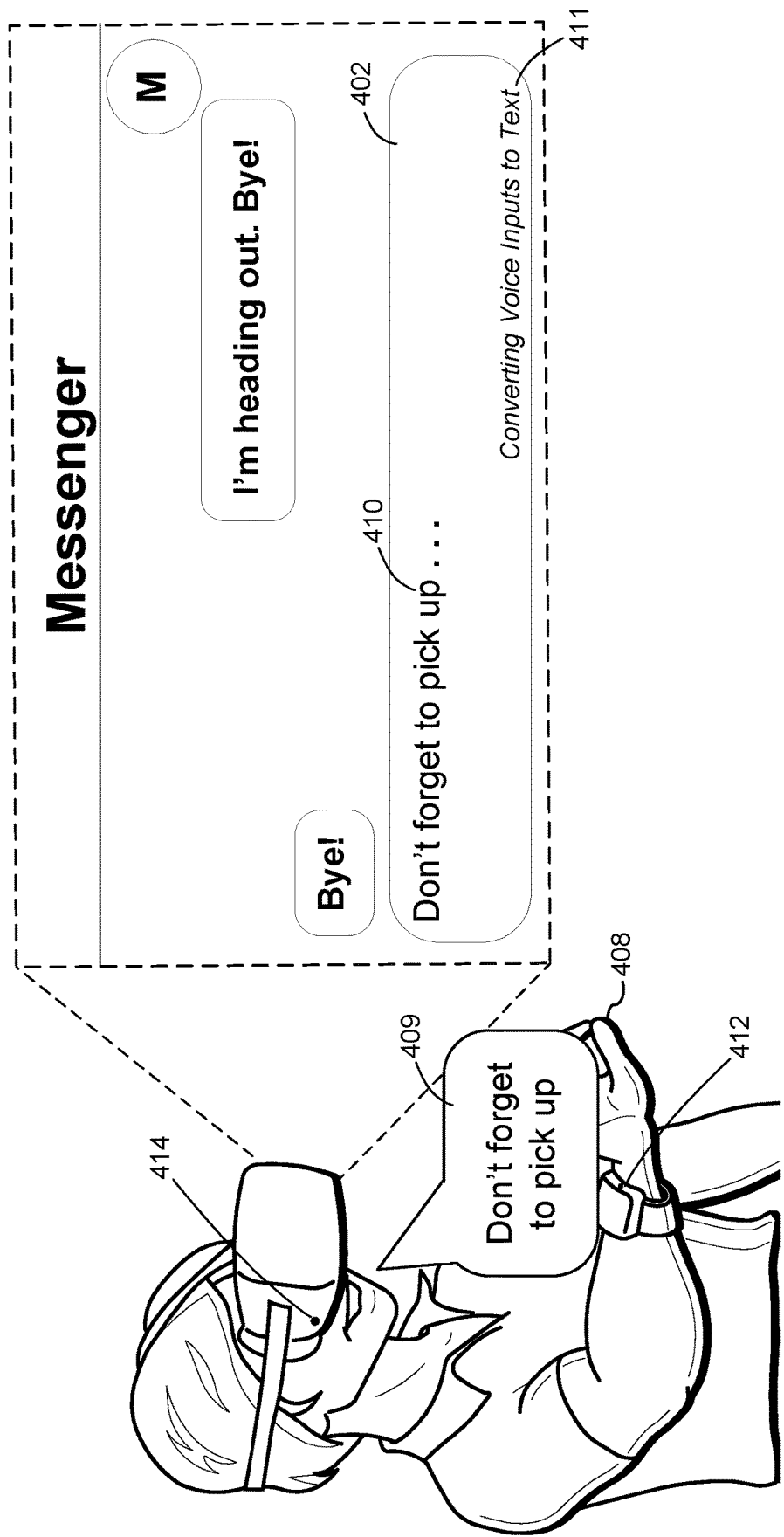

In FIG. 4C, the user 101 provides voice inputs 409 ("Don't forget to pick up") for the new message 402 while holding the gesture 408. In accordance with some embodiments, the head-mounted display device 102 includes a microphone 414 to detect the voice inputs from the user 101. In accordance with some embodiments, the wrist-wearable device 104 includes a microphone 412 to detect voice inputs from the user 101. FIG. 4C further shows the text 410 corresponding to the voice inputs 409 in the new message 402 and a status message 411 indicating that voice inputs have been received and are being converted to text.

Figure 4D:
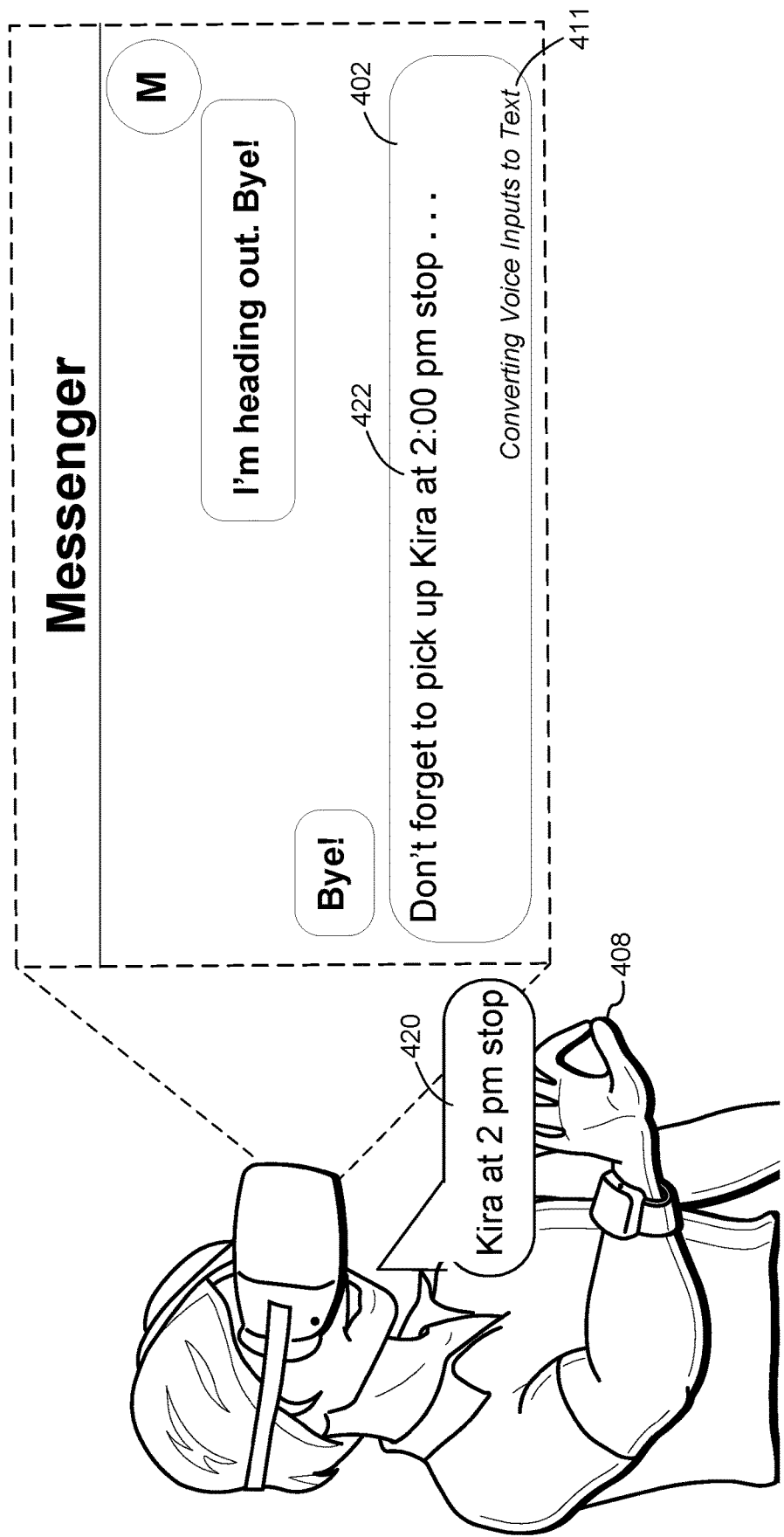

In FIG. 4D, the user 101 continues providing voice inputs with voice inputs 420 ("Kira at 2 pm stop") for the new message 402 while holding the gesture 408. FIG. 4D further shows the text 422 corresponding to the voice inputs 420 in the new message 402 and a status message 411 indicating that voice inputs have been received and are being converted to text.

Figure 4E:
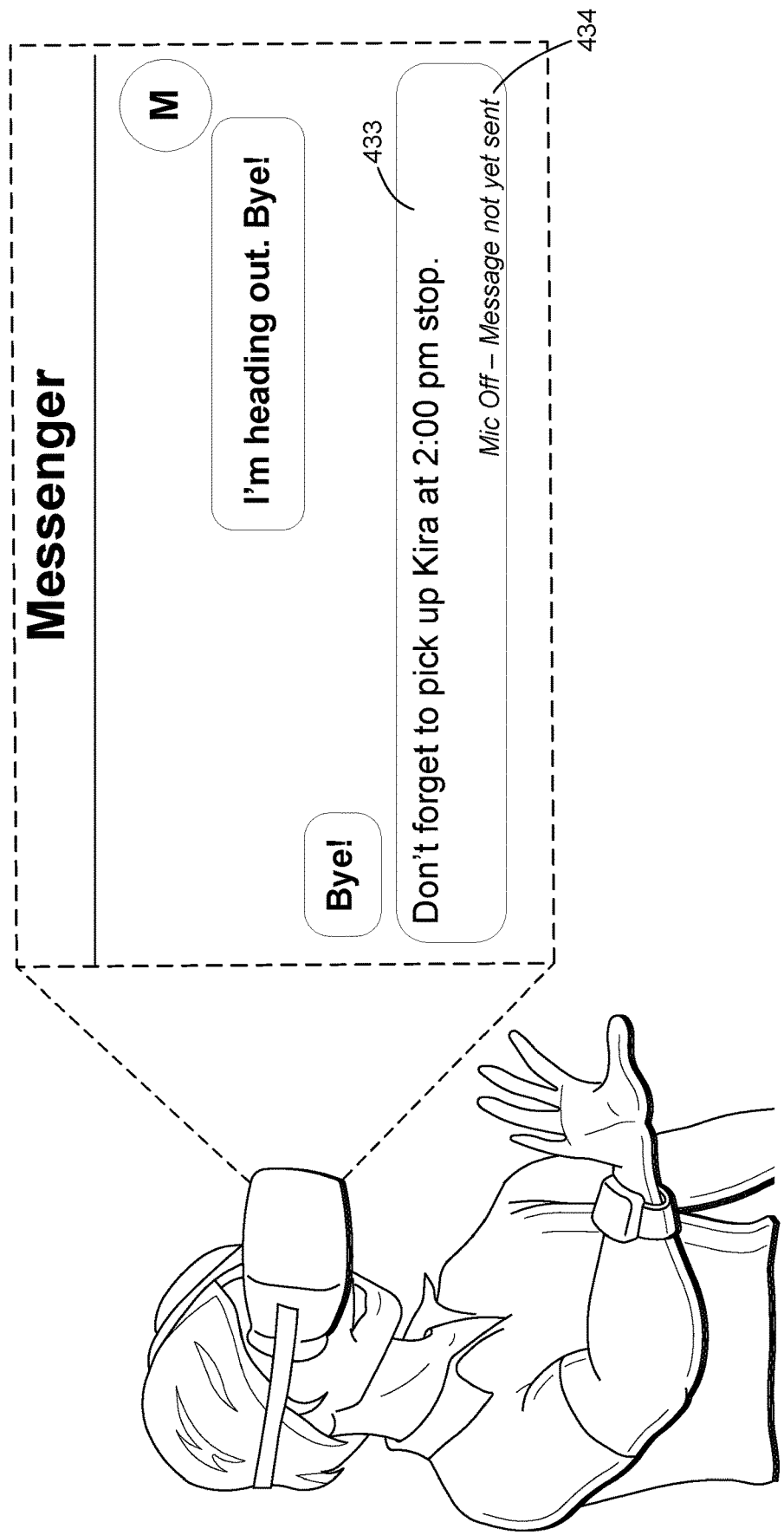

In FIG. 4E, the user 101 has released the gesture 408 and the release of the gesture is detected by the wrist-wearable device 104. FIG. 4E further shows the messenger application 108 with a draft message 433 with status message 434 indicating that the microphone is deactivated (in accordance with the gesture 408 being released) and the message has not yet been sent. In some embodiments, the gesture is a toggle-type gesture (rather than a hold-type gesture), and the microphone is activated the first time the gesture is performed and is deactivated the second time the gesture is performed.

Figure 4F:
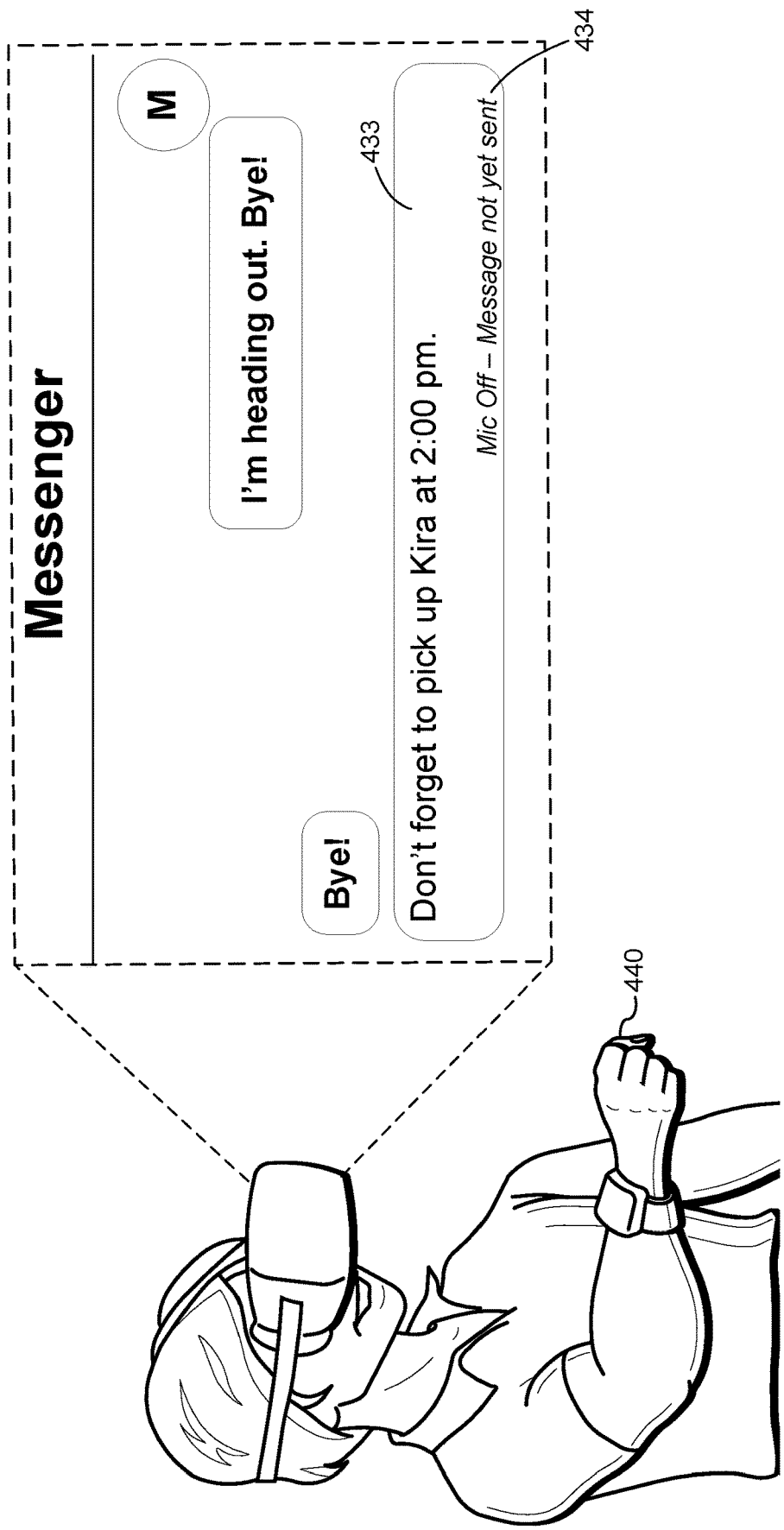
Figure 5A:
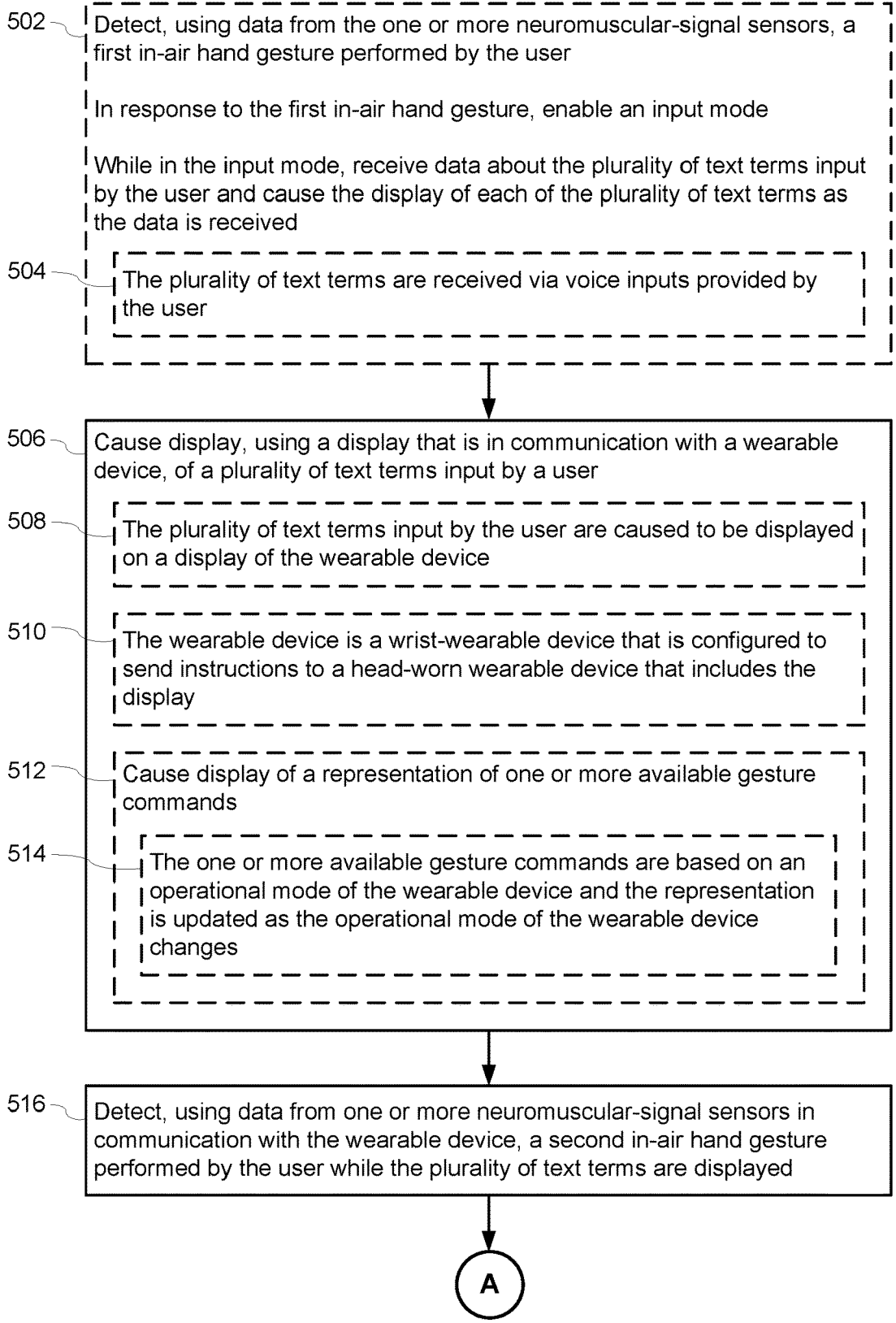
FIGS. 5A-5D are flow diagrams illustrating an example method for modifying text in accordance with some embodiments.
Figure 5B:
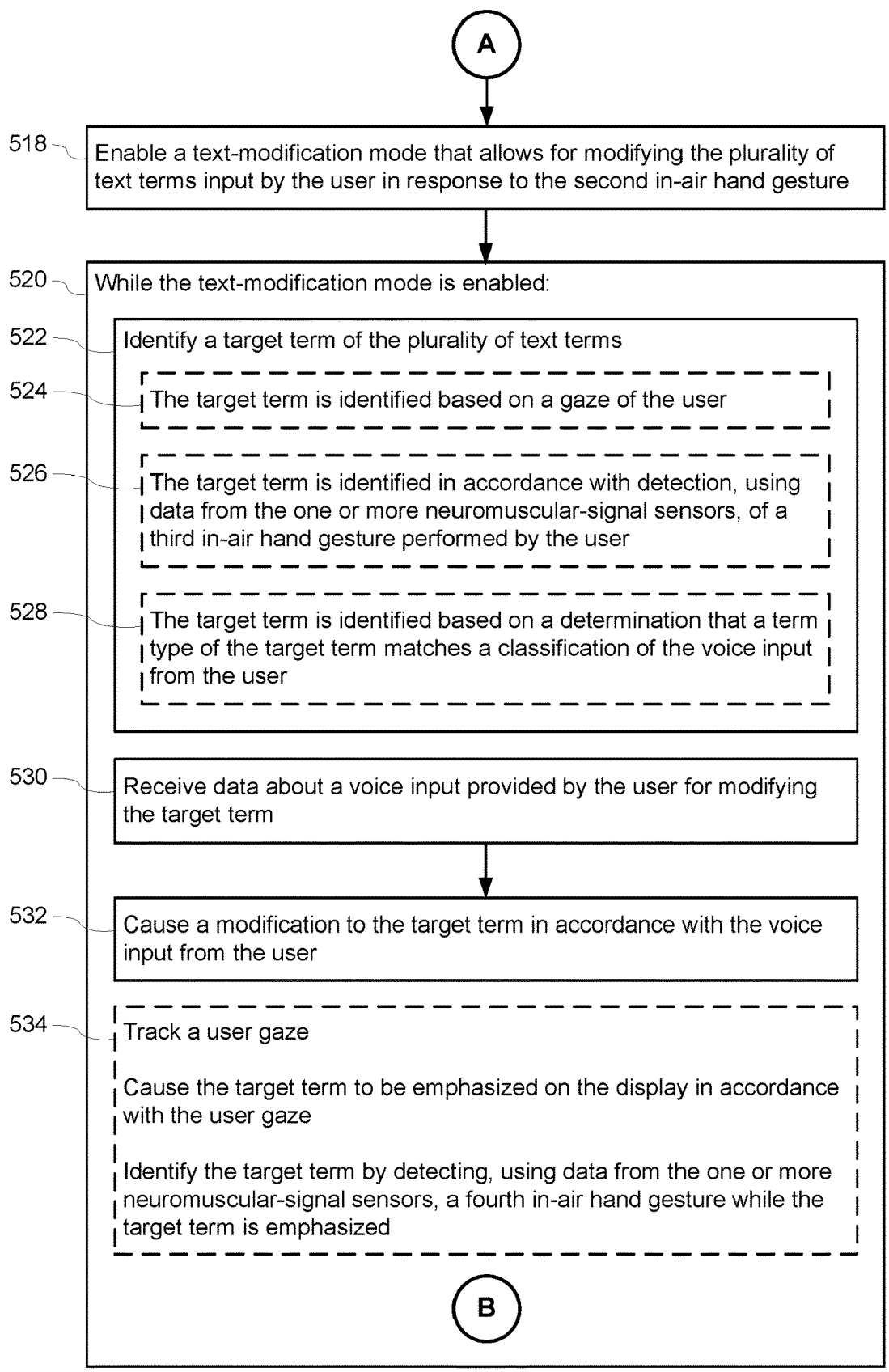
Figure 5C:
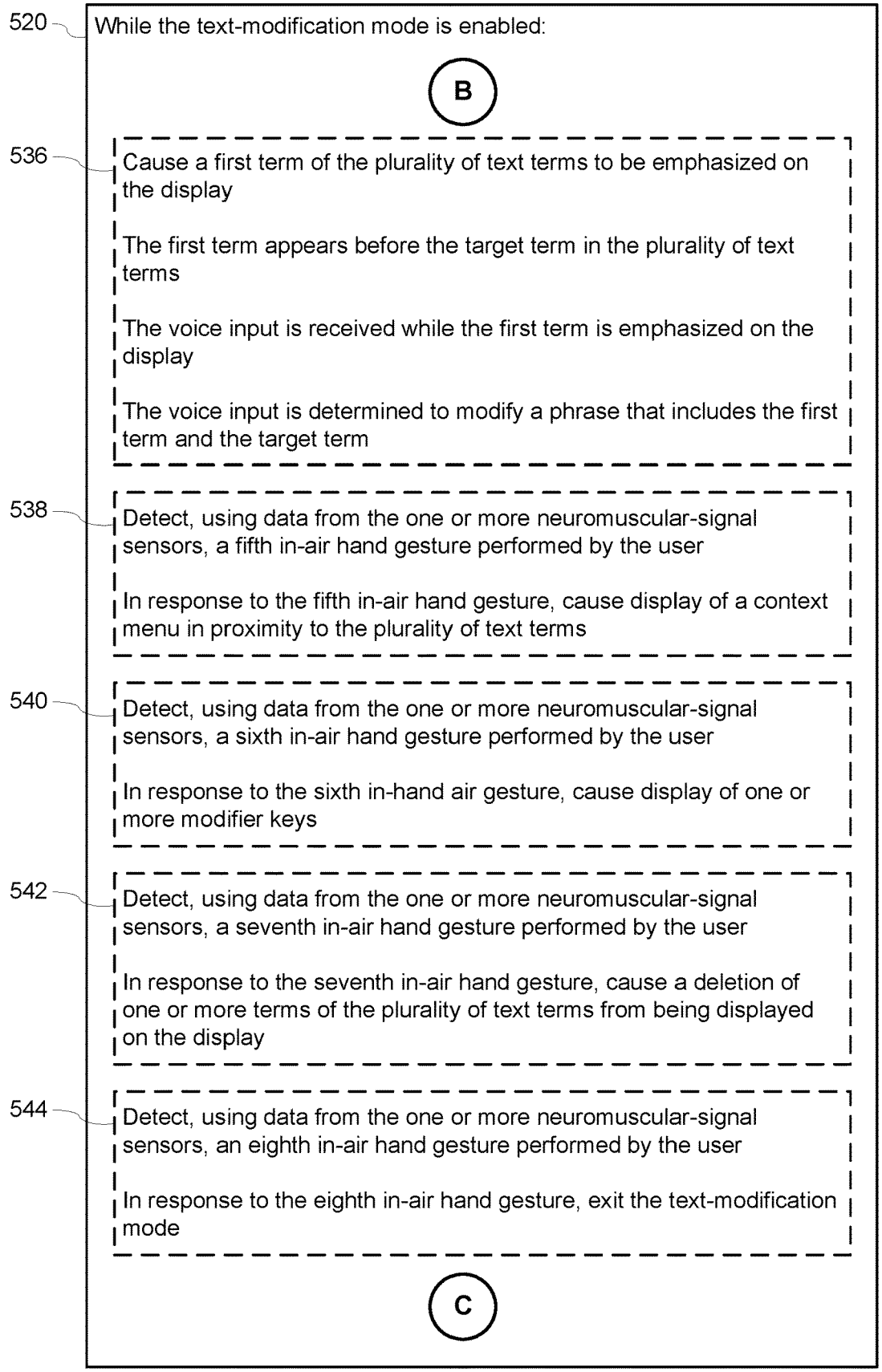
Figure 5D:
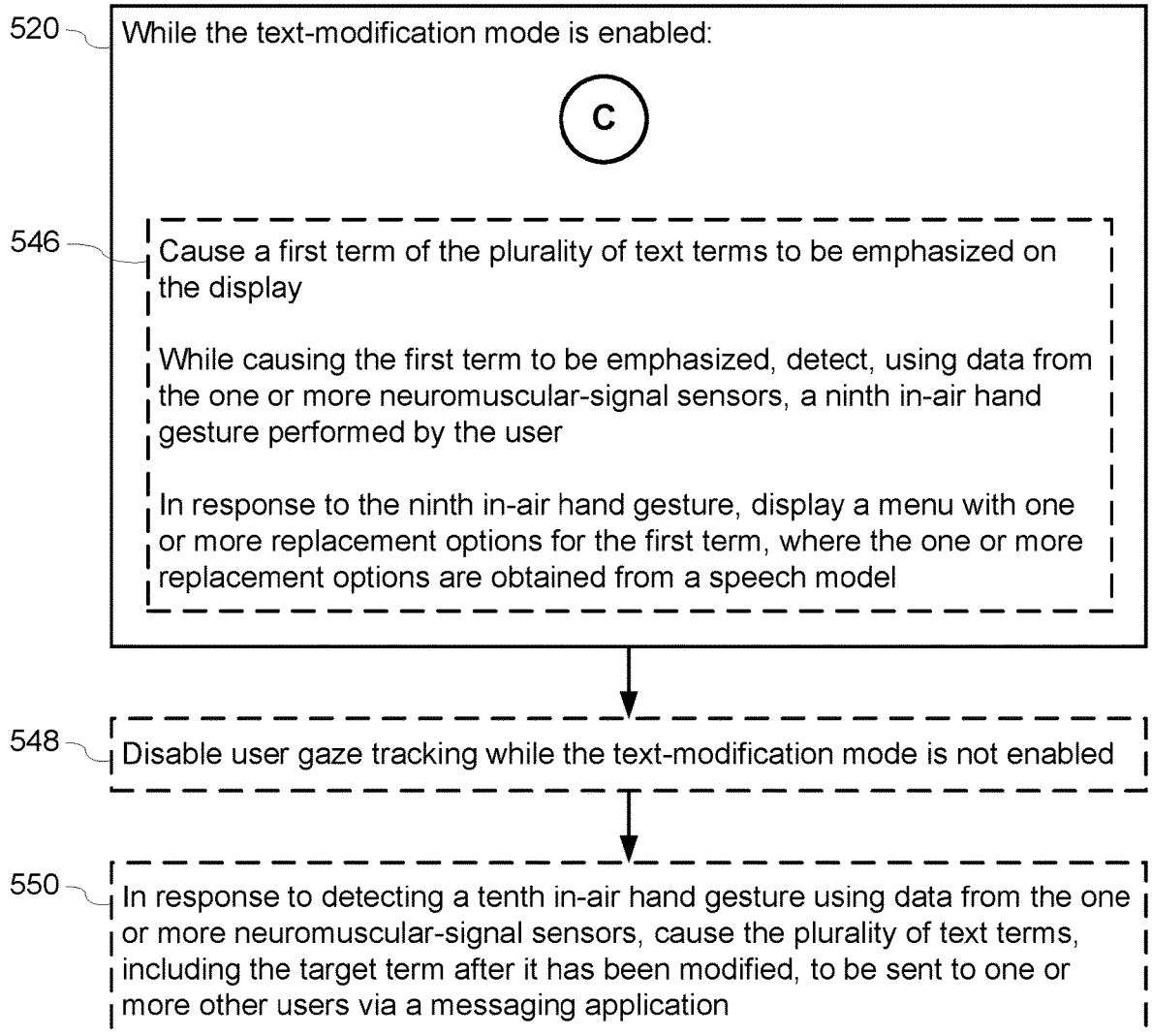

In FIG. 4F, the user 101 performs a gesture 440 (e.g., a fist gesture) and the gesture is detected by the wrist-wearable device 104. In accordance with some embodiments, the gesture 440 corresponds to a delete operation and accordingly the last term in the message 433 ("stop") in FIG. 4E is deleted in FIG. 4F. Multiple sequentially executed gestures 440 can also be provided and would then cause, in the illustrated example, deletion of additional terms. In some embodiments, the user 101 performs a gesture (e.g., a wrist-flick gesture where the user moves their wrist outward (or inward) with a speed above a threshold (e.g., a threshold of 50 cm/s or 100 cm/s)) that corresponds to an undo command and accordingly the last performed operation is undone.

Although the user scenarios described previously with respect to the series of FIGS. 1, 2, 3, and 4 describe operations being performed by the wrist-wearable device 104 and head-worn devices 102 and 202, in some embodiments at least a subset of the operations are performed by an intermediary device, such as a smart phone or personal computer, that is in communication with the wearable devices. For example, detection of speech from the user 101 in FIG. 1D is optionally detected using a microphone of the intermediary device. In some embodiments, the wrist-wearable device 104 and the head-worn devices 102 and 202 communicate with one another via the intermediary device (e.g., each is communicatively coupled to the intermediary device and the intermediary device manages interactions between the devices). As another example, the wrist-wearable device 104 can detect the gesture 408 shown in FIG. 4B and indicate the detection to the intermediary device. In this example, the intermediary device receives the indication and instructs the head-mounted display device 102 to enable the microphone 414. Examples of intermediary devices can include the computing devices 724 described with reference to FIG. 7A and the computer system 772 described with in reference to FIG. 7B. In some embodiments, data from sensors on multiple devices are combined (e.g., at the intermediary device) to detect an in-air gesture. For example, data from one or more optical sensors of a head-worn device (e.g., the head-mounted display device 102) can be combined with EMG and/or inertial measurement unit (IMU) data from a wrist-worn device (e.g., the wrist-wearable device 104) to identify a swipe gesture at a location that corresponds to a first scroll bar of a user interface rather than a second scroll bar displayed at a separate location.

Additionally, although the user scenarios described with respect to the series of FIGS. 1, 2, 3, and 4 are described as separate sequences, in some embodiments the user scenarios are combined with one another. For example, the sequence described with respect to FIGS. 4A-4F occurs before (or after) the sequence described with respect to FIGS. 1A-1F. The sequence described with respect to FIGS. 2A-2G is optionally performed with the artificial-reality system 100 and combined with the aspects discussed with respect to the series of FIG. 1 or 4 (or the sequences and aspects of FIGS. 1 and 4 are performed with the artificial-reality system 200). Similarly, the sequence described with respect to FIGS. 3A-3H is optionally performed with the artificial-reality system 100 or the artificial-reality system 200 and combined with aspects discussed with respect to the series of any of FIG. 1, 2, or 4 (or the sequences and aspects of FIGS. 1, 2, and 4 are performed with a system that includes the display 302 and the wrist-wearable device 104 shown in FIGS. 3A-3H).

The user scenarios described with respect to the series of FIGS. 1, 2, and 4 involved an example messenger application (messenger application 108). However, the sequences, gestures, actions, and operations can be used in conjunction with other types of applications, such as web-browsing, note-taking, social media, word processing, data-entry, programming, and the like. Similarly, the user scenario described with respect to the FIG. 3 series involved an example document-editing application (e.g., the word-processing application 301). However, the sequences, gestures, actions, and operations can also be used in conjunction with other types of applications, such as web-browsing, note-taking, social media, messaging, data-entry, programming, and the like.

FIGS. 5A-5D are flow diagrams illustrating a method 500 for modifying text in accordance with some embodiments. The method 500 is performed at a computing system (e.g., a computing device 724 in FIG. 7A) having one or more processors and memory. In some embodiments, the memory stores one or more programs configured for execution by the one or more processors. At least some of the operations shown in FIGS. 5A-5D correspond to instructions stored in a computer memory or computer-readable storage medium (e.g., the memory 778 of the computer system 772 or the memory 756 of the accessory device 752). In some embodiments, the computing system is a wearable device such as the wrist-wearable device 104 or the head-mounted display device 102.

In some embodiments, the wearable device detects (502), using data from one or more neuromuscular-signal sensors (e.g., the sensors 716 of FIG. 7A), a first in-air hand gesture (e.g., a thumb and middle finger pinch gesture) performed by a user. In response to the first in-air hand gesture, the wearable device enables an input mode. While in the input mode, the wearable device receives data about the plurality of text terms input by the user and causes the display of each of the plurality of text terms as the data is received. For example, FIGS. 4B-4D illustrate the user 101 providing inputs while holding the gesture 408. FIGS. 4B-4D further show text 410 and 422 displayed in the messenger application 108 in response to the provided inputs.

In some embodiments, the plurality of text terms are received (504) via voice inputs provided by the user. For example, in FIG. 4C the user provides voice inputs 409 that are converted to the text 410.

The wearable device causes (506) display, using a display that is in communication with the wearable device (e.g., a display associated with VR goggles or AR glasses), of a plurality of text terms input by a user. For example, FIG. 1A shows a draft message 110 displayed to the user 101 via the head-mounted display device 102.

In some embodiments, the plurality of text terms input by the user are caused (508) to be displayed on a display of the wearable device. For example, the plurality of text terms are displayed on the electronic display 718 of the wearable device 702. As another example, the plurality of text terms are displayed on the display screen 901 of the wearable device 900.

In some embodiments, the wearable device is (510) a wrist-wearable device that is configured to send instructions to a head-worn wearable device that includes the display. For example, the wearable device is the wrist-wearable device 104 in FIG. 1A, and the head-worn wearable device is the head-mounted display device 102.

In some embodiments, the wearable device causes (512) display of a representation of one or more available gesture commands. For example, FIG. 3A shows an actions menu 308 with a plurality of actions 310 and corresponding gesture commands.

In some embodiments, the one or more available gesture commands are (514) based on an operational mode of the wearable device and the representation is updated as the operational mode of the wearable device changes. For example, FIG. 3A shows the plurality of actions 310 associated with a text-modification mode of the word-processing application 301 and FIG. 3H shows the plurality of actions 364 associated with a non-text-modification mode (e.g., a text-viewing mode) of the word-processing application 301. The one or more available gesture commands can be continually updated, which helps to train and make users familiar with a new in-air hand gesture space. Over time (e.g., once the system recognizes that the user has learned the new in-air hand gesture space), the system can cease to display some or all of the one or more available gesture commands.

The wearable device detects (516), using data from one or more neuromuscular-signal sensors in communication with the wearable device, a second in-air hand gesture (e.g., a thumb and index finger pinch gesture) performed by the user while the plurality of text terms are displayed. For example, FIG. 1B shows the user 101 performing the gesture 120 (e.g., detected by the wrist-wearable device 104).

The wearable device enables (518) a text-modification mode that allows for modifying the plurality of text terms input by the user in response to the second in-air hand gesture. For example, FIG. 1B further shows the messenger application 108 in a text-modification mode (denoted by the state indicator 122) in response to the gesture 120.

While the text-modification mode is enabled (520), the wearable device identifies (522) a target term of the plurality of text terms. For example, FIG. 1C shows the user performing a thumb swipe gesture to emphasize the term 130.

In some embodiments, the target term is identified (522) based on a gaze of the user. For example, FIG. 2C shows the term 216 being identified based on the gaze lines 214 of the user 101.

In some embodiments, the target term is identified (524) in accordance with detection, using data from the one or more neuromuscular-signal sensors, of a third in-air hand gesture (e.g., a thumb and index finger pinch gesture) performed by the user. For example, FIG. 2D shows the user performing the gesture 220 and selection of the emphasized term 216 from FIG. 2C (e.g., the box-shaped dashed lines 222).

In some embodiments, the target term is identified (526) based on a determination that a term type of the target term matches a classification of the voice input from the user. In some embodiments, term types include a time type, a day type, a month type, a location type, a proper noun type, a number type, and a punctuation type. For example, the user says a time (e.g., "2:00 pm") and a target term having a time type is identified (e.g., "3:00 pm"). In some embodiments, the term types include types of words, such as verbs, adverbs, nouns, adjectives, etc.

The wearable device receives (530) data about a voice input provided by the user for modifying the target term. For example, the wearable device receives the data via the microphone 133. As another example, the wearable device receives the data from another device in communication with the wearable device (e.g., the head-mounted display device 102).

The wearable device causes (532) a modification to the target term in accordance with the voice input from the user. For example, FIG. 1D shows the user saying the replacement term 134 and the replacement term 136 ("Kira") being inserted in the draft message 110 in accordance with the spoken replacement term 134.

In some embodiments, the wearable device tracks (534) a user gaze. The wearable device causes the target term to be emphasized on the display in accordance with the user gaze. For example, FIG. 2B shows the AR glasses 202 tracking the gaze of the user 101 (e.g., as denoted by the gaze lines 214). FIG. 2B further shows the term 215 emphasized in accordance with the user gaze tracking. The wearable device identifies the target term by detecting, using data from the one or more neuromuscular-signal sensors, a fourth in-air hand gesture while the target term is emphasized. For example, FIG. 2D shows the emphasized term 216 from FIG. 2C selected in accordance with the gesture 220 and the gaze-tracking lines 214.

In some embodiments, the wearable device causes (536) a first term of the plurality of text terms to be emphasized on the display. The first term appears before the target term in the plurality of text terms. The voice input is received while the first term is emphasized on the display. The voice input is determined so as to modify a phrase that includes the first term and the target term. For example, FIGS. 2D and 2E show the user selecting a term (e.g., the first term) and saying a replacement phrase 230. FIG. 2E further shows the replacement phrase 232 ("park on Franklin at 1:55 pm") inserted in the draft message 206 in accordance with the spoken replacement phrase 230. In this example, the target term could be "2:00 pm," which is replaced with "1:55 pm" in accordance with the user's replacement phrase 230.

In some embodiments, the gesture to enable the text-modification mode is a held gesture (e.g., a pinch gesture with a duration of at least 20 milliseconds, 50 milliseconds, or 500 milliseconds) where text-modification mode is only enabled while the gesture is held. In some embodiments, the gesture to select a term is a forceful (deep) press of the held gesture. For example, the held gesture is an index finger and thumb pinch gesture having an intensity below a preset threshold (e.g., 50 grams, 100 grams, or 200 grams) and the forceful press is an increase in intensity of the pinch gesture above the preset threshold.

In some embodiments, the wearable device detects (538), using data from the one or more neuromuscular-signal sensors, a fifth in-air hand gesture (e.g., a thumb and pinky finger pinch gesture) performed by the user. In response to the fifth in-air hand gesture, the wearable device causes display of a context menu in proximity to the plurality of text terms. For example, FIG. 3B shows the user 101 performing the gesture 320 and the context menu 322 being displayed in response. In some embodiments, the context menu includes options to copy, cut, and/or paste text. In some embodiments, the context menu corresponds to a double gesture (e.g., a double swipe, double pinch, or double tap gesture).

In some embodiments, the wearable device detects (540), using data from the one or more neuromuscular-signal sensors, a sixth in-air hand gesture (e.g., a thumb to palm tap gesture) performed by the user. In response to the sixth in-air hand gesture, the wearable device causes display of one or more modifiers. For example, FIG. 3F shows the user 101 performing the gesture 356 and the modifiers menu 357 being displayed in response. In some embodiments, the sixth in-air hand gesture corresponds to a modifier command. For example, a forceful (deep) middle finger and thumb press may correspond to a "Shift" key toggle. As another example, a pinky to palm tap may correspond to a "Ctrl" key toggle.

In some embodiments, the wearable device detects (542), using data from the one or more neuromuscular-signal sensors, a seventh in-air hand gesture (e.g., a hand flick gesture) performed by the user. In response to the seventh in-air hand gesture, the wearable device causes the deletion of one or more terms of the plurality of text terms from being displayed on the display. For example, FIG. 3E shows the user 101 performing the gesture 350 and the emphasized term 342 in FIG. 3D having been deleted in FIG. 3E in response to the gesture 350.

In some embodiments, the wearable device detects (544), using data from the one or more neuromuscular-signal sensors, an eighth in-air hand gesture performed by the user. In response to the eighth in-air hand gesture, the wearable device exits the text-modification mode. In some embodiments, the eighth in-air hand gesture is the same as the second in-air hand gesture. For example, the second in-air hand gesture toggles the text-modification mode on, and the eighth in-air hand gesture toggles the text-modification mode off. As an example, FIG. 1B shows the user 101 performing the gesture 120 and a text-modification mode being enabled for the messenger application 108 and FIG. 1E shows the user 101 performing the gesture 140 and the text-modification mode being disabled for the messenger application 108. In some embodiments, disabling the text-modification mode includes transitioning to a text-review mode (also sometimes called a text-display mode). In some embodiments, the text-review mode corresponds to an input mode, where new inputs from the user 101 are appended to the displayed text.

In some embodiments, the wearable device causes (546) a first term of the plurality of text terms to be emphasized on the display. While causing the first term to be emphasized, the wearable device detects, using data from the one or more neuromuscular-signal sensors, a ninth in-air hand gesture performed by the user. In response to the ninth in-air hand gesture, the wearable device displays a menu with one or more replacement options for the first term, where the one or more replacement options are obtained from a speech model. For example, FIG. 2G shows the user 101 performing the gesture 246 and replacement terms 252 and 254 displayed in response to the gesture 246. In some embodiments, the replacement options include one or more of synonyms, homonyms, or homophones for the first term. In some embodiments, the first term corresponds to a first speech-to-text translation for a voice input from the user and the replacement options include one or more secondary speech-to-text translations for the voice input.

In some embodiments, the wearable device disables (548) user gaze tracking while the text-modification mode is not enabled. In some embodiments, user gaze tracking is disabled while in one or more non-text-modification modes (e.g., a text-input mode or text-display mode). In some embodiments, user gaze tracking is only enabled while the text-modification mode is enabled.

In some embodiments, in response to detecting a tenth in-air hand gesture (e.g., a pinch and shake gesture) using data from the one or more neuromuscular-signal sensors, the wearable device causes (550) the plurality of text terms, including the target term after it has been modified, to be sent to one or more other users via a messaging application. For example, FIG. 1F shows the user performing the gesture 146 and the draft message 110 from FIG. 1E being sent to the person "M" in response to the gesture 146. An example pinch and shake gesture includes a thumb and pinky finger pinch with a concurrent wrist shake (e.g., the pinch is held for at least a threshold duration such as 100 milliseconds and the user shakes their wrist while holding the pinch gesture).

Figure 6A:
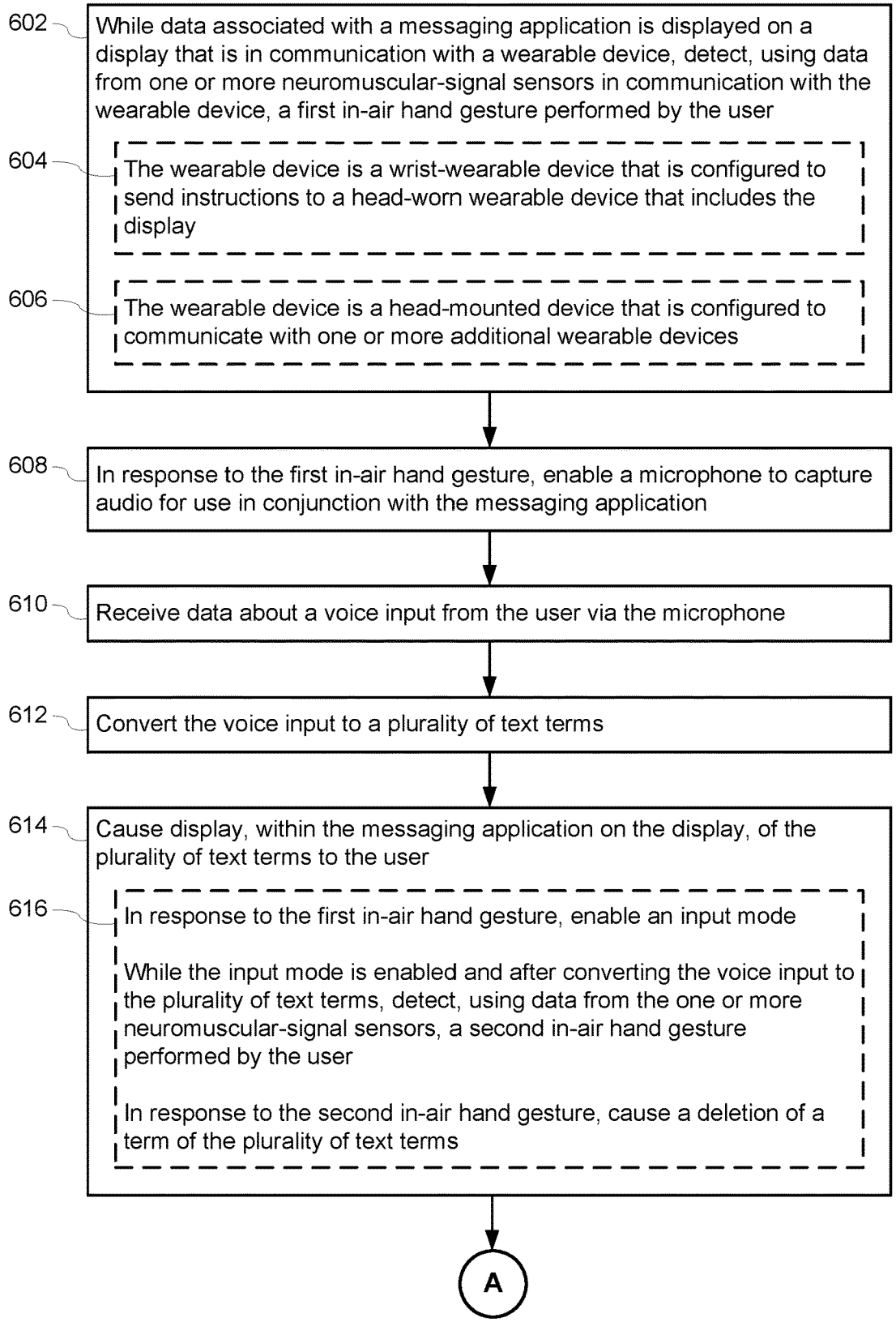
FIGS. 6A-6C are flow diagrams illustrating an example method for inputting text in accordance with some embodiments.
Figure 6B:
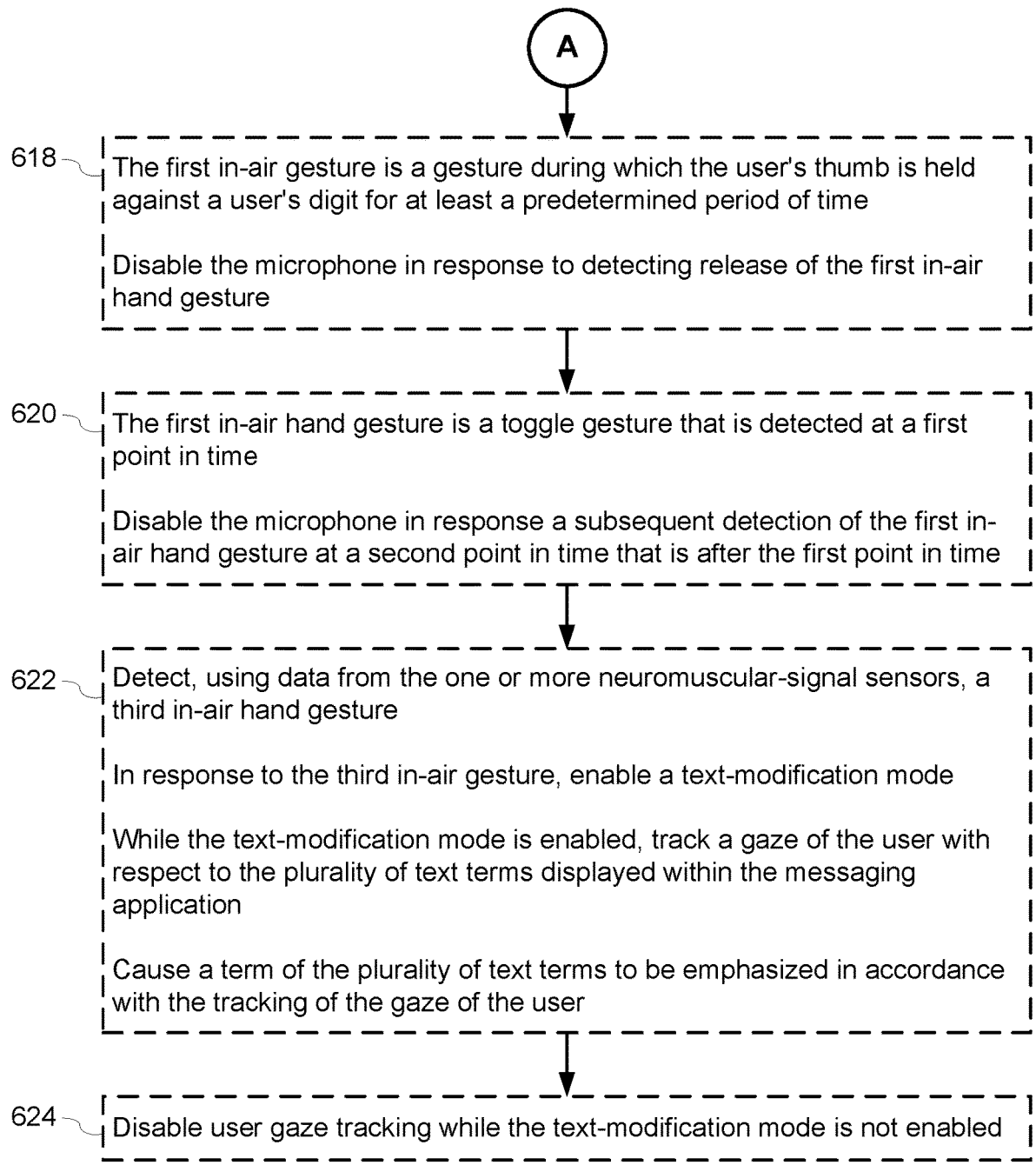
Figure 6C:
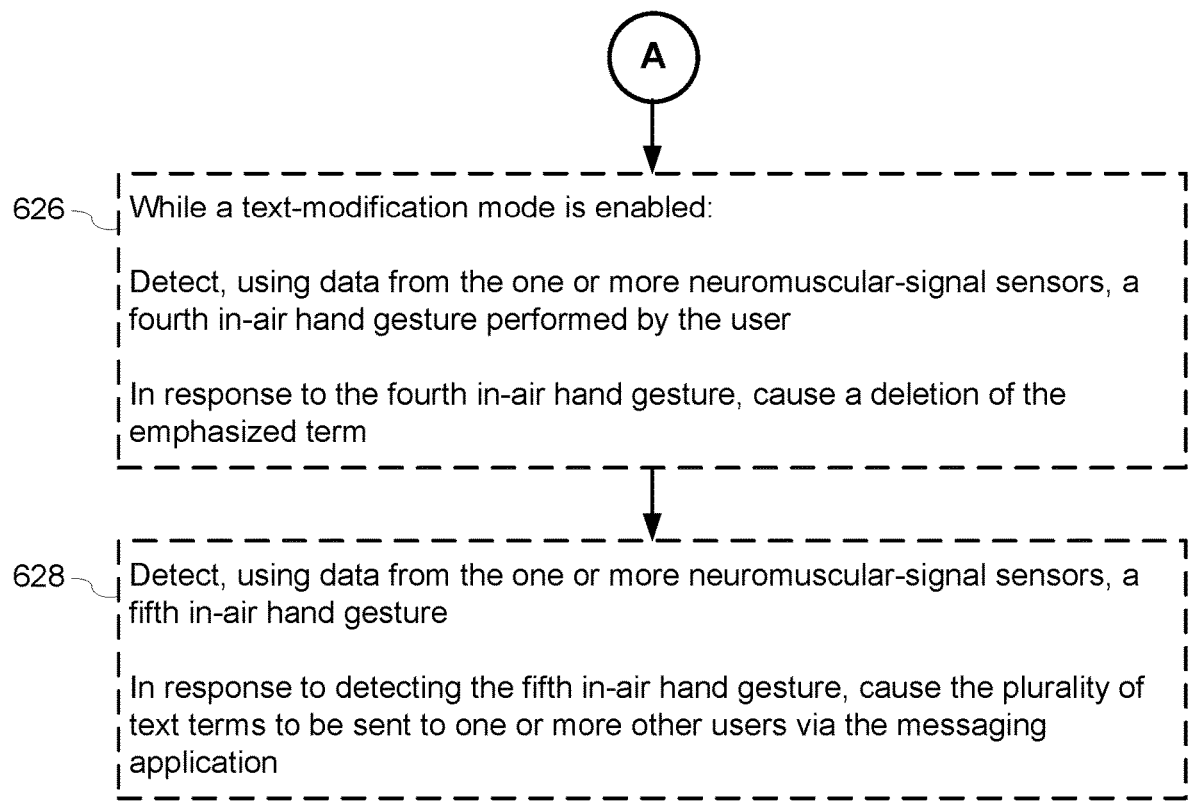

FIGS. 6A-6C are flow diagrams illustrating a method 600 for inputting text in accordance with some embodiments. The method 600 is performed at a computing system (e.g., a computing device 724 in FIG. 7A) having one or more processors and memory. In some embodiments, the memory stores one or more programs configured for execution by the one or more processors. At least some of the operations shown in FIGS. 6A-6C correspond to instructions stored in a computer memory or computer-readable storage medium (e.g., the memory 778 of the computer system 772 or the memory 756 of the accessory device 752). In some embodiments, the computing system is, or includes, a wearable device such as the wrist-wearable device 104 or the head-mounted display device 102. In some embodiments, the computing system is, or includes, an intermediary device such as a smart phone.

While data associated with a messaging application is displayed on a display that is in communication with a wearable device, the wearable device detects (602), using data from one or more neuromuscular-signal sensors in communication with the wearable device, a first in-air hand gesture performed by the user. For example, FIG. 4B shows the user 101 performing the gesture 408 while the messenger application 108 is displayed.

In some embodiments, the wearable device is (604) a wrist-wearable device (e.g., the wrist-wearable device 104) that is configured to send instructions to a head-worn wearable device that includes the display (e.g., the head-mounted display device 102).

In some embodiments, the wearable device is (606) a head-mounted device (e.g., the AR glasses 202) that is configured to communicate with one or more additional wearable devices (e.g., the wrist-wearable device 104).

In response to the first in-air hand gesture, the wearable device enables (608) a microphone to capture audio for use in conjunction with the messaging application. For example, FIG. 4B further shows microphone 414 and microphone 412 enabled in response to the gesture 408, as denoted by the status message 404.

The wearable device receives (610) data about a voice input from the user via the microphone. For example, FIG. 4C shows the user 101 providing voice inputs 409 received by at least one of the microphone 414 and the microphone 412. In some embodiments, the wearable device receives the data via another device (e.g., a head-worn device or an intermediary device). In some embodiments, an intermediary device receives the data about the voice input.

The wearable device converts (612) the voice input to a plurality of text terms. For example, FIG. 4C further shows the text 410 corresponding to the voice inputs 409 in the new message 402 and the status message 411 indicating that voice inputs have been received and are being converted to text. In some embodiments, an intermediary device converts the voice input.

The wearable device causes (614) display, within the messaging application on the display, of the plurality of text terms to the user. For example, FIG. 4D shows the text 422 corresponding to the voice inputs 409 and 420 displayed to the user 101 in the messenger application 108. In some embodiments, an intermediary device causes the display of the plurality of text terms.

In some embodiments, the wearable device enables (616) an input mode in response to the first in-air hand gesture. While the input mode is enabled and after converting the voice input to the plurality of text terms, the wearable device detects, using data from the one or more neuromuscular-signal sensors, a second in-air hand gesture performed by the user. In response to the second in-air hand gesture, the wearable device causes a deletion of a term of the plurality of text terms. For example, FIG. 4F shows the user 101 performing the gesture 440 and corresponding deletion of the last term in the message 433 ("stop") in FIG. 4E.

In some embodiments, the first in-air gesture is (618) a gesture during which the user's thumb is held against a user's digit for at least a predetermined period (e.g., a period of time that is at or between 10-20 ms). The wearable device disables the microphone in response to detecting the release of the first in-air hand gesture. For example, FIGS. 4B-4D show the user holding the gesture 408 while providing voice inputs 409 and 420 and FIG. 4E shows the user releasing the gesture 408 and the microphone being disabled in response (as denoted by the status message 434).

In some embodiments, the first in-air hand gesture is (620) a toggle gesture that is detected at a first point in time. The wearable device disables the microphone in response to a subsequent detection of the first in-air hand gesture at a second point in time that is after the first point in time. For example, a first thumb and middle finger pinch gesture toggles the microphone on and a subsequent second thumb and middle finger pinch gesture toggles the microphone off. An example of this is shown and described in reference to FIGS. 4A-4D.

In some embodiments, the wearable device detects (622), using data from the one or more neuromuscular-signal sensors, a third in-air hand gesture. In response to the third in-air hand gesture, the wearable device enables a text-modification mode. While the text-modification mode is enabled, the wearable device tracks the gaze of the user with respect to the plurality of text terms displayed within the messaging application. The wearable device causes a term of the plurality of text terms to be emphasized in accordance with the tracking of the gaze of the user. For example, FIG. 2C shows the term 216 being identified based on the gaze lines 214 of the user 101. In some embodiments, an initial term is emphasized in accordance with gaze tracking. In some embodiments, the user may emphasize a different term by performing a navigation gesture (e.g., a thumb d-pad swipe gesture). In some embodiments, gaze tracking is performed while a user holds a corresponding gesture (e.g., while the user holds a thumb and index finger forceful (deep) pinch gesture). In some embodiments, the gaze tracking emphasizes the initial term in accordance with the user looking at the initial term when releasing the held gesture.

In some embodiments, the wearable device disables (624) user gaze tracking while the text-modification mode is not enabled. In some embodiments, user gaze tracking is disabled while in one or more non-text-modification modes (e.g., a text-input mode or text-display mode). In some embodiments, user gaze tracking is only enabled while the text-modification mode is enabled.

In some embodiments, while a text-modification mode is enabled, the wearable device detects (626), using data from the one or more neuromuscular-signal sensors, a fourth in-air hand gesture performed by the user. In response to the fourth in-air hand gesture, the wearable device causes a deletion of the emphasized term. For example, FIG. 3E shows the user 101 performing the gesture 350 and the emphasized term 342 in FIG. 3D having been deleted in FIG. 3E in response to the gesture 350.

In some embodiments, the wearable device detects (628), using data from the one or more neuromuscular-signal sensors, a fifth in-air hand gesture. In response to detecting the fifth in-air hand gesture, the wearable device causes the plurality of text terms to be sent to one or more other users via the messaging application. For example, FIG. 1F shows the user performing the gesture 146 and the draft message 110 from FIG. 1E being sent to the person "M" in response to the gesture 146.

As one of skill in the art will appreciate, aspects of the method 600 can be combined and/or replaced with aspects of the method 500. For example, the method 600 can be performed prior to (or after) the method 500. The method 600 can include the operations of method 500, e.g., operations from method 500 can be performed after operation 614 and prior to operation 628 (so as to edit a message prior to it being sent to another user). As another example, the operation 506 can be replaced with the operation 614.

Having thus described example sequences and methods of operation that make use of the example sequences, attention will now be directed to system-level depictions of hardware and software on which (or with which) the methods can be implemented.

Example System-Level Block Diagrams

Figure 7A:
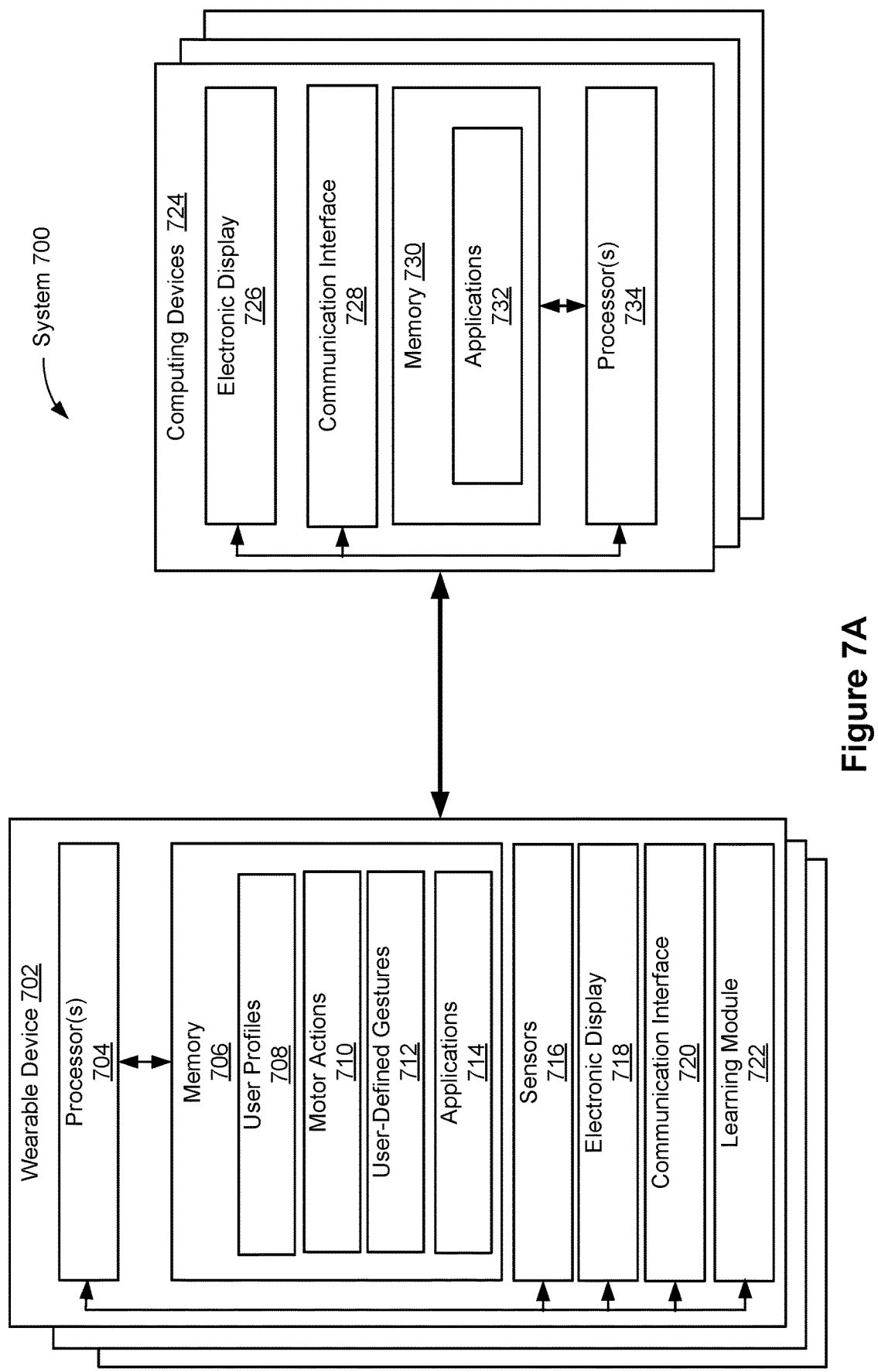
FIGS. 7A-7B are block diagrams illustrating example artificial-reality systems in accordance with some embodiments.
Figure 7B:
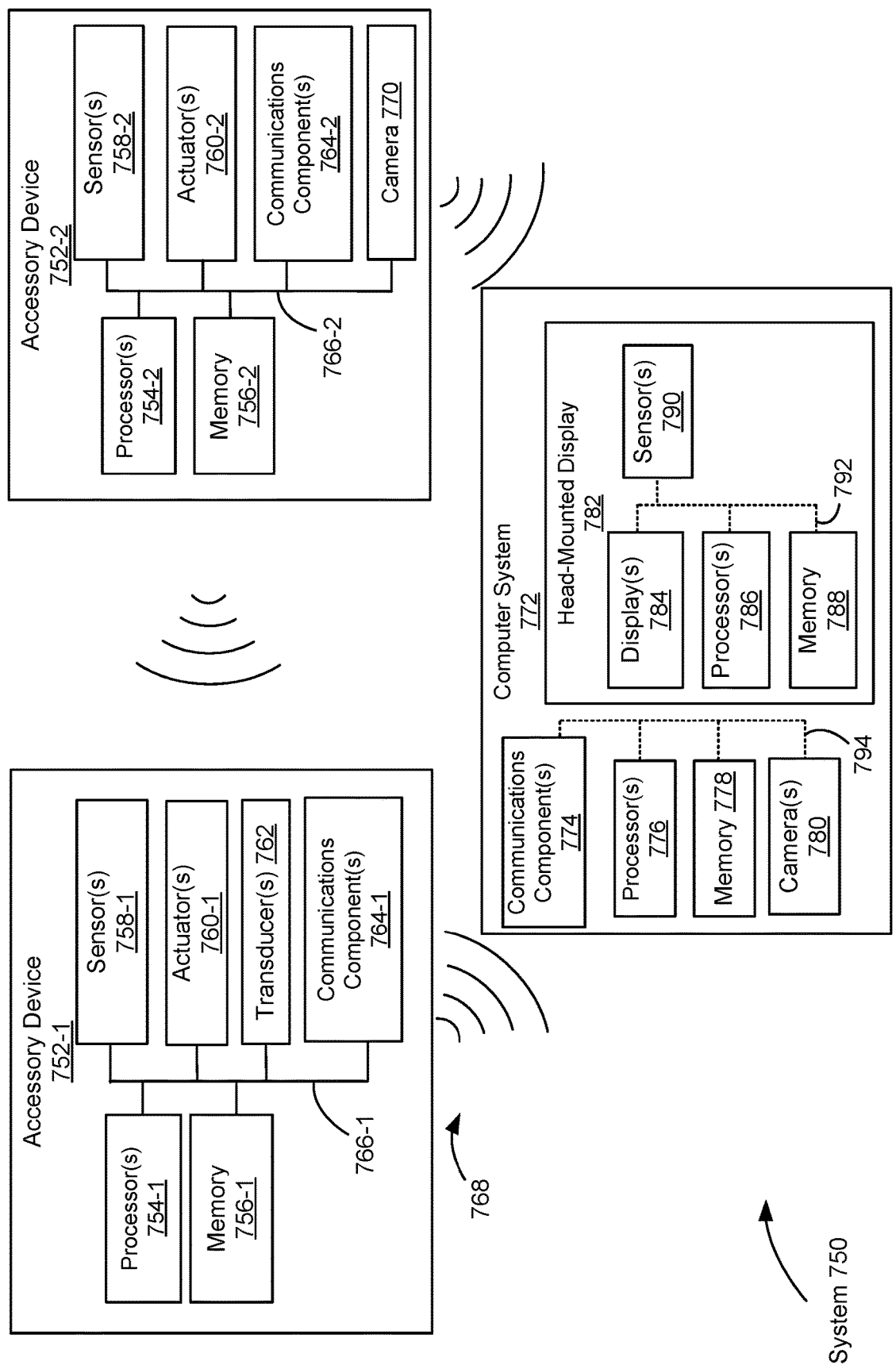

FIGS. 7A-7B are block diagrams illustrating example components used with artificial-reality systems in accordance with some embodiments. FIG. 7A is a block diagram illustrating an artificial-reality system 700 in accordance with some embodiments. While some example features are illustrated, various other features have not been illustrated for the sake of brevity and so as not to obscure pertinent aspects of the example embodiments disclosed herein. To that end, as a non-limiting example, the system 700 includes one or more wearable devices 702, which can be used in conjunction with one or more computing devices 724. In some embodiments, the system 700 provides the functionality of a virtual-reality (VR) device, an augmented-reality (AR) device, a mixed-reality device, hybrid-reality device, or a combination thereof. In some embodiments, the system 700 provides the functionality of a user interface and/or one or more user applications (e.g., games, word processors, messaging applications, calendars, and/or clocks).

In some embodiments, the system 700 provides the functionality to control or provide commands to the one or more computing devices 724 based on a wearable device 702 determining motor actions or intended motor actions of the user. A motor action is an intended motor action where before the user performs the motor action or before the user completes the motor action the detected neuromuscular signals traveling through the neuromuscular pathways can be determined to be the motor action. Motor actions can be detected based on the detected neuromuscular signals, but can additionally (using a fusion of the various sensor inputs), or alternatively, be detected using other types of sensors (such as cameras focused on viewing hand movements and/or using data from an inertial measurement unit that can detect characteristic vibration sequences or other data types to correspond to particular in-air hand gestures). The one or more computing devices 724 include one or more of a head-mounted display, smart phones, tablets, smart watches, laptops, computer systems, AR systems, robots, vehicles, virtual avatars, user interfaces, the wearable device 702, and/or other electronic devices and/or control interfaces.

The wearable device 702 includes a wearable structure worn by the user. In some embodiments, the wearable device 702 is an instance of the wrist-wearable device 104. In some embodiments, the wearable device 702 collects information about a portion of the user's body (e.g., the user's hand and finger position(s) and orientation(s)) that can be used as input to perform one or more commands at the computing device 724. In some embodiments, the collected information about a portion of the user's body (e.g., the user's hand(s) and finger(s) position(s) and orientation(s)) can be used as input to perform one or more command at the wearable device 724 (e.g., selecting content to present on the electronic display 718 of the wearable device 702 or controlling one or more applications 714 locally stored on the wearable device 702). The information collected about the portion of the user's body includes neuromuscular signals that can be used by the one or more processors 704 of the wearable device 702 to determine a motor action that the user intends to perform with their hands and/or fingers.

In the illustrated embodiment, the wearable device 702 includes the one or more processors 704, memory 706, sensors 716, an electronic display 718, a communication interface 720, and a learning module 722. In some embodiments, the memory 706 includes one or more of user profiles 708, motor actions 710, user-defined gestures 712, and applications 714. The wearable device 702 may include additional components that are not shown in FIG. 7A, such as a power source (e.g., an integrated battery or a connection to an external power source), a haptic feedback generator, etc. In some embodiments, one or more of the components shown in FIG. 7A are housed within a conductive hemispherical shape of the wearable device.

In some embodiments, sensors 716 include one or more hardware devices that contact the user's skin (e.g., a wrist of a user 101). In some embodiments, the sensors 716 detect neuromuscular signals from neuromuscular pathways within and on the wrist of a user (the sensors can additionally, or alternatively, be coupled with the head-worn devices discussed herein). In some embodiments, the sensors 716 are configured to detect different digit movements, wrist movements, arm movements, index finger movements, middle finger movements, ring finger movements, little finger movements, thumb movements, hand movements, etc. from the different neuromuscular signals detected from the user's skin. In some embodiments, the sensors 716 are used in pairs to form respective channels for detecting neuromuscular signals, where each channel is a pair of sensors. In some embodiments, the wearable device 702 includes six pairs of sensors 716.

In some embodiments, the one or more processors 704 are configured to receive the neuromuscular signals detected by the sensors 716 and determine a motor action 710. In some embodiments, each motor action 710 is associated with one or more input commands. The input commands when provided to a computing device 724 cause the computing device to perform an action (e.g., as described in detail above, various in-air hand gestures can cause performance of various text-modification actions). Alternatively, in some embodiments the one or more input commands are used to cause the wearable device 702 to perform one or more actions locally (e.g., present a display on the electronic display 718 and/or operate one or more applications 714). For example, the wearable device 702 can be a smart watch and the one or more input commands can be used to cause the smart watch to perform one or more actions. In some embodiments, the motor action 710 and its associate input commands are stored in the memory 706. In some embodiments, the motor actions 710 include digit movements, hand movements, wrist movements, arm movements, pinch gestures, index finger movements, middle finger movements, ring finger movements, little finger movements, thumb movements, hand clenches (or fists), waving motions, and/or other movements of the user's hand or arm.

In some embodiments, the user can define one or more gestures using the learning module 722. Specifically, in some embodiments the user can enter a training phase in which a user-defined gesture is associated with one or more input commands that when provided to a computing device 724 cause the computing device to perform an action. Similarly, the one or more input commands associated with the user-defined gesture can be used to cause the wearable device 702 to perform one or more actions locally. The user-defined gesture, once trained, is stored in the memory 706. Similar to the motor actions 710, the one or more processors 704 can use the detected neuromuscular signals by the sensors 716 to determine that a user-defined gesture was performed by the user.

The one or more applications 714 stored in the memory 706 can be productivity-based applications (e.g., calendars, organizers, word processors), social applications (e.g., social platforms), games, etc. In some embodiments, the one or more applications 714 are presented to the user via the electronic display 718. In some embodiments, the one or more applications 714 are used to facilitate the transmission of information (e.g., to another application running on a computing device 724). In some embodiments, the user can provide one or more input commands based on the determined motor action to the applications 714 operating on the wearable device 702 to cause the applications 714 to perform the input commands.

Additionally, different user profiles 708 can be stored in the memory 706. This allows the wearable device 702 to provide user-specific performance. More specifically, the wearable device 702 can be tailored to perform as efficiently as possible for each user.

The communication interface 720 enables input and output to the computing device 724. In some embodiments, the communication interface 720 is a single communication channel, such as USB. In other embodiments, the communication interface 720 includes several distinct communication channels operating together or independently. For example, the communication interface 720 may include separate communication channels for sending input commands to the computing device 724 to cause the computing device 724 to perform one or more actions. In some embodiments, data from the sensors 716 and/or the determined motor actions 710 are sent to the computing device 724, which then interprets the appropriate input response based on the received data. The one or more communication channels of the communication interface 720 can be implemented as wired or wireless connections. In some embodiments, the communication interface 720 includes hardware capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol, including communication protocols not yet developed as of the filing date of this document.

In some embodiments, the computing device 724 presents media to a user. Examples of media presented by the computing device 724 include images, video, audio, or some combination thereof. Additional examples of media include executed VR applications and/or AR applications to process input data from the sensors 716 on the wearable device 702.

In some embodiments, the media content is based on received information from one or more applications 732 (e.g., productivity applications, social applications, and/or games). The computing device 724 includes an electronic display 726 for presenting media content to the user. In various embodiments, the electronic display 726 comprises a single electronic display or multiple electronic displays (e.g., one display for each eye of a user). The computing device 724 includes a communication interface 728 that enables input and output to other devices in the system 700. The communication interface 728 is similar to the communication interface 720 described above.

In some embodiments, the computing device 724 receives instructions (or commands) from the wearable device 702. In response to receiving the instructions, the computing device 724 performs one or more actions associated with the instructions (e.g., performs the one or more input commands in an AR or a VR environment). Alternatively, in some embodiments the computing device 724 receives instructions from an external device communicatively coupled to the wearable device 702 and, in response to receiving the instructions, performs one or more actions associated with the instructions. In some embodiments, the computing device 724 receives instructions from the wearable device 702 and, in response to receiving the instructions, provides the instruction to an external device communicatively coupled to the computing device 724, which performs one or more actions associated with the instructions. Although not shown, in the embodiments that include a distinct external device, the external device may be connected to the wearable device 702 and/or the computing device 724 via a wired or wireless connection. The external device may be a remote game console, an additional display, an additional head-mounted display, and/or any other additional electronic devices that could be coupled in conjunction with the wearable device 702 and/or the computing device 724.

In some embodiments, the computing device 724 provides information to the wearable device 702, which in turn causes the wearable device to present the information to the user. The information provided by the computing device 724 to the wearable device 702 can include media content (which can be displayed on the electronic display 718 of the wearable device 702), organizational data (e.g., calendars, phone numbers, invitation, directions), and files (e.g., word-processing documents, spreadsheets, or other documents that can be worked on locally from the wearable device 702).

In some embodiments, the computing device 724 is implemented as an integrated system-on-a-chip, a microcontroller, a desktop or laptop computer, a server computer, a tablet, or a smart phone or other mobile device. Thus, the computing device 724 includes components common to typical computing devices, such as the processor(s) 734, random-access memory (RAM), a storage device, a network interface, an input-out (I/O) interface, and the like. The processor may be or include one or more microprocessors or application-specific integrated circuits (ASICs). The memory 730 may be or include RAM, ROM, DRAM, SRAM and MRAM and may include firmware such as static data or fixed instructions, BIOS, system functions, configuration data, and other routines used during the operation of the computing device and the processor. The memory 730 also provides a storage area for data and instructions associated with applications and data handled by the processor.

The storage device provides non-volatile, bulk, or long-term storage of data or instructions in the computing device. The storage device may take the form of a magnetic or solid-state disk, tape, CD, DVD, or other reasonably high-capacity addressable or serial storage medium. Multiple storage devices may be provided or available to the computing device. Some of these storage devices may be external to the computing device, such as network storage or cloud-based storage. The network interface includes an interface to a network and can be implemented as either a wired or wireless interface. The I/O interface interfaces the processor to peripherals (not shown) such as, for example and depending upon the computing device, sensors, displays, cameras, color sensors, microphones, keyboards, and USB devices.

In the example shown in FIG. 7A, the computing device 724 further includes applications 732. In some embodiments, the applications 732 are implemented as software modules that are stored on the storage device and executed by the processor 734. Some embodiments of the computing device 724 include additional or different components than those described in conjunction with FIG. 7A. Similarly, the functions further described below may be distributed among components of the computing device 724 in a different manner than is described here.

Each application 732 is a group of instructions that, when executed by a processor, generates specific content for presentation to the user. For example, an application 732 can include a VR application that generates VR content (such as a VR environment) and that further generates VR content in response to inputs received from the wearable device 702 (based on determined user motor actions). Examples of VR applications include gaming applications, conferencing applications, and video playback applications. Additional examples of applications 732 can include productivity-based applications (e.g., calendars, organizers and word processors), social-based applications (e.g., social media platforms and dating platforms), entertainment (e.g., shows, games, and movies), and travel (e.g., ride-share applications, hotel applications, and airline applications).

In some embodiments, the computing device 724 allows the applications 732 to operate in conjunction with the wearable device 702. In some embodiments, the computing device 724 receives information from the sensors 716 of the wearable device 702 and provides the information to an application 732. Based on the received information, the application 732 determines media content to provide to the computing device 724 (or the wearable device 702) for presentation to the user via the electronic display 726 and/or a type of haptic feedback. For example, if the computing device 724 receives information from the sensors 716 on the wearable device 702 indicating that the user has performed an action (e.g., performed a sword slash in a game, opened a file, or typed a message), the application 732 generates content for the computing device 724 (or the wearable device 702) to present, with the content mirroring the user's instructions based on determined motor actions by the wearable device 702. Similarly, in some embodiments the applications 732 receive information directly from the sensors 716 on the wearable device 702 (e.g., applications locally saved to the wearable device 702) and provide media content to the computing device 724 for presentation to the user based on the information (e.g., determined motor actions by the wearable device 702).

FIG. 7B is a block diagram illustrating a system 750 in accordance with some embodiments. While some example features are illustrated, various other features have not been illustrated for the sake of brevity and so as not to obscure pertinent aspects of the example embodiments disclosed herein. To that end, as a non-limiting example, the system 750 includes accessory devices 752-1 and 752-2 (e.g., wearable devices), which are used in conjunction with a computer system 772 (e.g., a computing device 724).

An example accessory device 752 includes, for example, one or more processors/cores 754 (referred to henceforth as processors), a memory 756, one or more actuators 760, one or more communications components 764, and/or one or more sensors 758. In some embodiments, these components are interconnected by way of a communications bus 766. References to these components of the accessory device 752 cover embodiments in which one or more of these components (and combinations thereof) are included. In some embodiments, the one or more sensors 758 and the one or more transducers 762 are the same components. In some embodiments, the example accessory device 752 includes one or more cameras 770. In some embodiments (not shown), the accessory device 752 includes a wearable structure. In some embodiments, the accessory device and the wearable structure are integrally formed. In some embodiments, the accessory device and the wearable structure are distinct structures yet are part of the system 750. In some embodiments, one or more of the accessory devices 752 is the wrist-wearable device 104.

For example, the accessory device 752-1 may be a ring that is used in conjunction with a wearable structure to utilize data measurements obtained by sensor 758-1 to adjust a fit of the wearable structure. In another example, the accessory device 752-1 and accessory device 752-2 are distinct wristbands to be worn on each wrist of the user.

In some embodiments, a single processor 754 (e.g., processor 754-1 of the accessory device 752-1) executes software modules for controlling multiple accessory devices 752 (e.g., accessory devices 752-1 . . . 752-n). In some embodiments, a single accessory device 752 (e.g., accessory device 752-2) includes multiple processors 754 (e.g., processors 754-2) such as one or more actuator processors, one or more communications component processors, one or more sensor processors, and/or one or more transducer processors. In some embodiments, the one or more actuator processors are configured to adjust a fit of a wearable structure. In some embodiments, the one or more communications processors are configured to control communications transmitted by communications component 764 and/or receive communications by way of communications component 764. In some embodiments, the one or more sensor processors are configured to control operation of sensor 758 and/or receive output from sensors 758. In some embodiments, the one or more transducer processors are configured to control the operation of transducers 762.

In some embodiments, the communications component 764 of the accessory device 752 includes a communications component antenna for communicating with the computer system 772. In some embodiments, the communications component 774 includes a complementary communications component antenna that communicates with the communications component 764. In some embodiments, the data contained within the communication signals alerts the computer system 772 that the accessory device 752 is ready for use. In some embodiments, the computer system 772 sends instructions to the accessory device 752 and, in response to receiving the instructions, the accessory device 752 instructs a transmit electrode and receive electrode to provide coupling information between the receive electrode and the user.

In some embodiments, the one or more actuators 760 are used to adjust a fit of the wearable structure on a user's appendage. In some embodiments, the one or more actuators 760 are also used to provide haptic feedback to the user. For example, each actuator 760 may apply vibration stimulations, pressure stimulations, shear stimulations, or some combination thereof to the user. In some embodiments, the one or more actuators 760 are hydraulic, pneumatic, electric, and/or mechanical actuators.

In some embodiments, the one or more transducers 762 are used to transmit and receive one or more signals 768. In some embodiments, the one or more sensors 758 are used to transmit and receive one or more signals 768. In some embodiments, the one or more sensors 758 and the one or more transducers 762 are part of a same component that is used to transmit and receive one or more signals 768. The signals 768 may be electromagnetic waves, mechanical waves, electrical signals, or any wave/signal capable of being transmitted through a medium. As used herein, a medium includes the wearer's skin, flesh, bone, blood vessels, or some combination thereof.

In addition to transmitting signals (e.g., electrical signals), the accessory device 752 is also configured to receive (e.g., detect, sense) signals transmitted by itself or by another accessory device 752. To illustrate, a first accessory device 752-1 may transmit a plurality of signals through a medium, such as a user's appendage, and a second accessory device 752-2 may receive the signals transmitted by the first accessory device 752-1 through the medium. Furthermore, an accessory device 752 receiving transmitted signals may use the received signals to determine whether the accessory device is in contact with a user.

In some embodiments, the one or more transducers 762 of the accessory device 752-1 include one or more transducers configured to generate and/or receive signals. In some embodiments, integrated circuits (not shown) of the accessory device 752-1, such as a controller circuit and/or signal generator, control the behavior of the transducers 762. In some embodiments, the transmit electrode and/or the receive electrode are part of the one or more transducers 762 of the accessory device 752-1. Alternatively, the transmit electrode and/or the receive electrode may be part of the one or more sensors 758-1 of the accessory device 752-1, or the transmit electrode may be part of a transducer 762 while the receive electrode may be part of a sensor 758-1 (or vice versa).

In some embodiments, the sensors 758 include one or more of the transmit electrode and the receive electrode for obtaining coupling information. In some embodiments, the sensors 758 includes one or more neuromuscular sensors. In some embodiments, the neuromuscular sensors include one or more surface electromyography (sEMG) sensors, mechanomyography (MMG) sensors, and/or sonomyography (SMG) sensors. Additional non-limiting examples of the sensors 758 (and the sensors 790) include infrared, pyroelectric, ultrasonic, microphone, laser, optical, Doppler, gyro, accelerometer, resonant LC sensors, capacitive sensors, acoustic sensors, and/or inductive sensors. In some embodiments, the sensors 758 (and the sensors 790) are configured to gather additional data about the user (e.g., an impedance of the user's body). Examples of sensor data output by these sensors include body temperature data, infrared range-finder data, motion data, activity recognition data, silhouette detection and recognition data, gesture data, heart rate data, and other wearable-device data (e.g., biometric readings and output, accelerometer data).

The computer system 772 is a computing device that executes artificial-reality applications (e.g., VR applications and/or AR applications) to process input data from the sensors 790 on the head-mounted display 782 and the sensors 758 on the accessory device 752. The computer system 772 provides output data to at least (i) the electronic display 784 on the head-mounted display 782 and (ii) the accessory device(s) 752. In some embodiments, the head-mounted display 782 is an instance of the head-mounted display 102 or the AR glasses 202.

The computer system 772 includes one or more processors/cores 776, the memory 778, one or more communications components 774, and/or one or more cameras 780. In some embodiments, these components are interconnected by way of a communications bus 794. References to these components of the computer system 772 cover embodiments in which one or more of these components (and combinations thereof) are included.

In some embodiments, the computer system 772 is a stand-alone device that is coupled to a head-mounted display 782. For example, the computer system 772 has processor(s)/core(s) 776 for controlling one or more functions of the computer system 772 and the head-mounted display 782 has processor(s)/core(s) 786 for controlling one or more functions of the head-mounted display 782. Alternatively, in some embodiments the head-mounted display 782 is a component of the computer system 772. For example, the processor(s) 776 control functions of the computer system 772 and the head-mounted display 782. In addition, in some embodiments the head-mounted display 782 includes the processor(s) 786 that communicate with the processor(s) 776 of the computer system 772. In some embodiments, communications between the computer system 772 and the head-mounted display 782 occur via a wired (or wireless) connection between communications bus 794 and communications bus 792. In some embodiments, the computer system 772 and the head-mounted display 782 share a single communications bus. In some embodiments, the head-mounted display 782 is separate from the computer system 772.

The computer system 772 may be any suitable computer device, such as a laptop computer, a tablet device, a netbook, a personal digital assistant, a mobile phone, a smart phone, an artificial-reality console or device (e.g., a VR device, an AR device, or the like), a gaming device, a computer server, or any other computing device. The computer system 772 is sometimes called a host or a host system. In some embodiments, the computer system 772 includes other user interface components such as a keyboard, a touch-screen display, a mouse, a track-pad, and/or any number of supplemental I/O devices to add functionality to computer system 772.

In some embodiments, one or more cameras 780 of the computer system 772 are used to facilitate the artificial-reality experience. In some embodiments, the computer system 772 provides images captured by the one or more cameras 780 to the display 784 of the head-mounted display 782, and the display 784 in turn displays the provided images. In some embodiments, the processors 786 of the head-mounted display 782 process the provided images. It is noted that in some embodiments one or more of the cameras 780 are part of the head-mounted display 782.

The head-mounted display 782 presents media to a user. Examples of media presented by the head-mounted display 782 include images, video, audio, or some combination thereof. In some embodiments, audio is presented via an external device (e.g., speakers and/or headphones) that receives audio information from the head-mounted display 782, the computer system 772, or both, and presents audio data based on the audio information. The displayed images may be in VR, AR, or mixed reality. The display 784 displays images to the user in accordance with data received from the computer system 772. In various embodiments, the display 784 comprises a single electronic display or multiple electronic displays (e.g., one display for each eye of a user).

The sensors 790 include one or more hardware devices that detect spatial and motion information about the head-mounted display 782. In some embodiments, the sensors 790 include one or more neuromuscular sensors. In some embodiments, the neuromuscular sensors include one or more sEMG sensors, MMG sensors, and/or SMG sensors. Spatial and motion information can include information about the position, orientation, velocity, rotation, and acceleration of the head-mounted display 782. For example, the sensors 790 may include one or more inertial measurement units that detect rotation of the user's head while the user is wearing the head-mounted display 782. In some embodiments, the sensors 790 include one or more cameras positioned on the head-mounted display 782. In some embodiments, the head-mounted display 782 includes one or more sensors 790. In some embodiments, one or more of the sensors 790 are part of the computer system 772.

Having thus described example block diagrams, attention will now be directed to examples of the wearable devices that can be used in conjunction with the techniques described herein.

Example Wearable Devices (e.g., Wrist-Wearable Devices, Such as Smart Watches, AR Glasses, and VR Goggles/Headsets, which can Form Various Artificial-Reality Systems Used with the Techniques Described Herein)

Figure 8A:
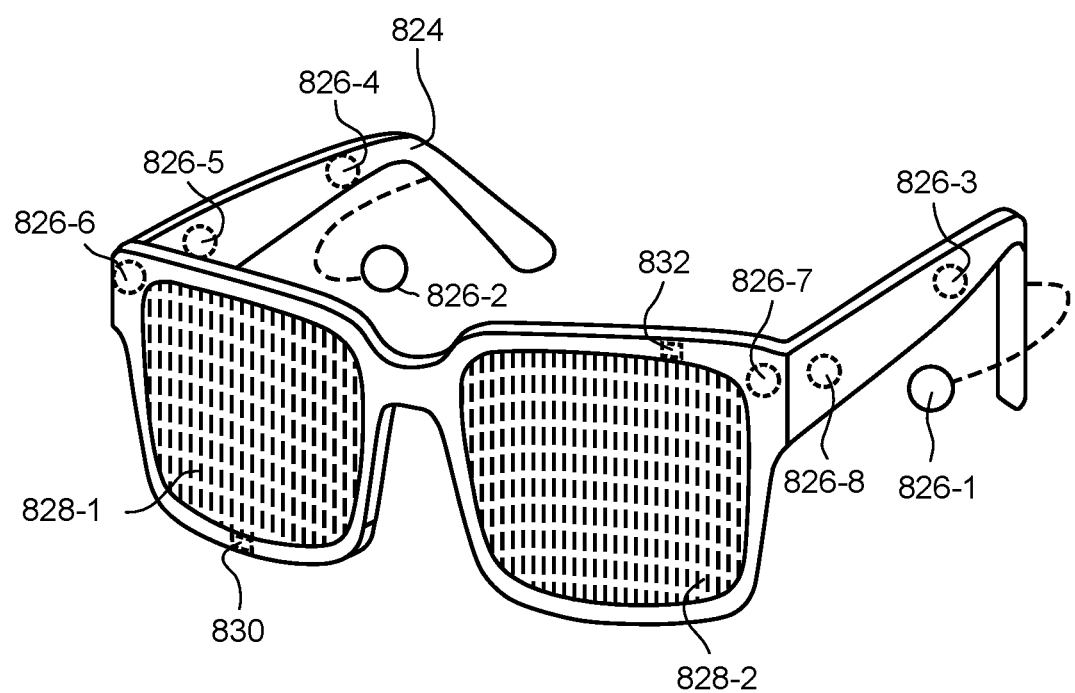
FIG. 8A shows example AR glasses (which can be used with some embodiments of the artificial-reality system) in accordance with some embodiments.

FIG. 8A shows an example augmented-reality (AR) system 820 in accordance with some embodiments. In FIG. 8A, the AR system 820 includes an eyewear device with a frame 824 configured to hold a left display device 828-1 and a right display device 828-2 in front of a user's eyes. The display devices 828-1 and 828-2 may act together or independently to present an image or series of images to a user. While the AR system 820 includes two displays, embodiments of this disclosure may be implemented in AR systems with a single near-eye display (NED) or more than two NEDs. In some embodiments, the AR system 820 is an instance of the AR glasses 202.

In some embodiments, the AR system 820 includes one or more sensors, such as the sensors 830 and 832 (e.g., instances of the sensors 716 of FIG. 7A). For example, the sensors 830 and 832 may generate measurement signals in response to motion of the AR system 820 and may be located on substantially any portion of the frame 810. Each sensor may be a position sensor, an inertial measurement unit (IN/U), a depth camera assembly, or any combination thereof. In some embodiments, the AR system 820 includes more or fewer sensors than is shown in FIG. 8A. In embodiments in which the sensors include an IMU, the IMU may generate calibration data based on measurement signals from the sensors. Examples of the sensors include, without limitation, accelerometers, gyroscopes, magnetometers, other suitable types of sensors that detect motion, sensors used for error correction of the IMU, or some combination thereof.

In some embodiments, the AR system 820 includes a microphone array with a plurality of acoustic sensors 826-1 through 826-8, referred to collectively as the acoustic sensors 826. The acoustic sensors 826 may be transducers that detect air pressure variations induced by sound waves. In some embodiments, each acoustic sensor 826 is configured to detect sound and convert the detected sound into an electronic format (e.g., an analog or digital format). In some embodiments, the microphone array includes 10 acoustic sensors: 826-1 and 826-2, designed to be placed inside a corresponding ear of the user; acoustic sensors 826-3, 826-4, 826-5, 826-6, 826-7, and 826-8 positioned at various locations on the frame 824; and acoustic sensors positioned on a corresponding neckband, where the neckband is an optional component of the system that is not present in certain embodiments of the artificial-reality systems discussed herein. In some embodiments, the neckband is an example of a computing device 724 or the computer system 772.

The configuration of the acoustic sensors 826 of the microphone array may vary. While the AR system 820 discussed with reference to FIG. 8A has 10 acoustic sensors 826, the number of acoustic sensors 826 may be greater or less than 10. In some situations, using more acoustic sensors 826 increases the amount of audio information collected and/or the sensitivity and accuracy of the audio information. In contrast, in some situations, using a lower number of acoustic sensors 826 decreases the computing power required by a controller 836 to process the collected audio information. In addition, the position of each acoustic sensor 826 of the microphone array may vary. For example, the position of an acoustic sensor 826 may include a defined position on the user, a defined coordinate on the frame 824, an orientation associated with each acoustic sensor, or some combination thereof.

The acoustic sensors 826-1 and 826-2 may be positioned on different parts of the user's ear, such as behind the pinna or within the auricle or fossa. In some embodiments, there are additional acoustic sensors on or surrounding the ear in addition to acoustic sensors 826 inside the ear canal. In some situations, having an acoustic sensor positioned next to an ear canal of a user enables the microphone array to collect information on how sounds arrive at the ear canal. By positioning at least two of the acoustic sensors 826 on either side of a user's head (e.g., as binaural microphones), the AR device 820 is able to simulate binaural hearing and capture a three-dimensional (3D) stereo sound field around a user's head. In some embodiments, the acoustic sensors 826-1 and 826-2 are connected to the AR system 820 via a wired connection and, in other embodiments, the acoustic sensors 826-1 and 826-2 are connected to the AR system 820 via a wireless connection (e.g., a Bluetooth connection). In some embodiments, the AR system 820 does not include the acoustic sensors 826-1 and 826-2.

The acoustic sensors 826 on the frame 824 may be positioned along the length of the temples, across the bridge, above or below the display devices 828, or in some combination thereof. The acoustic sensors 826 may be oriented such that the microphone array is able to detect sounds in a wide range of directions surrounding the user wearing AR system 820. In some embodiments, a calibration process is performed during the manufacture of the AR system 820 to determine relative positioning of each acoustic sensor 826 in the microphone array.

In some embodiments, the eyewear device further includes, or is communicatively coupled to, an external device (e.g., a paired device) such as the optional neckband discussed above. In some embodiments, the optional neckband is coupled to the eyewear device via one or more connectors. The connectors may be wired or wireless connectors and may include electrical and/or non-electrical (e.g., structural) components. In some embodiments, the eyewear device and the neckband operate independently without any wired or wireless connection between them. In some embodiments, the components of the eyewear device and the neckband are located on one or more additional peripheral devices paired with the eyewear device, the neckband, or some combination thereof. Furthermore, the neckband is intended to represent any suitable type or form of paired device. Thus, the following discussion of the neckband may also apply to various other paired devices such as smart watches, smart phones, wristbands, other wearable devices, handheld controllers, tablet computers, or laptop computers.

In some situations, pairing external devices, such as the optional neckband, with the AR eyewear device enables the AR eyewear device to achieve the form factor of a pair of glasses while still providing sufficient battery and computation power for expanded capabilities. Some or all of the battery power, computational resources, and/or additional features of the AR system 820 may be provided by a paired device or shared between a paired device and an eyewear device, thus reducing the weight, heat profile, and form factor of the eyewear device overall while still retaining desired functionality. For example, the neckband may allow components that would otherwise be included on an eyewear device to be included in the neckband, thereby shifting a weight load from a user's head to a user's shoulders. In some embodiments, the neckband has a larger surface area over which to diffuse and disperse heat to the ambient environment. Thus, the neckband may allow for greater battery and computation capacity than might otherwise have been possible for a stand-alone eyewear device. Because weight carried in the neckband may be less invasive to a user than weight carried in the eyewear device, a user may tolerate wearing a lighter eyewear device and carrying or wearing the paired device for greater lengths of time than the user would tolerate wearing a heavy stand-alone eyewear device, thereby enabling an artificial-reality environment to be incorporated more fully into a user's day-to-day activities.

In some embodiments, the optional neckband is communicatively coupled with the eyewear device and/or to other devices (e.g., the wrist-wearable device 104). The other devices may provide certain functions (e.g., tracking, localizing, depth mapping, processing, and/or storage) to the AR system 820. In some embodiments, the neckband includes a controller and a power source. In some embodiments, the acoustic sensors of the neckband are configured to detect sound and convert the detected sound into an electronic format (analog or digital).

The controller of the neckband processes information generated by the sensors on the neckband and/or the AR system 820. For example, the controller may process information from the acoustic sensors 826. For each detected sound, the controller may perform a direction-of-arrival estimation to estimate a direction from which the detected sound arrived at the microphone array. As the microphone array detects sounds, the controller may populate an audio data set with the information. In embodiments in which the AR system 820 includes an IMU, the controller 836 may compute all inertial and spatial calculations from the IMU located on the eyewear device. The connector may convey information between the eyewear device and the neckband and between the eyewear device and the controller. The information may be in the form of optical data, electrical data, wireless data, or any other transmittable data form. Moving the processing of information generated by the eyewear device to the neckband may reduce weight and heat in the eyewear device, making it more comfortable and safer for a user to use.

In some embodiments, the power source in the neckband provides power to the eyewear device and the neckband. The power source may include, without limitation, lithium-ion batteries, lithium-polymer batteries, primary lithium batteries, alkaline batteries, or any other form of power storage. In some embodiments, the power source is a wired power source.

As noted, some artificial-reality systems may, instead of blending an artificial reality with actual reality, substantially replace one or more of a user's sensory perceptions of the real world with a virtual experience. One example of this type of system is a head-worn display system, such as the virtual-reality (VR) system 850 in FIG. 8B, which mostly or completely covers a user's field of view.

Figure 8B:
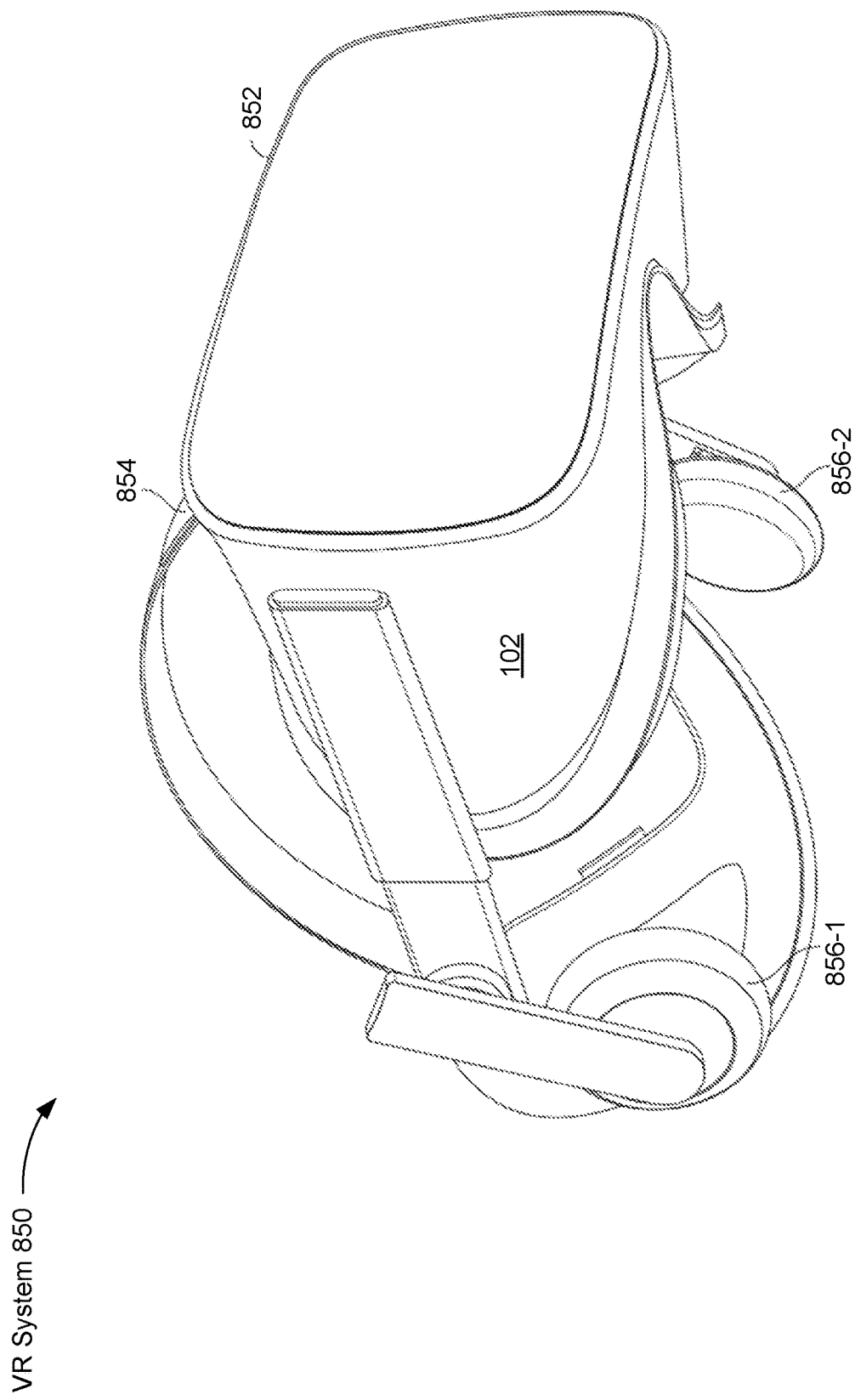
FIG. 8B shows example VR goggles (which can be used with some embodiments of the artificial-reality system) in accordance with some embodiments.

FIG. 8B shows a VR system 850 (e.g., also referred to herein as VR goggles or a VR headset) in accordance with some embodiments. The VR system 850 includes the head-mounted display 102. The head-mounted display 102 includes a front body 852 and a frame 854 (e.g., a strap or band) shaped to fit around a user's head. In some embodiments, the head-mounted display 102 includes output audio transducers 856-1 and 856-2, as shown in FIG. 8B. In some embodiments, the front body 852 and/or the frame 854 includes one or more electronic elements, including one or more electronic displays, one or more IMUs, one or more tracking emitters or detectors, and/or any other suitable device or sensor for creating an artificial-reality experience.

Artificial-reality systems may include a variety of types of visual feedback mechanisms. For example, display devices in the AR system 820 and/or the VR system 850 may include one or more liquid-crystal displays, light-emitting diode (LED) displays, organic LED displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems also include optical subsystems having one or more lenses (e.g., conventional concave or convex lenses, Fresnel lenses, and/or adjustable liquid lenses) through which a user may view a display screen.

In addition to or instead of using display screens, some artificial-reality systems include one or more projection systems. For example, display devices in the AR system 820 and/or the VR system 850 may include micro-LED projectors that project light (e.g., using a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image-projection system.

Artificial-reality systems may also include various types of computer vision components and subsystems. For example, the systems 820 and 850 may include one or more optical sensors such as two-dimensional (2D) or 3D cameras, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIG. 8C, the output audio transducers 856 may include voice coil speakers, ribbon speakers, electrostatic speakers, piezoelectric speakers, bone conduction transducers, cartilage conduction transducers, and/or any other suitable type or form of audio transducer. Similarly, the input audio transducers may include condenser microphones, dynamic microphones, ribbon microphones, and/or any other type or form of input transducer. In some embodiments, a single transducer is used for both audio input and audio output.

In some embodiments, the artificial-reality systems 820 and 850 include haptic (tactile) feedback systems, which may be incorporated into headwear, gloves, body suits, handheld controllers, environmental devices (e.g., chairs or floor mats), and/or any other type of device or system, such as the wearable devices discussed herein. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback may be implemented using motors, piezoelectric actuators, fluidic systems, and/or a variety of other types of feedback mechanisms. The haptic feedback systems may be implemented independently of other artificial-reality devices, within other artificial-reality devices, and/or in conjunction with other artificial-reality devices.

Figure 9A:
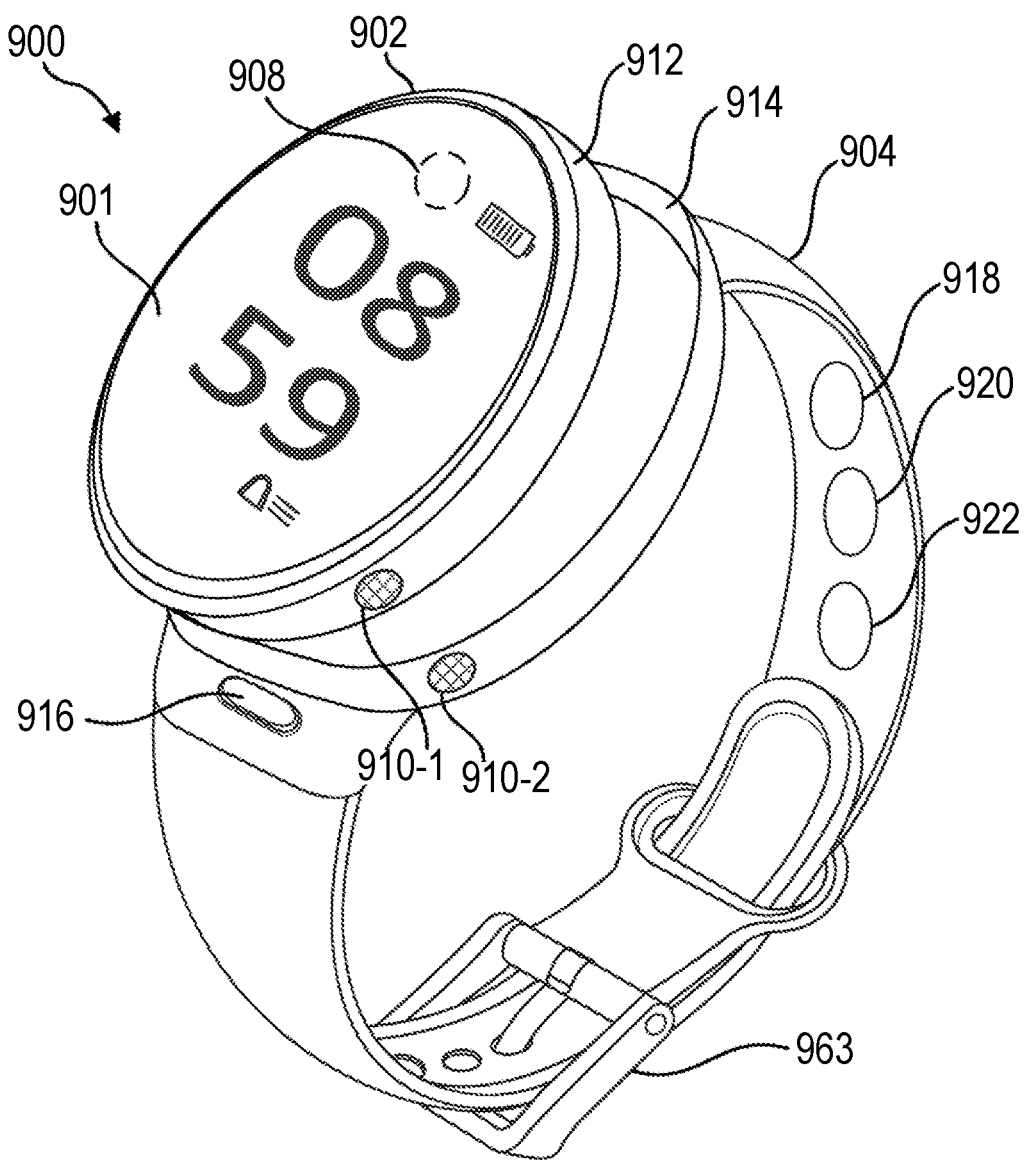
FIGS. 9A-9C illustrate example wearable devices in accordance with some embodiments.
Figure 9B:
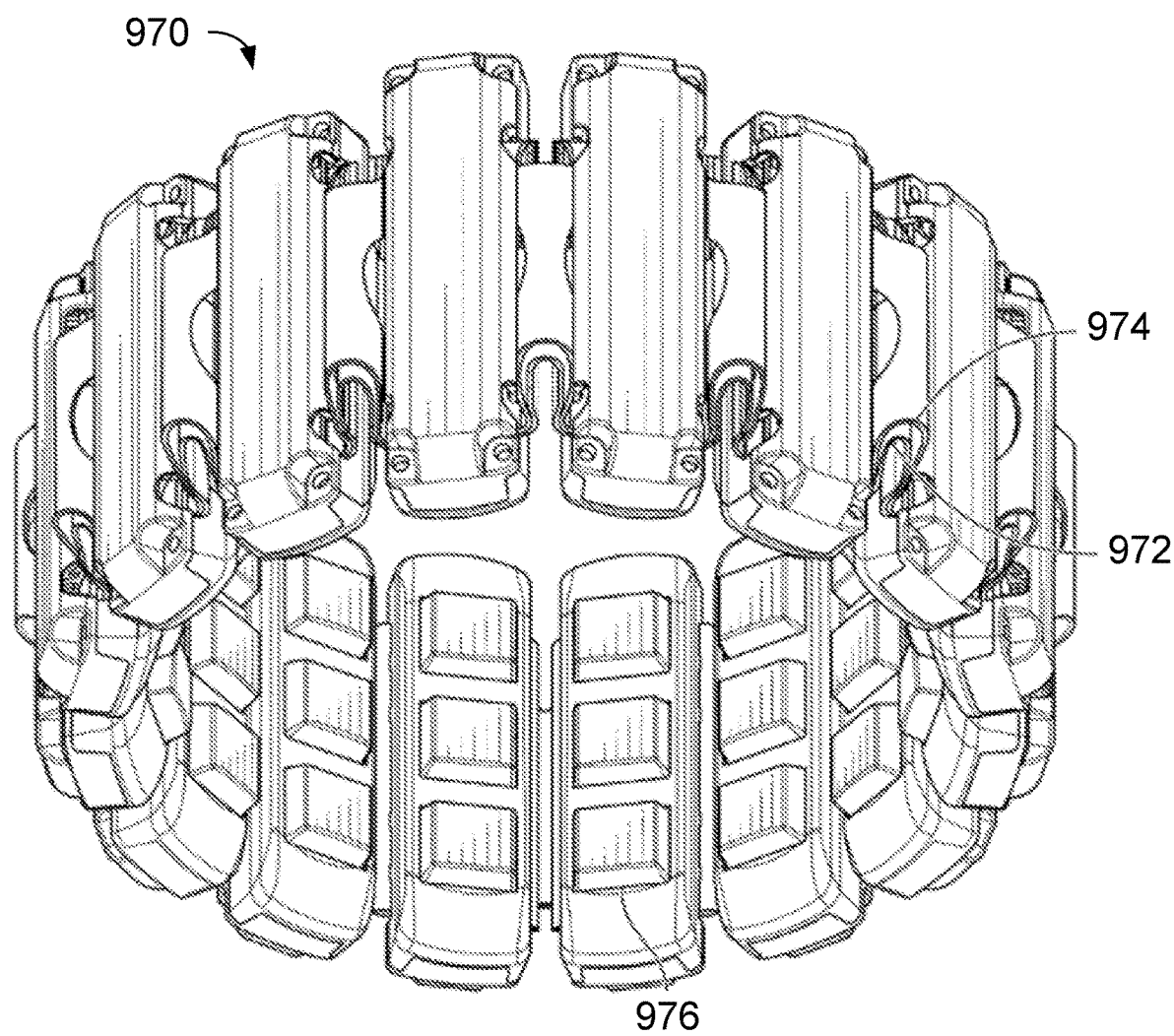
Figure 9C:
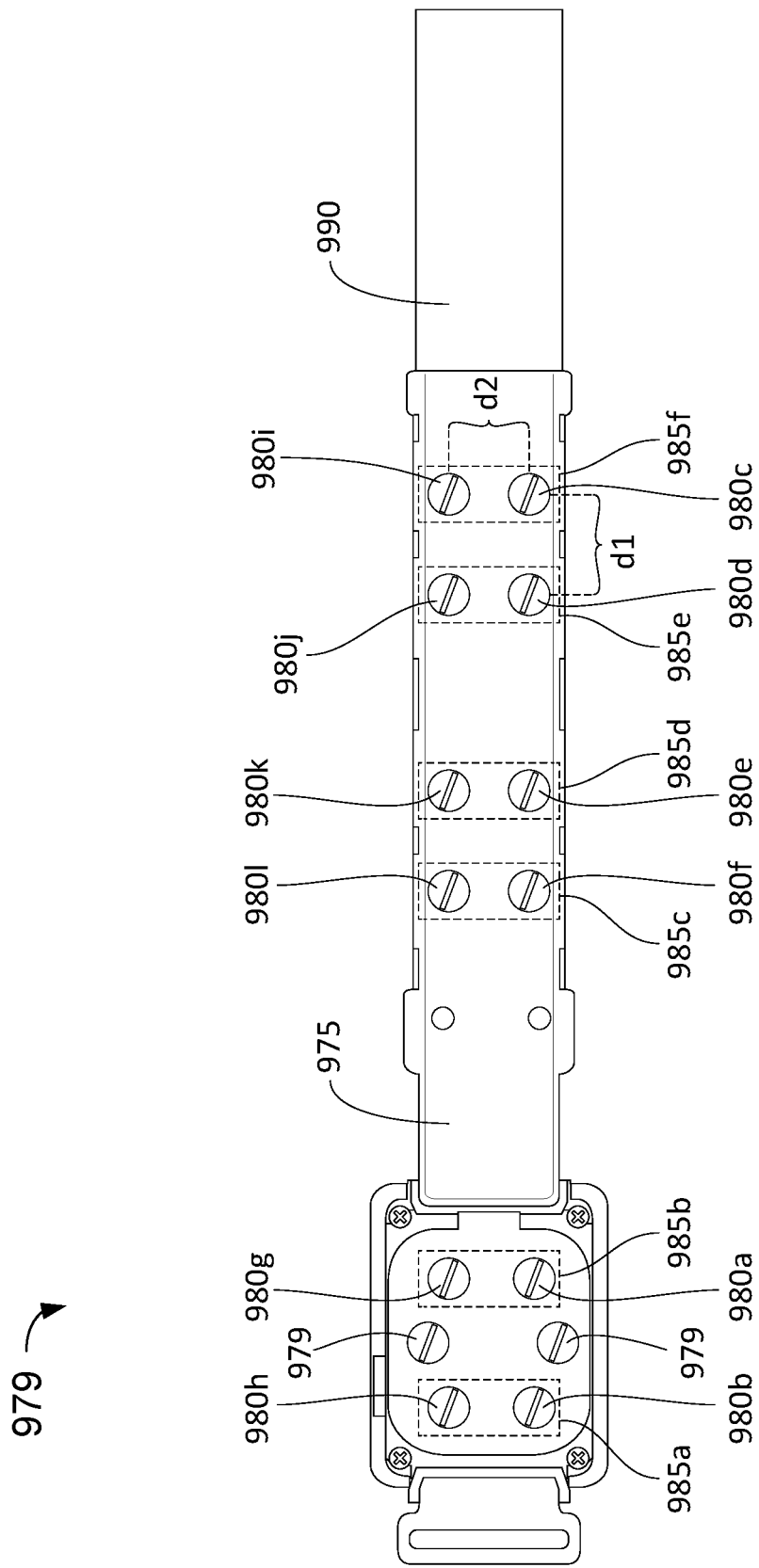

FIGS. 9A-9C illustrate examples of wearable devices in accordance with some embodiments. FIG. 9A illustrates a wearable device 900 in accordance with some embodiments. The wrist-wearable device 104 shown and described in reference to FIGS. 1A-4E can be an instance of the wearable device 900. FIG. 9A illustrates a perspective view of the wearable device 900 that includes a device body 902 decoupled from a device band 904. The device body 902 and the device band 904 are configured to allow a user to wear the wearable device 900 on a body part (e.g., a wrist). The wearable device 900 includes a retaining mechanism 963 (e.g., a buckle or a hook and loop fastener) for securing the device band 904 to the user's body. The wearable device 900 also includes a coupling mechanism 914 (e.g., a cradle) for detachably coupling the device body 902 (via a coupling surface 912 of the device body 902) to the device band 904.

Functions executed by the wearable device 900 can include, without limitation, display of visual content to the user (e.g., visual content displayed on display screen 901), sensing user input (e.g., sensing a touch on button 916, sensing biometric data on sensor 918, or sensing neuromuscular signals on neuromuscular sensor 920), messaging (e.g., text, speech, video), image capture, wireless communications (e.g., cellular, near field, Wi-Fi, personal area network), location determination, financial transactions, providing haptic feedback, alarms, notifications, biometric authentication, health monitoring, sleep monitoring, etc. These functions can be executed independently in the device body 902, independently in the device band 904, and/or in communication between the device body 902 and the device band 904. In some embodiments, functions can be executed on the wearable device 900 in conjunction with an artificial-reality environment.

In some embodiments, the device band 904 is configured to be worn by a user such that an inner surface of the device band 904 is in contact with the user's skin. Thus, when worn by a user, the sensor 918 is in contact with the user's skin. In some embodiments, the sensor 918 is a biosensor that senses a user's heart rate, saturated oxygen level, temperature, sweat level, muscle intentions, or a combination thereof. In some embodiments, the device band 904 includes multiple sensors 918 that can be distributed on an inside and/or an outside surface of the device band 904. Additionally, or alternatively, the device body 902 includes the same or different sensors than the device band 904. The device body 902 (e.g., a capsule portion) can include, without limitation, a magnetic field sensor, antenna return loss sensor, front-facing image sensor 908 and/or a rear-facing image sensor, a biometric sensor, an IMU, a heart rate sensor, a saturated oxygen sensor, a neuromuscular sensor (s), an altimeter sensor, a temperature sensor, a bioimpedance sensor, a pedometer sensor, an optical sensor, a touch sensor, and/or a sweat sensor, among others. The sensor 918 can also include a sensor that provides data about a user's environment such as a user's motion (e.g., an IMU), altitude, location, orientation, gait, or a combination thereof. The sensor 918 can also include a light sensor (e.g., an infrared light sensor, a visible light sensor) that is configured to track a position and/or motion of the device body 902 and/or the device band 904. In some embodiments, the device band 904 transmits the data acquired by the sensor 918 to the device body 902 using a wired communication method (e.g., a UART, a USB transceiver) and/or a wireless communication method (e.g., near-field communication, Bluetooth™). In some embodiments, the device band 904 is configured to operate (e.g., to collect data using sensor 918) independent of whether the device body 902 is coupled to or decoupled from the device band 904.

The device band 904 includes a haptic device 922 (e.g., a vibratory haptic actuator) that is configured to provide haptic feedback (e.g., a cutaneous and/or kinesthetic sensation) to the user's skin. The sensor 918 and/or the haptic device 922 can be configured to operate in conjunction with multiple applications including, without limitation, health monitoring, social media, game playing, and artificial reality (e.g., the applications associated with artificial reality).

In some embodiments, the device band 904 includes a neuromuscular sensor 920 (e.g., an EMG sensor, an MMG sensor, an SMG sensor). The neuromuscular sensor 920 senses a user's intention to perform certain motor actions. The sensed muscle intention can be used to control certain user interfaces displayed on the display 901 and/or can be transmitted to a device responsible for rendering an artificial-reality environment (e.g., the head-mounted display device 102) to perform an action in an associated artificial-reality environment, such as to control the motion of a virtual device displayed to the user.

In some embodiments, signals from the neuromuscular sensor 920 are used to provide a user with an enhanced interaction with a physical object and/or a virtual object in an artificial-reality application generated by an artificial-reality system. Although FIG. 9A shows one neuromuscular sensor 920, the device band 904 can include a plurality of neuromuscular sensors 920 arranged circumferentially on an inside surface of the device band 904 such that the plurality of neuromuscular sensors 920 contact the skin of the user. The neuromuscular sensor 920 senses and records neuromuscular signals from the user as they perform muscular activations (e.g., movements, gestures). The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

As shown in the example of FIG. 9A, the device band coupling mechanism 914 can include a type of frame or shell that allows the coupling surface 912 to be retained within the device band coupling mechanism 914. The device body 902 can be detachably coupled to the device band 904 through a friction fit, magnetic coupling, a rotation-based connector, a shear-pin coupler, a retention spring, one or more magnets, a clip, a pin shaft, a hook and loop fastener, or any combination thereof. In some embodiments, the device body 902 is decoupled from the device band 904 by actuation of a release mechanism 910. The release mechanism 910 can include, without limitation, a button, a knob, a plunger, a handle, a lever, a fastener, a clasp, a dial, a latch, or any combination thereof.

FIG. 9B illustrates a wearable device 970, in accordance with some embodiments. In some embodiments, the wrist-wearable device 104 is an instance of the wearable device 970. In some embodiments, the wearable device 970 is used to generate control information (e.g., sensed data about neuromuscular signals or instructions to perform certain commands after the data is sensed) for causing a computing device (e.g., the computer system 772) to perform one or more input commands. In some embodiments, the wearable device 970 includes a plurality of neuromuscular sensors 976. In some embodiments, the plurality of neuromuscular sensors 976 includes a predetermined number (e.g., 16) of neuromuscular sensors (e.g., EMG sensors) arranged circumferentially around an elastic band 974. The plurality of neuromuscular sensors 976 may include any suitable number of neuromuscular sensors. In some embodiments, the number and arrangement of neuromuscular sensors 976 depend on the particular application for which the wearable device 970 is used. For instance, a wearable device 970 configured as an armband, wristband, or chest-band may include a plurality of neuromuscular sensors 976 with a different number of neuromuscular sensors and different arrangement for each use case, such as medical use cases as compared to gaming or general day-to-day use cases. For example, at least 16 neuromuscular sensors 976 may be arranged circumferentially around the elastic band 974.

In some embodiments, the elastic band 974 is configured to be worn around a user's lower arm or wrist. The elastic band 974 may include a flexible electronic connector 972. In some embodiments, the flexible electronic connector 972 interconnects separate sensors and electronic circuitry that are enclosed in one or more sensor housings. Alternatively, in some embodiments, the flexible electronic connector 972 interconnects separate sensors and electronic circuitry that are outside of the one or more sensor housings. Each neuromuscular sensor of the plurality of neuromuscular sensors 976 can include a skin-contacting surface that includes one or more electrodes. One or more sensors of the plurality of neuromuscular sensors 976 can be coupled using flexible electronics incorporated into the wearable device 970.

FIG. 9C illustrates a wearable device 979 in accordance with some embodiments. In some embodiments, the wrist-wearable device 104 is an instance of the wearable device 979. The wearable device 979 includes paired sensor channels 985*a*-985*f* along an interior surface of a wearable structure 975 that are configured to detect neuromuscular signals. Different number of paired sensors channels can be used (e.g., one pair of sensors, three pairs of sensors, four pairs of sensors, six pairs of sensors). The wearable structure 975 can include a band portion 990, a capsule portion 995, and a cradle portion (not pictured) that is coupled with the band portion 990 to allow for the capsule portion 995 to be removably coupled with the band portion 990. For embodiments in which the capsule portion 995 is removable, the capsule portion 995 can be referred to as a removable structure, such that in these embodiments the wearable device includes a wearable portion (e.g., the band portion 990 and the cradle portion) and a removable structure (the removable capsule portion which can be removed from the cradle). In some embodiments, the capsule portion 995 includes the one or more processors and/or other components of the wearable device 702 described above in reference to FIG. 7A. The wearable structure 975 is configured to be worn by a user 101. More specifically, the wearable structure 975 is configured to couple the wearable device 979 to a wrist, an arm, a forearm, or other portion of the user's body. Each paired sensor channels 985*a*-985*f* includes two electrodes 980 (e.g., electrodes 980*a*-980*h*) for sensing neuromuscular signals based on differential sensing within each respective sensor channel. In accordance with some embodiments, the wearable device 970 further includes an electrical ground and a shielding electrode.

The techniques described above can be used with any device for sensing neuromuscular signals, including the arm-wearable devices of FIG. 9A-9C, but could also be used with other types of wearable devices for sensing neuromuscular signals (such as body-wearable or head-wearable devices that might have neuromuscular sensors closer to the brain or spinal column).

Having thus described system-block diagrams and then example wearable devices, attention will now be directed to certain example embodiments.

Example Embodiments

Turning now to some example embodiments of the methods, devices, systems, and computer-readable storage media described earlier. In short, the descriptions below proceed by first discussing the paragraphs beginning with an A symbol, which are related to an aspect in which in-air hand gestures are used to allow for initiating and interacting with a text-modification mode; following that is a discussion of paragraphs beginning with a B symbol, which relate to an aspect in which a specific in-air hand gesture is used to activate a microphone to enable inputting of voice-provided text.

(A1) In one aspect, some embodiments include a method (e.g., the method 500) of modifying text. The method is performed at a wearable device (e.g., the wearable device 702) having a memory (e.g., memory 706) and one or more processors (e.g., processor(s) 704). The method includes (i) causing display, using a display that is in communication with a wearable device (e.g., the display 718 or the display 726), of a plurality of text terms input by a user (e.g., the draft message 110, FIG. 1A); (ii) detecting, using data from one or more neuromuscular-signal sensors (e.g., the sensors 716) in communication with the wearable device, an in-air hand gesture performed by the user while the plurality of text terms are displayed (e.g., the gesture 120, FIG. 1B); (iii) in response to the in-air hand gesture, enabling a text-modification mode that allows for modifying the plurality of text terms input by the user; and (iv) while the text-modification mode is enabled (a) identifying a target term of the plurality of text terms (e.g., the term 130, FIG. 1C), (b) receiving data about a voice input provided by the user for modifying the target term (e.g., the spoken replacement term 134, FIG. 1D), and (c) causing a modification to the target term in accordance with the voice input from the user (e.g., the replacement term 136, FIG. 1D). In some embodiments, the target term is identified before the text-modification mode is enabled. In some embodiments, the target term is identified prior to detecting the in-air hand gesture.

In some embodiments, the wearable device is a wrist-wearable device, such as a smart watch (e.g., the wrist-wearable device 104). In some embodiments, the wearable device includes an inertial measuring unit (IMU). In some embodiments, the wearable device is a head-worn wearable device, such as smart glasses (e.g., the augmented-reality (AR) glasses 202). The methods described herein, in addition to being performed at a wearable device, can also be performed at an artificial-reality system (e.g., the system 700) that includes both a wrist-wearable device and a head-worn wearable device, among other hardware accessories or components.

In some embodiments, by using the data from the one or more neuromuscular-signal sensors, an in-air hand gesture described herein is detected before its performance has been completed by the user, such as detecting an intention to perform the in-air hand gesture followed by completion of the in-air hand gesture, which can either be separately detected or determined based on the user's intention to perform the in-air hand gesture.

In some embodiments, the in-air hand gestures described herein include movement of a user's wrist, elbow, and shoulder (e.g., an arm lift or wave gesture). In some embodiments, the in-air gesture is a text-modification-initiation gesture (e.g., a double pinch gesture). In some embodiments, the in-air gesture is a gesture that does not contact the wearable device.

(A2) The method of A1, where the target term is identified based on a gaze of the user (e.g., using an AR/virtual-reality (VR) gaze-tracking component). For example, a user's gaze is tracked using the camera(s) 770 and/or the camera(s) 780 of the system 750.

(A3) The method of A1 or A2, where (i) the target term is identified in accordance with detection, using data from the one or more neuromuscular-signal sensors, of an additional in-air hand gesture performed by the user; and (ii) the additional in-air hand gesture is distinct from the in-air hand gesture (e.g., a tap, swipe, or scroll gesture). In some embodiments, the additional in-air hand gesture is a thumb d-pad-like movement, detected via the neuromuscular-signal sensors, to indicate which word should be modified. In some embodiments, the target term is highlighted using a first gesture (e.g., a d-pad-style thumb movement), then selected using a second gesture (e.g., an in-air force pinch gesture). In some embodiments, an IMU is used to control a cursor to select the target term.

(A4) The method of any of A1-A3, further including, while the text-modification mode is enabled, (i) tracking a user gaze and (ii) causing the target term to be emphasized on the display in accordance with the user gaze, where identifying the target term includes detecting, using data from the one or more neuromuscular-signal sensors, an additional in-air hand gesture while the target term is emphasized. In some embodiments, emphasizing the target term includes one or more of highlighting, bolding, changing text style, changing text color, underlining, italicizing, and the like (e.g., the first in-air gesture is a held pinch, and the second in-air gesture is a harder pinch). In some embodiments, the plurality of text terms are displayed in a display mode and wherein the user gaze is not tracked while in the display mode. In some embodiments, gaze tracking is performed using one or more of a contact lens with embedded sensors for measuring eye movements, electrode(s) placed in proximity to the user's eyes (e.g., using electrooculography), and optical sensors (e.g., for detecting reflections in a user's eyes, such as corneal reflections). In some embodiments, the optical sensors track eye features to monitor eye movement and determine gaze direction.

(A5) The method of A4, where the user gaze is not tracked while the text-modification mode is disabled. In some embodiments, the user gaze is not tracked while in a text-display mode. For example, the gaze tracking components are disabled (powered off) to conserve power on the wearable device and increase user privacy.

(A6) The method of any of A1-A5, further including, while the text-modification mode is enabled, causing a first term of the plurality of text terms to be emphasized on the display, where (i) the first term appears before the target term in the plurality of text terms, (ii) the voice input is received while the first term is emphasized on the display, and (iii) the voice input is determined to modify a phrase that includes the first term and the target term. For example, the phrase "pick up Sally" is modified to "pick up Calli" where "pick" is the first term and "Sally" is the target term. In some embodiments, the target term is identified from context and term type from a subset of terms near the first term (e.g., in a same paragraph or line, or within 20, 10, or 5 words of the first term). In some embodiments, the phrase begins with the first term.

(A7) The method of any of A1-A6, where the target term is identified based on a determination that a term type of the target term matches a classification of the voice input from the user. For example, the term type of the target term is matched to the classification of the voice input using a word classifier and context for the voice input. In some embodiments, the target term is identified using automatic speech recognition to determine that the voice input from the user is a word that is of a same type as the target word (e.g., the voice input comprises a proper noun, a day, a date, a time, a number, or a location). In some embodiments, the target term is identified as a homophone of the voice input from the user.

(A8) The method of any of A1-A7, further including, prior to causing display of the plurality of text terms, (i) detecting, using data from the one or more neuromuscular-signal sensors, an additional in-air hand gesture performed by the user, the additional in-air hand gesture being distinct from the in-air hand gesture; (ii) in response to the additional in-air hand gesture, enabling an input mode; and (iii) while in the input mode, receiving data about the plurality of text terms input by the user and causing the display of each of the plurality of text terms as the data is received. For example, FIGS. 4B-4D illustrate the user 101 providing inputs while holding the gesture 408. FIGS. 4B-4D further show text 410 and 422 being displayed in the messenger application 108 in response to the provided inputs.

(A9) The method of A8, where the plurality of text terms are received via additional voice inputs provided by the user. For example, in FIG. 4C the user 101 provides voice inputs 409 that are converted to the text 410.

(A10) The method of any of A1-A9, where the plurality of text terms input by the user are caused to be displayed on a display of the wearable device. For example, FIG. 2E shows a draft message 206 displayed to the user 101 with the terms in the phrase 232 corresponding to the replacement phrase 230.

(A11) The method of any of A1-A10, where the wearable device is a wrist-wearable device that is configured to send instructions to a head-worn wearable device that includes the display. For example, the wearable device is the wrist-wearable device 104, 900, 970, or 979. As an example, the head-worn wearable device is the head-mounted display device 102 or the AR glasses 202.

(A12) The method of any of A1-A11, further including: (i) after modifying the target term, exiting the text-modification mode; and (ii) after exiting the text-modification mode and in response to detecting an additional in-air hand gesture using data from the one or more neuromuscular-signal sensors, causing the plurality of text terms, including the target term after it has been modified, to be sent to one or more other users via a messaging application. For example, the additional gesture is a double thumb swipe-right gesture. In some embodiments, exiting includes transitioning to a different mode such as a text-display mode in which text is viewable but is not editable until the text-modification mode is re-enabled. In some embodiments, sending the plurality of text terms is in accordance with a two-step process including a first gesture to request the sending and a second gesture to confirm the sending. This two-step process can help to avoid circumstances in which a user might accidentally send a message before they are ready to do so. In addition to, or as an alternative to the two-step process, the additional in-air hand gesture that is used to cause the sending of a message can be selected to ensure that accidental sending incidents occur less frequently, such as by selecting an in-air hand gesture that is less likely to be accidentally performed by the user and/or detected by the system.

(A13) The method of any of A1-A12, further including, while the text-modification mode is enabled: (i) detecting, using data from the one or more neuromuscular-signal sensors, an additional in-air hand gesture performed by the user, the additional in-air hand gesture being distinct from the in-air hand gesture; and (ii) in response to the additional in-air hand gesture, causing the display of a context menu in proximity to the plurality of text terms. For example, FIG. 3B shows the user 101 performing the gesture 320 and the context menu 322 being displayed in response. In some embodiments, the context menu includes options to copy, cut, and/or paste text.

(A14) The method of A13, further including, while the text-modification mode is enabled: (i) detecting, using data from the one or more neuromuscular-signal sensors, one more in-air hand gesture performed by the user, the one more in-air hand gesture being distinct from the in-air hand gesture and the additional in-air hand gesture; and (ii) in response to the one more in-air hand gesture, causing display of one or more modifiers. For example, FIG. 3F shows the user 101 performing the gesture 356 and the modifiers menu 357 being displayed in response.

(A15) The method of any of A1-A14, further including, while the text-modification mode is enabled: (i) detecting, using data from the one or more neuromuscular-signal sensors, an additional in-air hand gesture performed by the user; and (ii) in response to the additional in-air hand gesture, causing a deletion of one or more terms of the plurality of text terms from being displayed on the display. For example, FIG. 3E shows the user 101 performing the gesture 350 (e.g., a fist gesture) and the emphasized term 342 in FIG. 3D having been deleted in FIG. 3E in response to the gesture 350. In some embodiments, performance of the deletion gesture (e.g., the fist gesture) when a caret is placed will cause the character at the caret in the term to be deleted. In some embodiments, performance of the deletion gesture when a term is selected will cause the entire term to be deleted.

(A16) The method of any of A1-A15, further including, while the text-modification mode is enabled: (i) detecting, using data from the one or more neuromuscular-signal sensors, an additional in-air hand gesture performed by the user, the additional in-air hand gesture being a same or different gesture from the in-air hand gesture; and (ii) in response to the additional in-air hand gesture, exiting the text-modification mode. For example, FIG. 3H shows the user 101 performing the gesture 360 and the word-processing application 301 disabling the text-modification mode in response to the gesture 360. In some embodiments, the additional in-air gesture is an exit gesture, e.g., a gesture that performs an action that is similar to action performed after a press of an escape (ESC) key or back command in any mode.

(A17) The method of any of A1-A16, further including, while causing the display of the plurality of text terms, causing the display of a representation of one or more available gesture commands. For example, FIG. 3A shows the actions menu 308 with each action 310 in the actions menu 308 including an indication of the corresponding gesture for the user 101.

(A18) The method of A17, where the one or more available gesture commands are based on an operational mode of the wearable device and the representation is updated as the operational mode of the wearable device changes. In some embodiments, the one or more available gestures include all available gesture commands. In some embodiments, all available gesture commands are ranked, and the one or more available gesture commands include one or more top-ranked commands (e.g., ranked by likelihood of use). For example, the plurality of actions 364 in FIG. 3H is different from the plurality of actions in the actions menu 308 in FIG. 3A due to the word-processing application 301 being in a different mode (e.g., text-modification mode being enabled in FIG. 3A and disabled in FIG. 3H).

(A19) The method of any of A1-A18, further including, while the text-modification mode is enabled: (i) causing a first term of the plurality of text terms to be emphasized on the display; (ii) while causing the first term to be emphasized, detecting, using data from the one or more neuromuscular-signal sensors, an additional in-air hand gesture performed by the user; and (iii) in response to the additional in-air hand gesture, displaying a menu with one or more replacement options for the first term, wherein the one or more replacement options are obtained from a speech model. For example, FIG. 3B shows the user 101 performing the gesture 320 and shows the context menu 322 including the plurality of options 324 in response to the gesture 320. In some embodiments, the one or more replacement options include one or more terms and one or more graphical objects (e.g., emojis).

(B1) In another aspect, some embodiments include a method (e.g., the method 600) of inputting text. The method is performed at a wearable device (e.g., the wearable device 702) having memory (e.g., memory 706) and one or more processors (e.g., processor(s) 704). The method includes: (i) while data associated with a messaging application (e.g., the messenger application 108) is displayed on a display (e.g., the display 718 or the display 726) that is in communication with the wearable device, detecting, using data from one or more neuromuscular-signal sensors (e.g., the sensors 716) in communication with the wearable device, an in-air hand gesture performed by the user (e.g., the gesture 408, FIG. 4B); (ii) in response to the in-air hand gesture, enabling a microphone to capture audio for use in conjunction with the messaging application; (iii) receiving data about a voice input from the user via the microphone (e.g., the voice inputs 409); (iv) converting the voice input to a plurality of text terms (e.g., the text 410); and (v) causing a display, within the messaging application on the display, of the plurality of text terms to the user. For example, FIG. 4B shows the user 101 performing the gesture 408 while the messenger application 108 is displayed and FIG. 4C shows the user 101 providing the voice inputs 409 and the text 410 corresponding to the voice inputs 409 in the new message 402.

(B2) The method of B1, where the in-air hand gesture is a gesture during which the user's thumb is held against a user's digit for at least a predetermined period (e.g., a thumb and middle finger pinch gesture), and the method further includes disabling the microphone in response to detecting release of the in-air hand gesture. For example, the gesture 408 in FIGS. 4B-4D is a thumb and index finger pinch gesture. To continue the example, FIG. 4E shows the gesture 408 having been released and the microphone being disabled in response (as denoted by the status message 434).

(B3) The method of B1, where the in-air hand gesture is a toggle gesture that is detected at a first point in time, and the method further includes disabling the microphone in response to a subsequent detection of the in-air hand gesture at a second point in time that is after the first point in time. In some embodiments, the in-air hand gesture is a double thumb and middle finger pinch gesture (e.g., to enable the microphone). In some embodiments, a second in-air hand gesture is subsequently detected (e.g., a flick gesture) to disable the microphone (e.g., after providing voice inputs).

(B4) The method of any of B1-B3, further including: (i) while causing the display of the plurality of text terms within the messaging application, detecting, using data from the one or more neuromuscular-signal sensors, an additional in-air hand gesture; (ii) in response to the additional in-air gesture, enabling a text-modification mode; (iii) while the text-modification mode is enabled, tracking a gaze of the user with respect to the plurality of text terms displayed within the messaging application; and (iv) causing a term of the plurality of text terms to be emphasized in accordance with the tracking of the gaze of the user. For example, FIG. 2B shows the augmented-reality glasses 202 tracking the gaze of the user 101 (e.g., as denoted by the gaze lines 214). FIG. 2B further shows the term 215 emphasized in accordance with the user gaze tracking. The wearable device identifies the target term by detecting, using data from the one or more neuromuscular-signal sensors, a fourth in-air hand gesture while the target term is emphasized. For example, FIG. 2D shows the emphasized term 216 from FIG. 2C selected in accordance with the gesture 220 and the gaze-tracking lines 214. In some embodiments, the emphasized term is selected in accordance with a selection gesture (e.g., a thumb and index finger pinch gesture). In some embodiments, the selected term is moved (e.g., dragged) by the user holding the selection gesture and moving their hand and inserted at a new location by the user releasing the selection gesture. In some embodiments, the emphasized term is indicated by the user with placement of a caret (e.g., using a gaze-tracking and a caret placement gesture, such as a thumb and index finger pinch gesture). In some embodiments, the selection gesture is a double thumb and index finger pinch gesture.

(B5) The method of B4, further including, while the text-modification mode is enabled, (i) detecting, using data from the one or more neuromuscular-signal sensors, one more in-air hand gesture performed by the user, and, (ii) in response to the one more in-air hand gesture, causing a deletion of the emphasized term. For example, FIG. 3E shows the user 101 performing the gesture 350 and the emphasized term 342 in FIG. 3D having been deleted in FIG. 3E in response to the gesture 350.

(B6) The method of B4 or B5, where the gaze of the user is not tracked prior to enabling the text-modification mode. In some embodiments, user gaze tracking is disabled while in one or more non-text-modification modes (e.g., a text-input mode or text-display mode). In some embodiments, user gaze tracking is only enabled while the text-modification mode is enabled.

(B7) The method of any of B1-B6, further including: (i) in response to the in-air hand gesture, enabling an input mode; (ii) while the input mode is enabled and after converting the voice input to the plurality of text terms, detecting, using data from the one or more neuromuscular-signal sensors, an additional in-air hand gesture performed by the user; and (iii) in response to the additional in-air hand gesture, causing a deletion of a term of the plurality of text terms. For example, FIG. 4F shows the user 101 performing the gesture 440 and the corresponding deletion of the last term in the message 433 ("stop") in FIG. 4E.

(B8) The method of any of B1-B7, further including: (i) after causing a display of the plurality of text terms to the user, detecting, using data from the one or more neuromuscular-signal sensors, an additional in-air hand gesture, the additional in-air hand gesture being distinct from the in-air hand gesture; and (ii) in response to detecting the additional in-air hand gesture, causing the plurality of text terms to be sent to one or more other users via the messaging application. For example, FIG. 1F shows the user performing the gesture 146 and the draft message 110 from FIG. 1E being sent to the person "M" in response to the gesture 146.

(B9) The method of any of B1-B8, where the wearable device is a wrist-wearable device that is configured to send instructions to a head-worn wearable device that includes the display. For example, the wearable device is the wrist-wearable device 104, 900, 970, or 979. As an example, the head-worn wearable device is the head-mounted display device 102 or the augmented-reality glasses 202.

(B10) The method of any of B1-B8, where the wearable device is a head-mounted device that is configured to communicate with one or more additional wearable devices. For example, the wearable device is the head-mounted display device 102 or the augmented-reality glasses 202.

In some embodiments, one or more of the gestures described above (e.g., with respect to A1-A19 and B1-B10) are detected with an optical sensor (e.g., a camera) or sensors associated with an inertial measurement unit (IMU) rather than (or in addition to, via fusing the sensor inputs to detect the various in-air hand gestures described herein) the one or more neuromuscular-signal sensors. In some embodiments, the one or more gestures described above (e.g., with respect to A1-A19 and B1-B10) are replaced with gestures performed by other parts of the user's body (e.g., head gestures, leg gestures, torso gestures). As one example, the in-air hand gesture used to activate a text-modification mode can be a nod of the user's head, which can be detected using one or more neuromuscular-signal sensors, data from an IMU, and cameras; as another example, the deletion gesture described above can be a shaking of the user's head (as if the user is indicating "No"). In some embodiments, the wearable device detects neuromuscular signals traveling through the user's neck or back, which can be done using neuromuscular-signal sensors coupled with the VR goggles or the AR glasses in some example embodiments. In some embodiments, the one or more gestures described above (e.g., with respect to A1-A19 and B1-B10) are replaced with (or performed using) in-air hand gestures on a controller (e.g., a handheld controller or foot pedal controller). In some embodiments, the one or more in-air hand gestures described above (e.g., with respect to A1-A19 and B1-B10) are replaced with audio commands (e.g., spoken word commands or non-word commands such as a tongue click).

In another aspect, some embodiments include a computing system including one or more processors and a memory coupled to the one or more processors, the memory storing one or more programs configured to be executed by the one or more processors, and the one or more programs including instructions for performing any of the methods described herein (e.g., methods 500, 600, A1-A19, or B1-B10 above).

In yet another aspect, some embodiments include a non-transitory computer-readable storage medium storing one or more programs for execution by one or more processors of a computing system, the one or more programs including instructions for performing any of the methods described herein (e.g., methods 500, 600, A1-A19, or B1-B10 above).

While text terms are used as a primary illustrative example herein, the skilled artisan will appreciate upon reading this disclosure that the inventive techniques discussed herein can also be used to allow for neuromuscular gesture control of additional types of inputs, including graphical inputs (such as images including near any of the text terms or emojis), attachment-type inputs (e.g., document attachments), and many other types of inputs that can be provided at wearable devices in addition to text-based inputs.

It will be understood that although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when," "upon," or "in response to determining," "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining," "in response to determining," "in accordance with a determination," "upon detecting" or "in response to detecting" that the stated condition precedent is true, depending on the context.

The foregoing description, for the purpose of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications to thereby enable others skilled in the art.

What is claimed is:

1. A method performed at a wearable device having memory and one or more processors, the method comprising:
  causing display, using a display that is in communication with the wearable device, of a plurality of text terms input by a user and a first set of representations corresponding to a viewing mode, the first set of representations indicating available commands and corresponding in-air hand gestures detectable by one or more neuromuscular-signal sensors in communication with the wearable device, wherein the corresponding in-air hand gestures include a first in-air hand gesture corresponding to an available mode-agnostic command and a second in-air hand gesture corresponding to an available mode-specific command, and wherein the corresponding in-air hand gestures include an in-air hand gesture mapped to an available command for enabling a text-modification mode;
  detecting, using data from the one or more neuromuscular-signal sensors in communication with the wearable device, the in-air hand gesture performed by the user while the plurality of text terms is displayed;
  in response to the in-air hand gesture, enabling the text-modification mode that allows for modifying the plurality of text terms input by the user, wherein enabling the text-modification mode includes causing display of a second set of representations corresponding to the text-modification mode, the second set of representations indicating other available commands and other corresponding in-air hand gestures, wherein the other available commands comprise an available command for disabling the text-modification mode, and wherein the other corresponding in-air hand gestures include the first in-air hand gesture corresponding to the available mode-agnostic command and another in-air hand gesture corresponding to another available mode-specific command;
  identifying a target term of the plurality of text terms; and
  while the text-modification mode is enabled:
    receiving data about a voice input provided by the user for modifying the target term; and
    causing a modification to the target term in accordance with the voice input from the user.

2. The method of claim 1, wherein the target term is identified based on a gaze of the user.

3. The method of claim 1, wherein:
  the target term is identified in accordance with detection, using data from the one or more neuromuscular-signal sensors, of an additional in-air hand gesture performed by the user, and
  the additional in-air hand gesture is distinct from the in-air hand gesture.

4. The method of claim 1, wherein enabling the text-modification mode includes activating one or more sensors for user gaze tracking, and wherein the method further comprises, while the text-modification mode is enabled:
  tracking a user gaze based on data from the one or more sensors; and
  causing the target term to be emphasized on the display in accordance with the user gaze,
  wherein identifying the target term comprises detecting, using data from the one or more neuromuscular-signal sensors, an additional in-air hand gesture while the target term is emphasized.

5. The method of claim 4, further comprising, in accordance with disabling the text-modification mode, deactivating the one or more sensors.

6. The method of claim 1, further comprising, while the text-modification mode is enabled, causing a first term of the plurality of text terms to be emphasized on the display, wherein:
  the first term appears before the target term in the plurality of text terms,
  the voice input is received while the first term is emphasized on the display, and
  the voice input is determined to modify a phrase that includes the first term and the target term.

7. The method of claim 1, wherein the target term is identified based on a determination that a term type of the target term matches a classification of the voice input from the user.

8. The method of claim 1, further comprising, prior to causing display of the plurality of text terms:
  detecting, using data from the one or more neuromuscular-signal sensors, an additional in-air hand gesture performed by the user, the additional in-air hand gesture being distinct from the in-air hand gesture;
  in response to the additional in-air hand gesture, enabling an input mode; and
  while in the input mode, receiving data about the plurality of text terms input by the user and causing the display of each of the plurality of text terms as the data is received.

9. The method of claim 1, wherein the plurality of text terms input by the user are caused to be displayed on a display of the wearable device.

10. The method of claim 1, wherein the wearable device is a wrist-wearable device that is configured to send instructions to a head-worn wearable device that includes the display.

11. The method of claim 1, further comprising:
  after modifying the target term, exiting the text-modification mode; and
  after exiting the text-modification mode and in response to detecting an additional in-air hand gesture using data from the one or more neuromuscular-signal sensors, causing the plurality of text terms, including the target term after it has been modified, to be sent to one or more other users via a messaging application.

12. The method of claim 1, further comprising, while the text-modification mode is enabled:
  detecting, using data from the one or more neuromuscular-signal sensors, an additional in-air hand gesture performed by the user, the additional in-air hand gesture being distinct from the in-air hand gesture; and
  in response to the additional in-air hand gesture, causing display of a context menu in proximity to the plurality of text terms.

13. The method of claim 12, further comprising, while the text-modification mode is enabled:
  detecting, using data from the one or more neuromuscular-signal sensors, one more in-air hand gesture performed by the user, the one or more in-air hand gesture being distinct from the in-air hand gesture and the additional in-air hand gesture; and in response to the one more in-air hand gesture, causing display of one or more modifiers for modifying an appearance of one or more of the plurality of text terms.

14. The method of claim 1, further comprising, while the text-modification mode is enabled:
    detecting, using data from the one or more neuromuscular-signal sensors, an additional in-air hand gesture performed by the user; and
    in response to the additional in-air hand gesture, causing a deletion of one or more terms of the plurality of text terms from being displayed on the display.

15. The method of claim 1, further comprising, while the text-modification mode is enabled:
    detecting, using data from the one or more neuromuscular-signal sensors, an additional in-air hand gesture performed by the user, the additional in-air hand gesture being a same or different gesture from the in-air hand gesture; and
    in response to the additional in-air hand gesture, exiting the text-modification mode.

16. The method of claim 1, further comprising, while the text-modification mode is enabled:
    causing a first term of the plurality of text terms to be emphasized on the display;
    while causing the first term to be emphasized, detecting, using data from the one or more neuromuscular-signal sensors, an additional in-air hand gesture performed by the user; and
    in response to the additional in-air hand gesture, displaying a menu with one or more replacement options for the first term, wherein the one or more replacement options are obtained from a speech model.

17. The method of claim 1, wherein the modification to the target term is caused in accordance with the voice input from the user and detection of an additional in-air hand gesture of the one or more corresponding in-air hand gestures.

18. The method of claim 1, further comprising, in accordance with enabling the text-modification mode, causing a first term of the plurality of text terms to be emphasized on the display.

19. An artificial-reality system, comprising:
    one or more processors;
    memory coupled to the one or more processors, the memory storing instructions for:
        causing display, using a display that is in communication with a wearable device, of a plurality of text terms input by a user and a first set of representations corresponding to a viewing mode, the first set of representations indicating available commands and corresponding in-air hand gestures detectable by one or more neuromuscular-signal sensors in communication with the wearable device, wherein the corresponding in-air hand gestures include a first in-air hand gesture corresponding to an available mode-agnostic command and a second in-air hand gesture corresponding to an available mode-specific command, and wherein the corresponding in-air hand gestures include an in-air hand gesture mapped to an available command for enabling a text-modification mode;
        detecting, using data from the one or more neuromuscular-signal sensors in communication with the wearable device, the in-air hand gesture performed by the user while the plurality of text terms is displayed;
        in response to the in-air hand gesture, enabling the text-modification mode that allows for modifying the plurality of text terms input by the user, wherein enabling the text-modification mode includes causing display of a second set of representations corresponding to the text-modification mode, the second set of representations indicating other available commands and other corresponding in-air hand gestures, wherein the other available commands comprise an available command for disabling the text-modification mode, and wherein the other corresponding in-air hand gestures include the first in-air hand gesture corresponding to the available mode-agnostic command and another in-air hand gesture corresponding to another available mode-specific command;
        identifying a target term of the plurality of text terms; and
        while the text-modification mode is enabled:
            receiving data about a voice input provided by the user for modifying the target term; and
            causing a modification to the target term in accordance with the voice input from the user.

20. A non-transitory computer-readable storage medium storing one or more programs configured for execution by a computing device having one or more processors and memory, the one or more programs comprising instructions for:
    causing display, using a display that is in communication with a wearable device, of a plurality of text terms input by a user and a first set of representations corresponding to a viewing mode, the first set of representations indicating available commands and corresponding in-air hand gestures detectable by one or more neuromuscular-signal sensors in communication with the wearable device, wherein the corresponding in-air hand gestures include a first in-air hand gesture corresponding to an available mode-agnostic command and a second in-air hand gesture corresponding to an available mode-specific command, and wherein the corresponding in-air hand gestures include an in-air hand gesture mapped to an available command for enabling a text-modification mode;
    detecting, using data from the one or more neuromuscular-signal sensors in communication with the wearable device, the in-air hand gesture performed by the user while the plurality of text terms is displayed;
    in response to the in-air hand gesture, enabling the text-modification mode that allows for modifying the plurality of text terms input by the user, wherein enabling the text-modification mode includes causing display of a second set of representations corresponding to the text-modification mode, the second set of representations indicating other available commands and other corresponding in-air hand gestures, wherein the other available commands comprise an available command for disabling the text-modification mode, and wherein the other corresponding in-air hand gestures include the first in-air hand gesture corresponding to the mode-agnostic command and another in-air hand gesture corresponding to another mode-specific command;
    identifying a target term of the plurality of text terms; and
    while the text-modification mode is enabled:
        receiving data about a voice input provided by the user for modifying the target term; and
        causing a modification to the target term in accordance with the voice input from the user.

* * * * *